US012598496B2

(12) United States Patent
Eklöf et al.

(10) Patent No.: US 12,598,496 B2
(45) Date of Patent: Apr. 7, 2026

(54) MN-SN COORDINATION FOR QUALITY-OF-EXPERIENCE (QoE) MEASUREMENTS

(71) Applicant: Telefonaktiebolaget LM Ericsson (publ), Stockholm (SE)

(72) Inventors: Cecilia Eklöf, Täby (SE); Nicklas Johansson, Linköping (SE); Johan Rune, Lidingö (SE); Luca Lunardi, Genoa (IT); Ali Parichehrehteroujeni, Linköping (SE); Filip Barac, Huddinge (SE); Angelo Centonza, Granada (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 452 days.

(21) Appl. No.: 18/008,348

(22) PCT Filed: Jun. 15, 2021

(86) PCT No.: PCT/SE2021/050581

§ 371 (c)(1),
(2) Date: Dec. 5, 2022

(87) PCT Pub. No.: WO2022/005360

PCT Pub. Date: Jan. 6, 2022

(65) Prior Publication Data

US 2023/0284058 A1     Sep. 7, 2023

Related U.S. Application Data

(60) Provisional application No. 63/046,407, filed on Jun. 30, 2020.

(51) Int. Cl.
H04W 24/10         (2009.01)
H04W 24/08         (2009.01)

(52) U.S. Cl.
CPC ........... *H04W 24/10* (2013.01); *H04W 24/08* (2013.01)

(58) Field of Classification Search
None
See application file for complete search history.

(56) References Cited

U.S. PATENT DOCUMENTS

2013/0128756 A1     5/2013   Zhang et al.
2013/0268577 A1     10/2013  Oyman
(Continued)

FOREIGN PATENT DOCUMENTS

WO     2019073340 A1     4/2019
WO     2019106055 A1     6/2019
(Continued)

OTHER PUBLICATIONS

"3GPP TS 26.114 V16.5.2", 3rd Generation Partnership Project; Technical Specification Group Services and System Aspects; IP Multimedia Subsystem (IMS); Multimedia Telephony; Media handling and interaction (Release 16), Mar. 2020, pp. 1-446.
(Continued)

*Primary Examiner* — Angela Nguyen
(74) *Attorney, Agent, or Firm* — Murphy, Bilak & Homiller, PLLC

(57) ABSTRACT

Embodiments include methods, for a first radio access network node (RNN) in a wireless network, for configuring quality of experience (QoE) measurements by user equipment (UEs). Such methods include sending, to a UE connected to the first RNN, a QoE measurement configuration for one or more services provided by an application layer of the UE; and sending, to the UE, a configuration for access-layer multi-connectivity of the UE with a second RNN in the wireless network. Such methods also include receiving one or more QoE measurement reports, in accordance with the
(Continued)

QoE measurement configuration, from at least one of the UE and the second RNN. The QoE measurement reports include measurements made by the UE while in multi-connectivity with the first and second RNNs. Embodiments also include complementary methods for a second RNN and a UE, as well as RNNs and UEs configured to perform such methods.

22 Claims, 24 Drawing Sheets

(56)                References Cited

U.S. PATENT DOCUMENTS

| | | |
|---|---|---|
| 2013/0286868 A1 | 10/2013 | Oyman et al. |
| 2017/0134980 A1 | 5/2017 | Persson et al. |
| 2018/0035438 A1 | 2/2018 | Pao et al. |
| 2018/0041913 A1 | 2/2018 | Zhu et al. |
| 2019/0222491 A1 | 7/2019 | Tomkins et al. |
| 2020/0112907 A1 | 4/2020 | Dao et al. |
| 2020/0145851 A1 | 5/2020 | Berlin et al. |
| 2021/0352749 A1 | 11/2021 | Szilagyi et al. |
| 2021/0409998 A1* | 12/2021 | Kwok .................. H04L 45/302 |
| 2022/0158781 A1* | 5/2022 | Zhu ........................ H04L 5/0032 |
| 2022/0417780 A1 | 12/2022 | Liu et al. |
| 2023/0115085 A1* | 4/2023 | Hu ......................... H04W 76/15 |
| | | 370/252 |

FOREIGN PATENT DOCUMENTS

| | | |
|---|---|---|
| WO | 2022005359 A1 | 1/2022 |
| WO | 2022075904 A1 | 4/2022 |

OTHER PUBLICATIONS

"3GPP TS 26.247 V16.2.0", 3rd Generation Partnership Project; Technical Specification Group Services and System Aspects; Transparent end-to-end Packet-switched Streaming Service (PSS); Progressive Download and Dynamic Adaptive Streaming over http (3GP-DASH) (Release 16), Dec. 2019, pp. 1-139.

"3GPP TS 27.007 V16.4.0", 3rd Generation Partnership Project; Technical Specification Group Core Network and Terminals; AT command set for User Equipment (UE) (Release 16), Mar. 2020, pp. 1-355.

"3GPP TS 28.405 V1.3.0", S5-202345; 3rd Generation Partnership Project; Technical Specification Group Services and System Aspects; Telecommunication management; Quality of Experience (QoE) measurement collection; Control and configuration (Release 16), Apr. 2020, pp. 1-53.

"3GPP TS 32.422 V16.1.0", 3rd Generation Partnership Project; Technical Specification Group Services and System Aspects; Telecommunication management; Subscriber and equipment trace; Trace control and configuration management (Release 16), Mar. 2020, pp. 1-214.

"3GPP TS 33.210 V16.3.0", 3rd Generation Partnership Project; Technical Specification Group Services and System Aspects; 3G security; Network Domain Security (NDS); IP network layer security (Release 16), Mar. 2020, pp. 1-27.

"3GPP TS 36.300 V16.0.0", 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 16), Dec. 2019, pp. 1-366.

"3GPP TS 36.331 V15.9.0", 3rd Generation Partnership Project; Technical Specification Group Radio Access Network; Evolved Universal Terrestrial Radio Access (E-UTRA); Radio Resource Control (RRC); Protocol specification (Release 15), Mar. 2020, pp. 1-964.

"3GPP TS 36.413 V16.1.0", 3rd Generation Partnership Project; Technical Specification Group Radio Access Network; Evolved Universal Terrestrial Radio Access Network (E-UTRAN); S1 Application Protocol (S1AP) (Release 16), Mar. 2020, pp. 1-130.

"3GPP TS 38.463 V15.4.0", 3rd Generation Partnership Project; Technical Specification Group Radio Access Network; NG-RAN; E1 Application Protocol (E1AP) (Release 15), Jul. 2019, pp. 1-177.

"3GPP TS 33.501 V16.2.0", 3rd Generation Partnership Project; Technical Specification Group Services and System Aspects; Security architecture and procedures for 5G system (Release 16), Mar. 2020, pp. 1-227.

"Agreements for MR-DC with 5GC", 3GPP TSG-RAN WG2 Meeting #104, R2-1819036, Spokane, USA, Nov. 12-16, 2018, pp. 1-53.

"Alignment of radio related measurement and QoE measurement", 3GPP TSG-RAN WG3 #112-e, R3-212496, Online, May 17-28, 2021, pp. 1-3.

"Discussion on QoE measurement collection for RDC", 3GPP TSG-RAN WG2 Meeting #105, R2-1901857, Athens, Greece, Feb. 25-Mar. 1, 2019, pp. 1-3.

"Discussion QoE Measurement Collection for streaming services", 3GPP TSG-RAN WG2 #96, R2-168022, Reno, Nevada, USA, Nov. 14-18, 2016, pp. 1-22.

"NR QoE Measurement Triggering, Configuration, Collection and Reporting", 3GPP TSG-RAN WG2 Meeting #109-e, R2-2007600, Electronic meeting, Aug. 17-28, 2020, pp. 1-5.

"QoE measurement collection additions", 3GPP TSG RAN2 Meeting #110, R2-2004624, Electronic meeting, Jun. 1-12, 2020, pp. 1-80.

"Stage 2 TP to update bearer type description", 3GPP TSG-RAN WG2 Meeting#100, R2-1714183, Reno, USA, Nov. 27-Dec. 1, 2017, pp. 1-30.

"UE Application Layer Measurement ID and Type for QoE for Streaming service in EUTRAN", 3GPP TSG-RAN3 Meeting #98, R3-174807, Reno, USA, Nov. 27-Dec. 1, 2017, pp. 1-22.

"3GPP TS 38.401 V16.1.0", 3rd Generation Partnership Project; Technical Specification Group Radio Access Network; NG-RAN; Architecture description (Release 16), Mar. 2020, pp. 1-50.

"3GPP TS 37.340 V16.1.0", 3rd Generation Partnership Project; Technical Specification Group Radio Access Network; Evolved Universal Terrestrial Radio Access (E-UTRA) and NR; Multi-connectivity; Stage 2 (Release 16), Mar. 2020, pp. 1-74.

"3GPP TS 36.331 V16.0.0", 3rd Generation Partnership Project; Technical Specification Group Radio Access Network; Evolved Universal Terrestrial Radio Access (E-UTRA); Radio Resource Control (RRC); Protocol specification (Release 16) Mar. 2020, pp. 1-1048.

"3GPP TS 36.423 V16.1.0", 3rd Generation Partnership Project; Technical Specification Group Radio Access Network; Evolved Universal Terrestrial Radio Access Network (E-UTRAN); X2 application protocol (X2AP) (Release 16), Mar. 2020, pp. 1-438.

"3GPP TS 38.473 V16.1.0", 3rd Generation Partnership Project; Technical Specification Group Radio Access Network; NG-RAN; F1 application protocol (F1AP) (Release 16), Mar. 2020, pp. 1-240.

"3GPP TS 38.423 V16.1.0", 3rd Generation Partnership Project; Technical Specification Group Radio Access Network; NG-RAN; Xn application protocol (XnAP) (Release 16), Mar. 2020, pp. 1-334.

"3GPP TS 38.300 V16.1.0", 3rd Generation Partnership Project; Technical Specification Group Radio Access Network; NR; NR and NG-RAN Overall Description; Stage 2 (Release 16), Mar. 2020, pp. 1-133.

"3GPP TS 38.331 V16.0.0", 3rd Generation Partnership Project; Technical Specification Group Radio Access Network; NR; Radio Resource Control (RRC) protocol specification (Release 16), Mar. 2020, pp. 1-835.

"3GPP TS 25.331 V15.1.0", 3rd Generation Partnership Project; Technical Specification Group Radio Access Network; Radio Resource Control (RRC); Protocol specification (Release 15), Dec. 2017, pp. 1-2316.

"3GPP TR 38.806 V15.0.0", 3rd Generation Partnership Project; Technical Specification Group Radio Access Network; Study of separation of NR Control Plane (CP) and User Plane (UP) for split option 2; (Release 15), Dec. 2017, pp. 1-22.

"3GPP TR 38.801 V14.0.0", 3rd Generation Partnership Project; Technical Specification Group Radio Access Network; Study on

(56)                    References Cited

OTHER PUBLICATIONS new radio access technology: Radio access architecture and interfaces (Release 14), Mar. 2017, pp. 1-91.
"3GPP TR 38.804 V14.0.0", 3rd Generation Partnership Project; Technical Specification Group Radio Access Network; Study on New Radio Access Technology; Radio Interface Protocol Aspects (Release 14), Mar. 2017, pp. 1-57.
"3GPP TS 23.501 V16.4.0", 3rd Generation Partnership Project; Technical Specification Group Services and System Aspects; System architecture for the 5G System (5GS); Stage 2 (Release 16), Mar. 2020, pp. 1-430.
"3GPP 38.331 V16.6.0", 5G; NR; Radio Resource Control (RRC); Protocol specification, ETSI TS 138 331 V16.6.0 (Release 16), Oct. 2021, pp. 1-948.
"3GPP TS 25.133 V16.0.0", 3rd Generation Partnership Project; Technical Specification Group Radio Access Network; Requirements for support of radio resource management (FDD) (Release 16), Dec. 2018, pp. 1-411.
"3GPP TS 28.405 V16.0.0", 3rd Generation Partnership Project; Technical Specification Group Services and System Aspects; Telecommunication management; Quality of Experience (QoE) measurement collection; Control and configuration (Release 16), Jul. 2020, pp. 1-16.
"3GPP TS 38.314 V16.1.0", 3rd Generation Partnership Project; Technical Specification Group Radio Access Network; NR; Layer 2 Measurements; (Release 16), Sep. 2020, pp. 1-18.
"LS Reply on QoE Measurement Collection", 3GPP TSG-SA4 Meeting #109-e, S4-200962, Online, May 20-Jun. 3, 2019, pp. 1-2.
"Potential RAN3 impacts about QoE measurement", 3GPP TSG-RAN WG3 #109-e, R3-205283, E-Meeting, Aug. 17-28, 2020, pp. 1-6.
"Summary of NR QoE Services", 3GPP TSG-RAN WG3 #109-e, RS-205479, Online, Aug. 17-28, 2020, pp. 1-8.
"3GPP TS 38.215 V16.4.0", 3rd Generation Partnership Project; Technical Specification Group Radio Access Network; NR; Physical layer measurements (Release 16), Dec. 2020, pp. 1-25.
"3GPP TS 38.331 V16.2.0", 3rd Generation Partnership Project; Technical Specification Group Radio Access Network; NR; Radio Resource Control (RRC) protocol specification (Release 16), Sep. 2020, pp. 1-921.
"3GPP TR 36.805 V9.0.0", 3rd Generation Partnership Project; Technical Specification Group Radio Access Network; Study on Minimization of drive-tests in Next Generation Networks; (Release 9), Dec. 2009, pp. 1-24.
"3GPP TS 28.307 V16.0.0", 3rd Generation Partnership Project; Technical Specification Group Radio Access Network; Radio Resource Control (RRC): Protocol specification (Release 16), Jul. 2020, pp. 1-10.
"3GPP TS 28.308 V16.0.0", 3rd Generation Partnership Project; Technical Specification Group Services and System Aspects; Telecommunication management; Quality of Experience (QoE) measurement collection Integration Reference Point (IRP); Information Service (IS) (Release 16), Jul. 2020, pp. 1-21.
"3GPP TS 28.309 V16.0.0", 3rd Generation Partnership Project; Tech Spec Grp Services and System Aspects; Telecommunication management; Mgmt of Quality of Experience (QoE) measurement collection Integration Reference Point (IRP); Solution Set (SS) (Release 16), Sep. 2020, pp. 1-31.
"3GPP TS 28.621 V16.0.0", 3rd Generation Partnership Project; Technical Specification Group Services and System Aspects; Telecommunication management; Generic Network Resource Model (NRM) Integration Reference Point (IRP); Requirments (Release 16), Jul. 2020, pp. 1-7.
"3GPP TS 28.622 V16.5.0", 3rd Generation Partnership Project; Technical Specification Group Services and System Aspects; Telecommunication management; Generic Network Resource Model (NRM) Integration Reference Point (IRP); Information Service (IS) (Release 16), Sep. 2020, pp. 1-55.
"3GPP TS 28.623 V16.4.0", 3rd Generation Partnership Project; Technical Specification Group Services and System Aspects; Telecommunication management; Generic Network Resource Model (NRM) Integration Reference Point (IRP); Solution Set (SS) defintions (Release 16), Jul. 2020, pp. 1-90.
"3GPP TS 32.441 V16.0.0", 3rd Generation Partnership Project; Technical Specification Group Services and System Aspects; Telecommunication management; Trace Management Integration Reference Point (IRP); Requirements (Release 16), Jul. 2020, 1-15.
"3GPP TS 32.442 V16.0.0", 3rd Generation Partnership Project; Technical Specification Group Services and System Aspects; Telecommunication management; Trace Management Integration Reference Point (IRP); Information Service (IS) (Release 16), Jul. 2020, pp. 1-32.
"3GPP TS 32.446 V16.0.0", 3rd Generation Partnership Project; Technical Specification Group Services and System Aspects; Telecommunication management; Trace Management Integration Reference Point (IRP); Solution Set (SS) definitions (Release 16), Jul. 2020, pp. 1-47.
"3GPP TS 33.210 V16.4.0", 3rd Generation Partnership Project; Technical Specification Group Services and System Aspects; Network Domain Security (NDS); IP network layer security; (Release 16), Jul. 2020, pp. 1-27.
"New WI proposal: Quality of Experience (QoE) Measurement Collection for streaming in E-UTRAN", 3GPP TSG RAN meeting #81, Gold Coast, Australia, RP-181640, Revision of RP-170956, Sep. 10-13, 2018, pp. 1-5.
"Summary of Offline Discussion on NR QoE Management Solutions", 3GPP TSG-RAN WG3 Meeting #190-e, R3-205726, Online, Aug. 17-27, 2020, pp. 1-13.
"3rd Generation Partnership Project; Technical Specification Group Radio Access Network; Evolved Universal Terrestial Radio Access (E-UTRA); Radio Resource Control (RRC); Protocol specification (Release 16)", 3GPP TS 36.331 V16.2.1, Sep. 2020, pp. 1-1081.
"3rd Generation Partnership Project; Technical Specification Group Radio Access Network; NR; NR and NG-Ran Overall Description; Stage 2 (Release 16)", 3GPP TS 38.300 V16.3.0, Sep. 2020, pp. 1-148.
ETSI, "Universal Mobile Telecommunications System (UMTS); Radio Resource Control (RRC); Protocol specification (3GPP TS 25.331 version 16.1.0 Release 16)", ETSI TS 125 331 V16.1.0, Nov. 2020, pp. 1-2382.

* cited by examiner

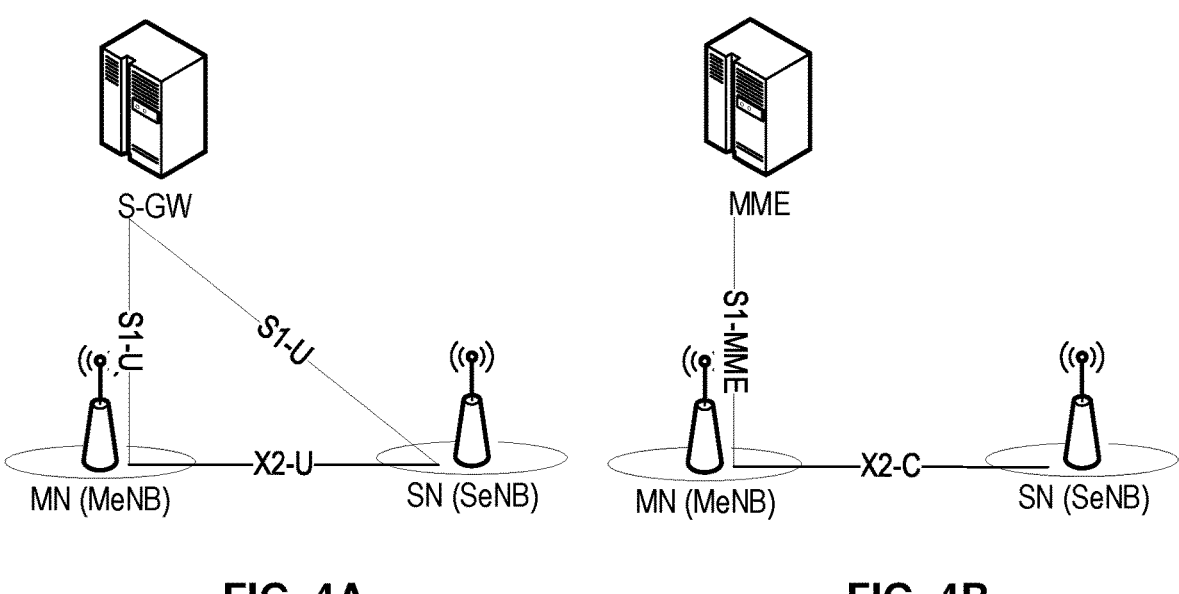
FIG. 4A          FIG. 4B
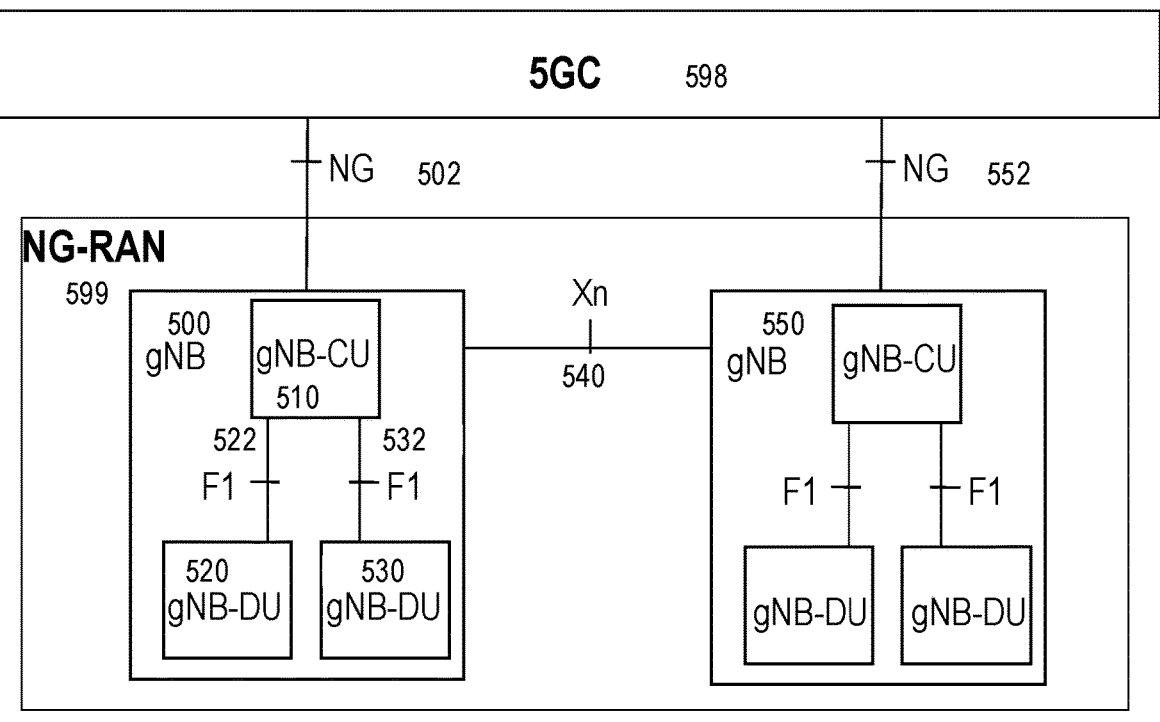
FIG. 5

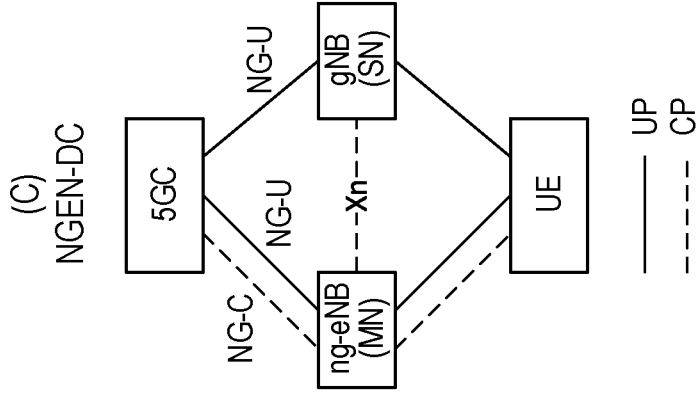
(C)
NGEN-DC
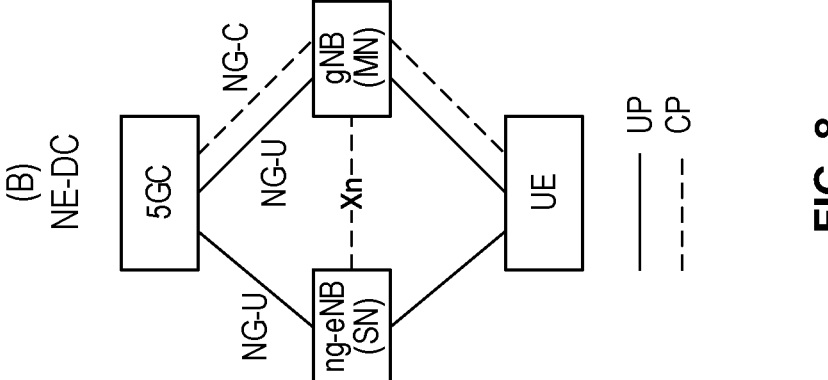
(B)
NE-DC
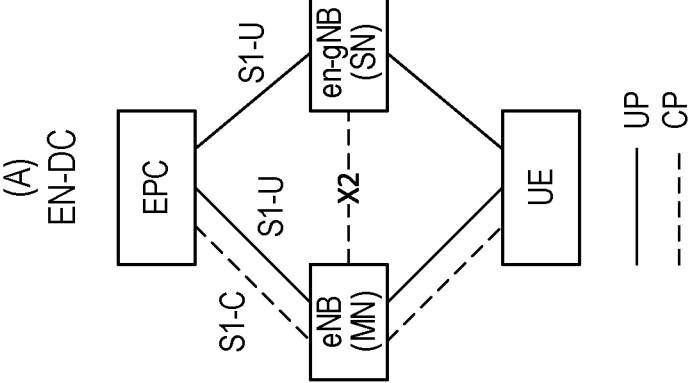
(A)
EN-DC
FIG. 8

FIG. 16A

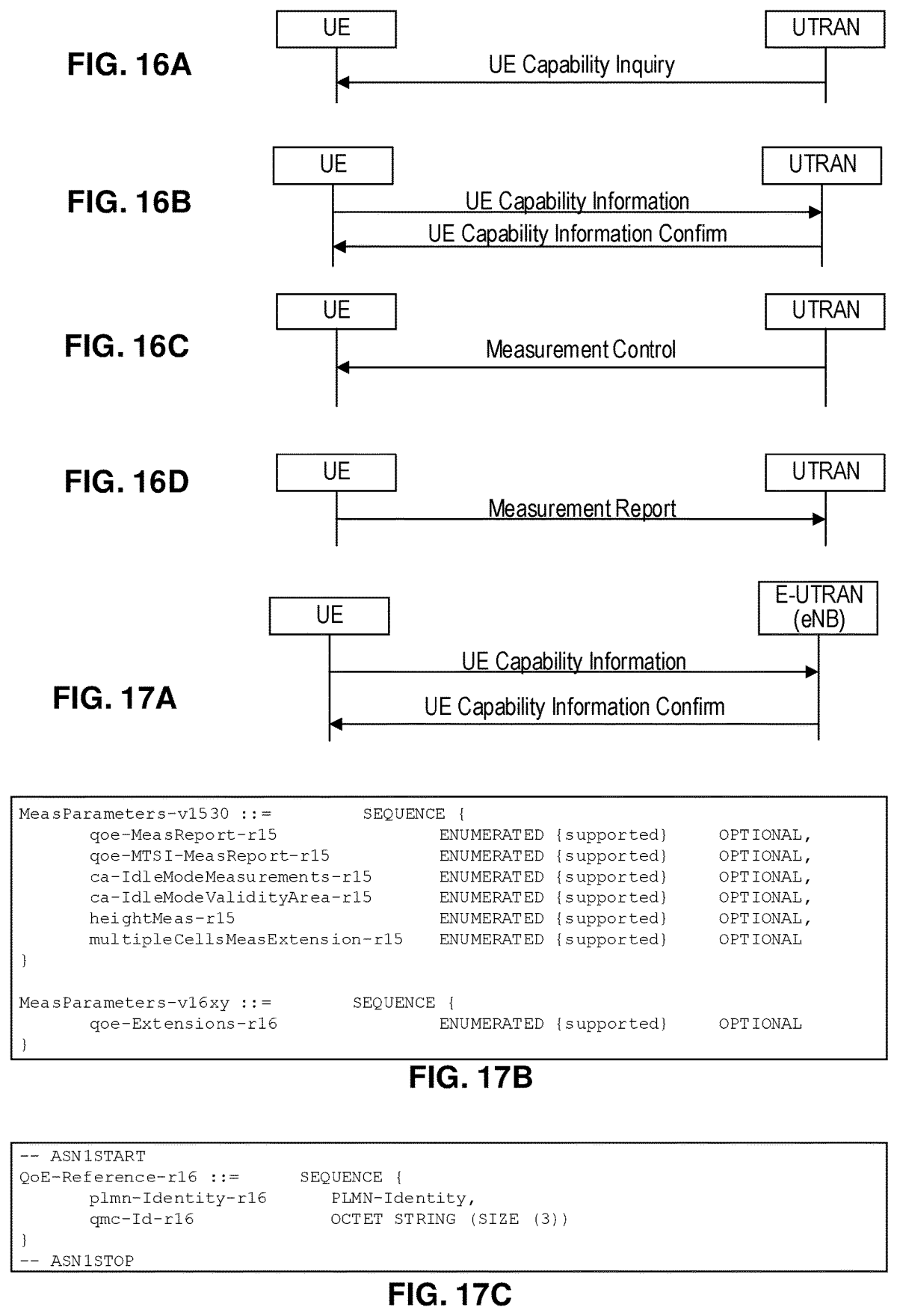

UE     UTRAN

UE Capability Inquiry

FIG. 16B

UE     UTRAN

UE Capability Information

UE Capability Information Confirm

FIG. 16C

UE     UTRAN

Measurement Control

FIG. 16D

UE     UTRAN

Measurement Report

FIG. 17A

UE     E-UTRAN (eNB)

UE Capability Information

UE Capability Information Confirm

```
MeasParameters-v1530 ::=          SEQUENCE {
     qoe-MeasReport-r15              ENUMERATED {supported}   OPTIONAL,
     qoe-MTSI-MeasReport-r15         ENUMERATED {supported}   OPTIONAL,
     ca-IdleModeMeasurements-r15     ENUMERATED {supported}   OPTIONAL,
     ca-IdleModeValidityArea-r15     ENUMERATED {supported}   OPTIONAL,
     heightMeas-r15                  ENUMERATED {supported}   OPTIONAL,
     multipleCellsMeasExtension-r15  ENUMERATED {supported}   OPTIONAL
}

MeasParameters-v16xy ::=          SEQUENCE {
     qoe-Extensions-r16             ENUMERATED {supported}   OPTIONAL
}
```

FIG. 17B

```
-- ASN1START
QoE-Reference-r16 ::=       SEQUENCE {
     plmn-Identity-r16       PLMN-Identity,
     qmc-Id-r16              OCTET STRING (SIZE (3))
}
-- ASN1STOP
```

FIG. 17C

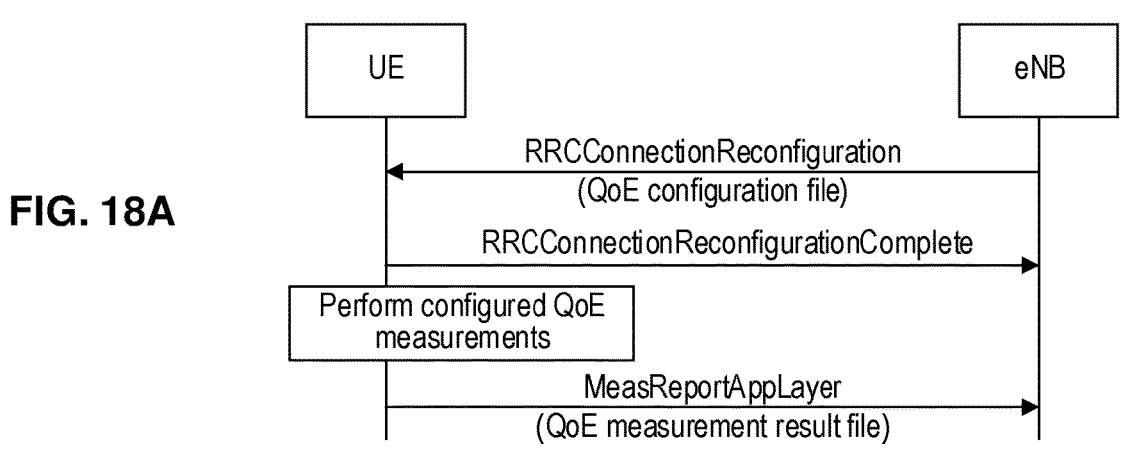

FIG. 18A

```
measConfigAppLayer-r15 CHOICE {                                          FIG. 18B
    release                     NULL,
    setup                       SEQUENCE{
        measConfigAppLayerContainer-r15    OCTET STRING (SIZE(1..1000)),
        serviceType-r15                    ENUMERATED {qoe, qoemtsi, spare6,
                                                    spare5, spare4, spare3, spare2, spare1}
} measConfigAppLayerToAddModList-r18  SEQUENCE (SIZE (1.. maxQoE-Measurement-r18)) OF
                                            MeasConfigAppLayer-r18   OPTIONAL, -- Need ON
measConfigAppLayerToReleaseList-r18 SEQUENCE (SIZE (1.. maxQoE-Measurement-r18)) OF
                                            MeasReleaseAppLayer-r18   OPTIONAL -- Need ON MeasConfigAppLayer-r18 ::= SEQUENCE {
    measConfigAppLayerContainer-r15 OCTET STRING (SIZE(1..1000)) OPTIONAL,  -- Need ON
    serviceType-r18                 ServiceType-r18               OPTIONAL,  -- Need ON
    qoe-Reference-r18               QoE-Reference-r18             OPTIONAL,  -- Need ON
    withinArea-r18                  ENUMERATED {inside, outside} OPTIONAL,  -- Need ON
    temporaryStopQoE-r18            BOOLEAN,
    restartQoE-r18                  BOOLEAN
}
MeasReleaseAppLayer-r18 ::= SEQUENCE {
    serviceType-r18                 ServiceType-r18               OPTIONAL,  -- Need ON
    qoe-Reference-r18               QoE-Reference-r18             OPTIONAL  -- Need ON
}
```

```
-- ASN1START                                                             FIG. 18C
MeasReportAppLayer-r15 ::=              SEQUENCE {
    criticalExtensions                     CHOICE {
        measReportAppLayer-r15                 MeasReportAppLayer-r15-IEs,
        criticalExtensionsFuture               SEQUENCE {}
    }
}
MeasReportAppLayer-r15-IEs ::=          SEQUENCE {
    measReportAppLayerContainer-r15 OCTET STRING (SIZE(1..8000))              OPTIONAL,
    serviceType-r15                    ENUMERATED {qoe, qoemtsi, spare6, spare5, spare4,
                                            spare3, spare2, spare1}          OPTIONAL,
    nonCriticalExtension               MeasReportAppLayer-v1590-IEs          OPTIONAL
}
MeasReportAppLayer-v1590-IEs ::=        SEQUENCE {
    lateNonCriticalExtension               OCTET STRING                      OPTIONAL,
    nonCriticalExtension                   MeasReportAppLayer-IEs-v18xy      OPTIONAL
}
MeasReportAppLayer-IEs-v18xy ::=        SEQUENCE {
    qoe-Reference-r18                      QoE-Reference-r18        OPTIONAL,  -- Need ON
    recordingSessionIndication-r18         BOOLEAN                  OPTIONAL,  -- Need ON
    nonCriticalExtension                   SEQUENCE {}              OPTIONAL
}
-- ASN1STOP
```

```
-- ASN1START
-- TAG-RADIOBEARERCONFIG-START
RadioBearerConfig ::=         SEQUENCE {
    srb-ToAddModList             SRB-ToAddModList        OPTIONAL, -- Cond HO-Conn
    srb3-ToRelease               ENUMERATED{true}        OPTIONAL, -- Need N
    drb-ToAddModList             DRB-ToAddModList        OPTIONAL, -- Cond HO-toNR
    drb-ToReleaseList            DRB-ToReleaseList       OPTIONAL, -- Need N
    securityConfig               SecurityConfig          OPTIONAL, -- Need M
    ...
}
SRB-ToAddModList ::=          SEQUENCE (SIZE (1..2)) OF SRB-ToAddMod
SRB-ToAddMod ::=              SEQUENCE {
    srb-Identity                 SRB-Identity,
    reestablishPDCP              ENUMERATED{true}        OPTIONAL, -- Need N
    discardOnPDCP                ENUMERATED{true}        OPTIONAL, -- Need N
    pdcp-Config                  PDCP-Config             OPTIONAL, -- Cond PDCP
    ...,
    [[  srb-Identity-v17xy      INTEGER (1..4)           OPTIONAL  -- Need ON
    ]]
}
DRB-ToAddModList ::=          SEQUENCE (SIZE (1..maxDRB)) OF DRB-ToAddMod
DRB-ToAddMod ::=              SEQUENCE {
    cnAssociation                CHOICE {
        eps-BearerIdentity           INTEGER (0..15),
        sdap-Config                  SDAP-Config
    }                                            OPTIONAL, -- Cond DRBSetup
    drb-Identity                 DRB-Identity,
    reestablishPDCP              ENUMERATED{true}        OPTIONAL, -- Need N
    recoverPDCP                  ENUMERATED{true}        OPTIONAL, -- Need N
    pdcp-Config                  PDCP-Config             OPTIONAL, -- Cond PDCP
    ...,
    [[
    dapsConfig-r16               ENUMERATED{true}        OPTIONAL  -- Need N
    ]]
}
DRB-ToReleaseList ::=         SEQUENCE (SIZE (1..maxDRB)) OF DRB-Identity
SecurityConfig ::=           SEQUENCE {
    securityAlgorithmConfig      SecurityAlgorithmConfig
                                            OPTIONAL, -- Cond RBTermChange1
    keyToUse                     ENUMERATED{master, secondary}
                                            OPTIONAL, -- Cond RBTermChange
    ...
}
-- TAG-RADIOBEARERCONFIG-STOP
-- ASN1STOP
```

FIG. 20A

```
-- ASN1START
-- TAG-RLC-BEARERCONFIG-START
RLC-BearerConfig ::= SEQUENCE {
    logicalChannelIdentity    LogicalChannelIdentity,
    servedRadioBearer         CHOICE {
        srb-Identity              SRB-Identity,
        drb-Identity              DRB-Identity
        [[    srb-Identity-v17xy    INTEGER (1..4)    OPTIONAL  -- Need ON
        ]]
    }                                    OPTIONAL, -- Cond LCH-SetupOnly
    reestablishRLC            ENUMERATED {true}    OPTIONAL, -- Need N
    rlc-Config                RLC-Config           OPTIONAL, -- Cond LCH-Setup
    mac-LogicalChannelConfig  LogicalChannelConfig OPTIONAL, -- Cond LCH-Setup
...
}
-- TAG-RLC-BEARERCONFIG-STOP
-- ASN1STOP
```

FIG. 20B

Figures 21A, 21B:
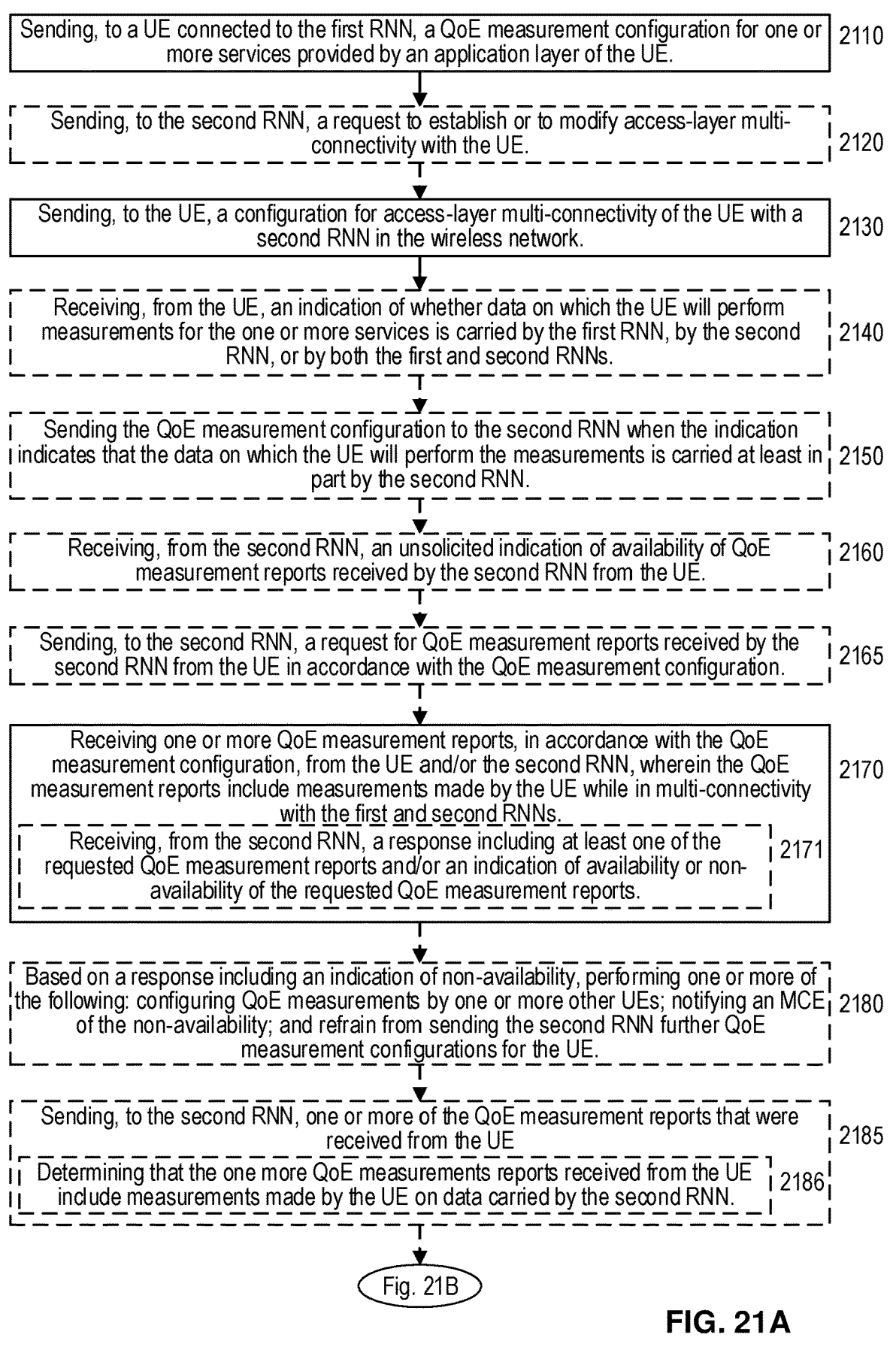

Sending, to a UE connected to the first RNN, a QoE measurement configuration for one or more services provided by an application layer of the UE. — 2110

Sending, to the second RNN, a request to establish or to modify access-layer multi-connectivity with the UE. — 2120

Sending, to the UE, a configuration for access-layer multi-connectivity of the UE with a second RNN in the wireless network. — 2130

Receiving, from the UE, an indication of whether data on which the UE will perform measurements for the one or more services is carried by the first RNN, by the second RNN, or by both the first and second RNNs. — 2140

Sending the QoE measurement configuration to the second RNN when the indication indicates that the data on which the UE will perform the measurements is carried at least in part by the second RNN. — 2150

Receiving, from the second RNN, an unsolicited indication of availability of QoE measurement reports received by the second RNN from the UE. — 2160

Sending, to the second RNN, a request for QoE measurement reports received by the second RNN from the UE in accordance with the QoE measurement configuration. — 2165

Receiving one or more QoE measurement reports, in accordance with the QoE measurement configuration, from the UE and/or the second RNN, wherein the QoE measurement reports include measurements made by the UE while in multi-connectivity with the first and second RNNs. — 2170

Receiving, from the second RNN, a response including at least one of the requested QoE measurement reports and/or an indication of availability or non-availability of the requested QoE measurement reports. — 2171

Based on a response including an indication of non-availability, performing one or more of the following: configuring QoE measurements by one or more other UEs; notifying an MCE of the non-availability; and refrain from sending the second RNN further QoE measurement configurations for the UE. — 2180

Sending, to the second RNN, one or more of the QoE measurement reports that were received from the UE — 2185

Determining that the one more QoE measurements reports received from the UE include measurements made by the UE on data carried by the second RNN. — 2186

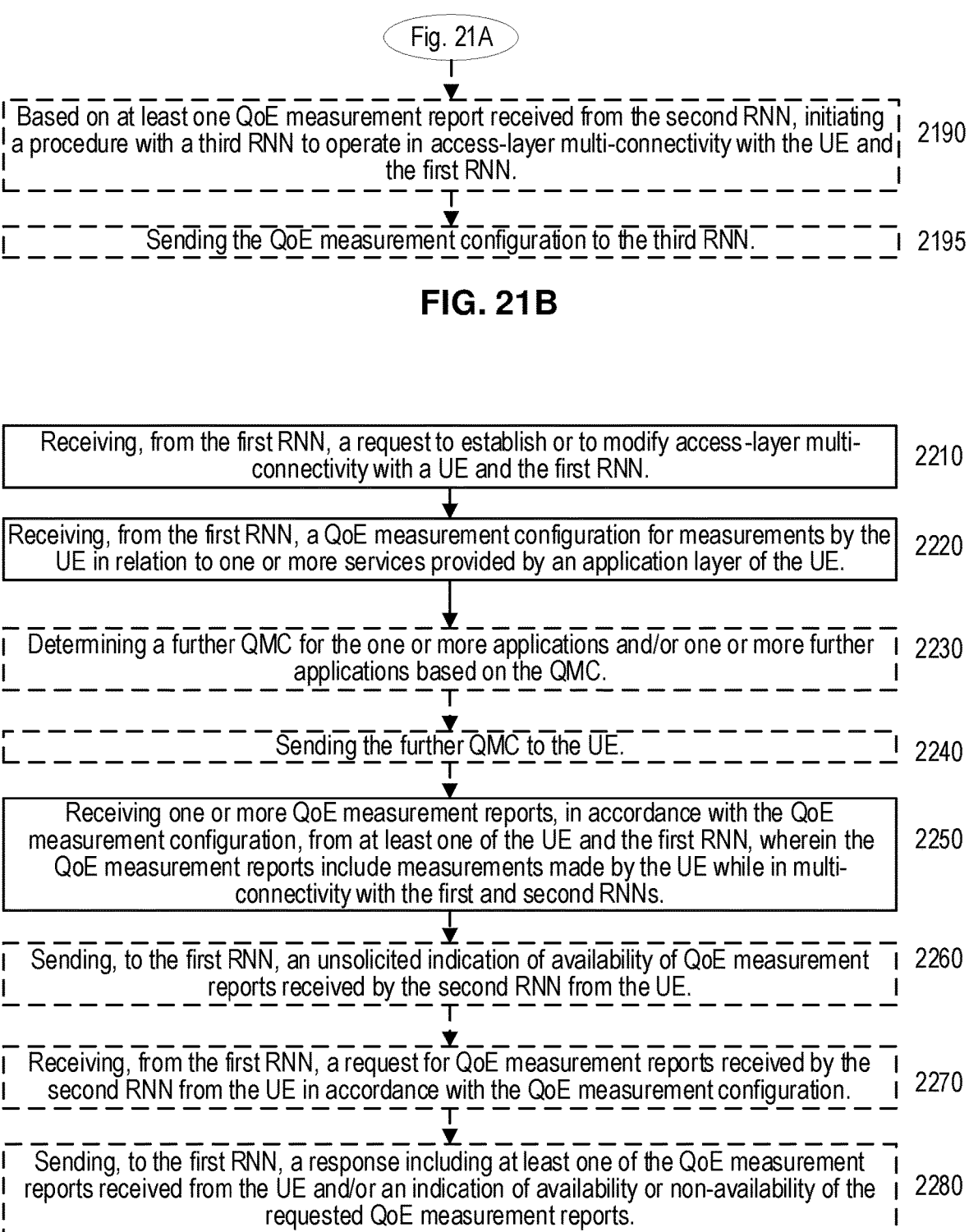

Fig. 21A

| Based on at least one QoE measurement report received from the second RNN, initiating a procedure with a third RNN to operate in access-layer multi-connectivity with the UE and the first RNN. | 2190 |

| Sending the QoE measurement configuration to the third RNN. | 2195 |

FIG. 21B

| Receiving, from the first RNN, a request to establish or to modify access-layer multi-connectivity with a UE and the first RNN. | 2210 |

| Receiving, from the first RNN, a QoE measurement configuration for measurements by the UE in relation to one or more services provided by an application layer of the UE. | 2220 |

| Determining a further QMC for the one or more applications and/or one or more further applications based on the QMC. | 2230 |

| Sending the further QMC to the UE. | 2240 |

| Receiving one or more QoE measurement reports, in accordance with the QoE measurement configuration, from at least one of the UE and the first RNN, wherein the QoE measurement reports include measurements made by the UE while in multi-connectivity with the first and second RNNs. | 2250 |

| Sending, to the first RNN, an unsolicited indication of availability of QoE measurement reports received by the second RNN from the UE. | 2260 |

| Receiving, from the first RNN, a request for QoE measurement reports received by the second RNN from the UE in accordance with the QoE measurement configuration. | 2270 |

| Sending, to the first RNN, a response including at least one of the QoE measurement reports received from the UE and/or an indication of availability or non-availability of the requested QoE measurement reports. | 2280 |

FIG. 22

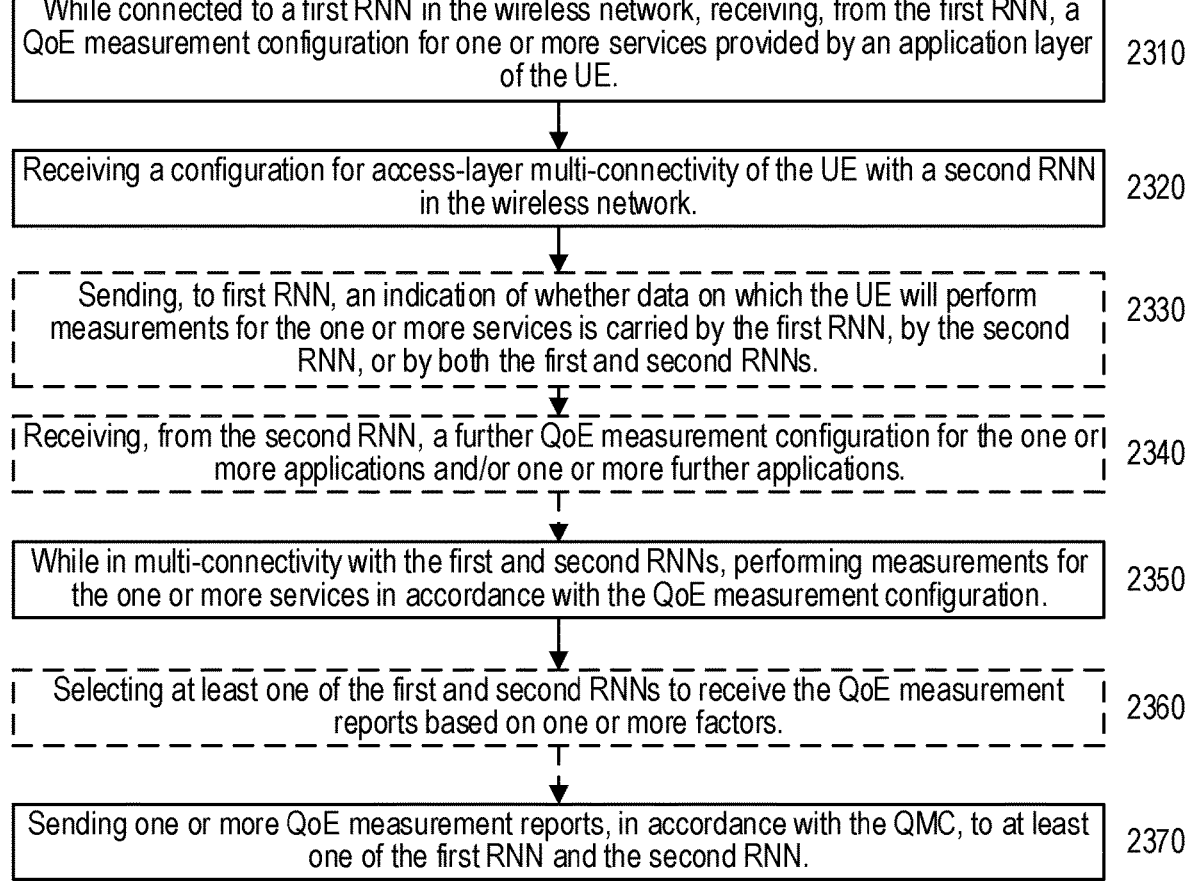

While connected to a first RNN in the wireless network, receiving, from the first RNN, a QoE measurement configuration for one or more services provided by an application layer of the UE. — 2310

Receiving a configuration for access-layer multi-connectivity of the UE with a second RNN in the wireless network. — 2320

Sending, to first RNN, an indication of whether data on which the UE will perform measurements for the one or more services is carried by the first RNN, by the second RNN, or by both the first and second RNNs. — 2330

Receiving, from the second RNN, a further QoE measurement configuration for the one or more applications and/or one or more further applications. — 2340

While in multi-connectivity with the first and second RNNs, performing measurements for the one or more services in accordance with the QoE measurement configuration. — 2350

Selecting at least one of the first and second RNNs to receive the QoE measurement reports based on one or more factors. — 2360

Sending one or more QoE measurement reports, in accordance with the QMC, to at least one of the first RNN and the second RNN. — 2370

FIG. 23

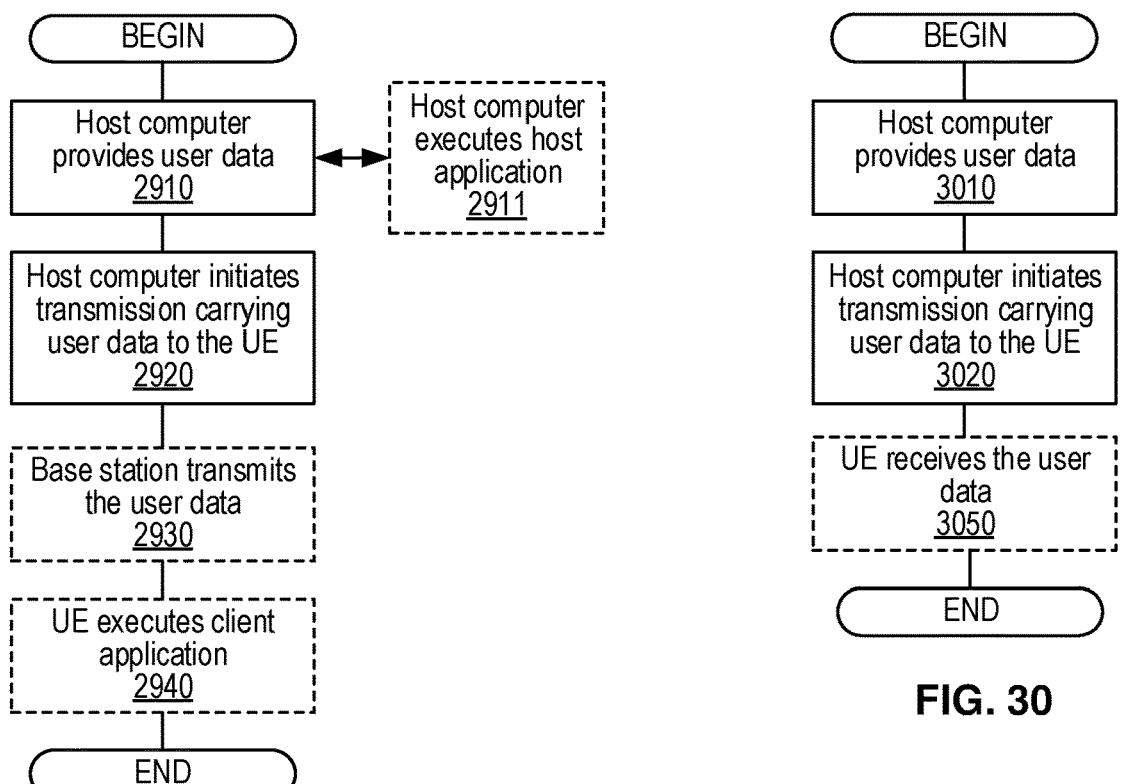
FIG. 29
FIG. 30
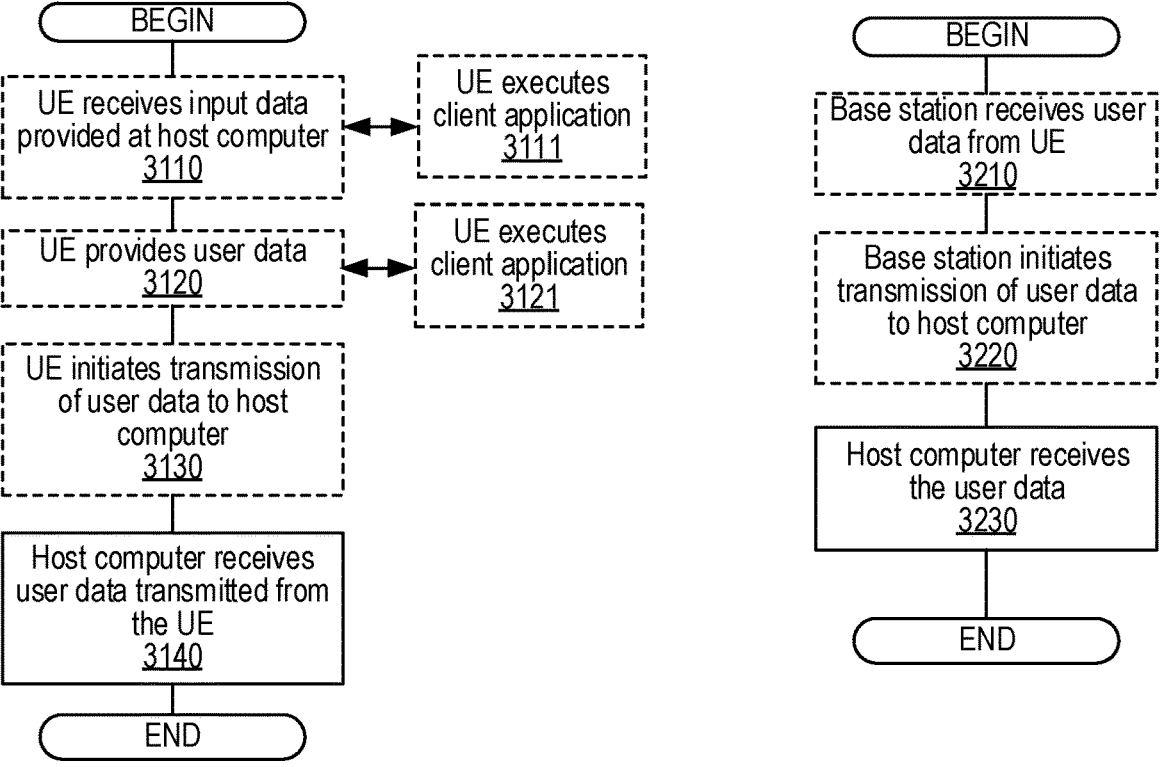
FIG. 31
FIG. 32

MN-SN COORDINATION FOR QUALITY-OF-EXPERIENCE (QoE) MEASUREMENTS

TECHNICAL FIELD

The present invention generally relates to wireless communication networks and particularly relates to measuring end-user experience in wireless networks, also referred to as quality of experience (QoE).

BACKGROUND

Long-Term Evolution (LTE) is an umbrella term for so-called fourth-generation (4G) radio access technologies developed within the Third-Generation Partnership Project (3GPP) and initially standardized in Release 8 (Rel-8) and Release 9 (Rel-9), also known as Evolved UTRAN (E-UTRAN). LTE is targeted at various licensed frequency bands and is accompanied by improvements to non-radio aspects commonly referred to as System Architecture Evolution (SAE), which includes Evolved Packet Core (EPC) network. LTE continues to evolve through subsequent releases.

An overall exemplary architecture of a network comprising LTE and SAE is shown in FIG. 1. E-UTRAN 100 includes one or more evolved Node B's (eNB), such as eNBs 105, 110, and 115, and one or more user equipment (UE), such as UE 120. As used within the 3GPP standards, "user equipment" or "UE" means any wireless communication device (e.g., smartphone or computing device) that is capable of communicating with 3GPP-standard-compliant network equipment, including E-UTRAN as well as UTRAN and/or GERAN, as the third-generation ("3G") and second-generation ("2G") 3GPP RANs are commonly known.

As specified by 3GPP, E-UTRAN 100 is responsible for all radio-related functions in the network, including radio bearer control, radio admission control, radio mobility control, scheduling, and dynamic allocation of resources to UEs in uplink and downlink, as well as security of the communications with the UE. These functions reside in the eNBs, such as eNBs 105, 110, and 115. Each of the eNBs can serve a geographic coverage area including one more cells, including cells 106, 111, and 115 served by eNBs 105, 110, and 115, respectively.

The eNBs in the E-UTRAN communicate with each other via the X2 interface, as shown in FIG. 1. The eNBs also are responsible for the E-UTRAN interface to the EPC 130, specifically the S1 interface to the Mobility Management Entity (MME) and the Serving Gateway (SGW), shown collectively as MME/S-GWs 134 and 138 in FIG. 1. In general, the MME/S-GW handles both the overall control of the UE and data flow between the UE and the rest of the EPC. More specifically, the MME processes the signaling (e.g., control plane) protocols between the UE and the EPC, which are known as the Non-Access Stratum (NAS) protocols. The S-GW handles all Internet Protocol (IP) data packets (e.g., data or user plane) between the UE and the EPC and serves as the local mobility anchor for the data bearers when the UE moves between eNBs, such as eNBs 105, 110, and 115.

EPC 130 can also include a Home Subscriber Server (HSS) 131, which manages user- and subscriber-related information. HSS 131 can also provide support functions in mobility management, call and session setup, user authentication and access authorization. The functions of HSS 131 can be related to the functions of legacy Home Location Register (HLR) and Authentication Centre (AuC) functions or operations. HSS 131 can also communicate with MMEs 134 and 138 via respective S6a interfaces.

In some embodiments, HSS 131 can communicate with a user data repository (UDR)-labelled EPC-UDR 135 in FIG. 1—via a Ud interface. EPC-UDR 135 can store user credentials after they have been encrypted by AuC algorithms. These algorithms are not standardized (i.e., vendor-specific), such that encrypted credentials stored in EPC-UDR 135 are inaccessible by any other vendor than the vendor of HSS 131.

FIG. 2 illustrates a block diagram of an exemplary control plane (CP) protocol stack between a UE, an eNB, and an MME. The exemplary protocol stack includes Physical (PHY), Medium Access Control (MAC), Radio Link Control (RLC), Packet Data Convergence Protocol (PDCP), and Radio Resource Control (RRC) layers between the UE and eNB. The PHY layer is concerned with how and what characteristics are used to transfer data over transport channels on the LTE radio interface. The MAC layer provides data transfer services on logical channels, maps logical channels to PHY transport channels, and reallocates PHY resources to support these services. The RLC layer provides error detection and/or correction, concatenation, segmentation, and reassembly, reordering of data transferred to or from the upper layers. The PDCP layer provides ciphering/deciphering and integrity protection for both CP and user plane (UP), as well as other UP functions such as header compression. The exemplary protocol stack also includes non-access stratum (NAS) signaling between the UE and the MME.

The RRC layer controls communications between a UE and an eNB at the radio interface, as well as the mobility of a UE between cells in the E-UTRAN. After a UE is powered ON it will be in the RRC_IDLE state until an RRC connection is established with the network, at which time the UE will transition to RRC_CONNECTED state (e.g., where data transfer can occur). The UE returns to RRC_IDLE after the connection with the network is released. In RRC_IDLE state, the UE does not belong to any cell, no RRC context has been established for the UE (e.g., in E-UTRAN), and the UE is out of UL synchronization with the network. Even so, a UE in RRC_IDLE state is known in the EPC and has an assigned IP address.

Furthermore, in RRC_IDLE state, the UE's radio is active on a discontinous reception (DRX) schedule configured by upper layers. During DRX active periods (also referred to as "DRX On durations"), an RRC_IDLE UE receives system information (SI) broadcast by a serving cell, performs measurements of neighbor cells to support cell reselection, and monitors a paging channel for pages from the EPC via an eNB serving the cell in which the UE is camping.

A UE must perform a random-access (RA) procedure to move from RRC_IDLE to RRC_CONNECTED state. In RRC_CONNECTED state, the cell serving the UE is known and an RRC context is established for the UE in the serving eNB, such that the UE and eNB can communicate. For example, a Cell Radio Network Temporary Identifier (C-RNTI)—a UE identity used for signaling between UE and network—is configured for a UE in RRC_CONNECTED state.

3GPP Rel-10 supports bandwidths larger than 20 MHz. One important Rel-10 requirement is backward compatibility with Rel-8. As such, a wideband LTE Rel-10 carrier (e.g., >20 MHz) should appear as a plurality of carriers ("component carriers" or CCs) to a Rel-8 ("legacy") terminal.

Legacy terminals can be scheduled in all parts of the wideband Rel-10 carrier. One way to achieve this is by Carrier Aggregation (CA), whereby a Rel-10 terminal can receive multiple CCs, each preferably having the same structure as a Rel-8 carrier.

LTE dual connectivity (DC) was introduced in Rel-12. In DC operation, a UE in RRC_CONNECTED state consumes radio resources provided by at least two different network points connected to one another with a non-ideal backhaul. In LTE, these two network points may be referred to as a "Master eNB" (MeNB) and a "Secondary eNB" (SeNB). More generally, the terms master node (MN), anchor node, and MeNB can be used interchangeably, while the terms secondary node (SN), booster node, and SeNB can also be used interchangeably. DC can be viewed as a special case of CA, in which the aggregated carriers (or cells) are provided by network nodes that are physically separated and not connected via a robust, high-capacity connection.

Quality of Experience (QoE) measurements have been specified for UEs operating in LTE networks and in earlier-generation UMTS networks. Measurements in both networks operate according to the same high-level principles. Their purpose is to measure the experience of end users when using certain applications over a network. For example, QoE measurements for streaming services and for MTSI (Mobility Telephony Service for IMS) are supported in LTE.

RRC signaling is used to configure application layer measurements in UEs and to collect QoE measurement result files from the configured UEs. In particular, an application layer measurement configuration from the core network (e.g., EPC) or a network operations/administration/maintenance (OAM) function is encapsulated in a transparent container and sent to the serving eNB, which forwards it to a UE in an RRC message. Application layer measurements made by the UE are encapsulated in a transparent container and sent to the serving eNB in an RRC message. The serving eNB then forwards the container to a Trace Collector Entity (TCE) or a Measurement Collection Entity (MCE) associated with the EPC.

Currently the fifth generation ("5G") of cellular systems, also referred to as New Radio (NR), is being standardized within the Third-Generation Partnership Project (3GPP). NR is developed for maximum flexibility to support a variety of different use cases. These include enhanced mobile broadband (eMBB), machine type communications (MTC), ultra-reliable low latency communications (URLLC), side-link device-to-device (D2D), and several other use cases. 5G/NR technology shares many similarities with fourth-generation LTE. For example, both PHYs utilize similar arrangements of time-domain physical resources into 1-ms subframes that include multiple slots of equal duration, with each slot including multiple OFDM-based symbols. As another example, NR RRC layer includes RRC_IDLE and RRC__CONNECTED states, but adds another state known as RRC_INACTIVE. In addition to providing coverage via "cells," as in LTE, NR networks also provide coverage via "beams." In general, a DL "beam" is a coverage area of a network-transmitted RS that may be measured or monitored by a UE.

DC is also envisioned as an important feature for 5G/NR networks. Several DC (or more generally, multi-connectivity) scenarios have been considered for NR. These include NR-DC that is similar to LTE-DC discussed above, except that both the MN and SN (referred to as "gNBs") employ the NR interface to communicate with the UE. In addition, various multi-RAT DC (MR-DC) scenarios have been considered, whereby a UE can be configured to uses resources provided by two different nodes, one providing E-UTRA/LTE access and the other one providing NR access.

QoE measurements will also be needed for UEs operating in NR networks, including in MR-DC operation. However, the existing framework for QoE measurements does not address the various options and/or complexities of a UE's connectivity with networks that include both LTE and NR. Furthermore, the existing framework does not provide the level of granularity and/or control for QoE measurements in these networks. Solutions to these problems, issues, and/or drawbacks are needed.

SUMMARY

Embodiments of the present disclosure provide specific improvements to QoE measurements in a wireless network, such as by facilitating solutions to overcome exemplary problems summarized above and described in more detail below.

Embodiments of the present disclosure include methods (e.g., procedures) for configuring quality of experience (QoE) measurements by user equipment (UEs) in a wireless network. These exemplary methods can be performed by a first radio access network node (RNN, e.g., base station, eNB, gNB, ng-eNB, en-gNB, CU, DU, etc., or component thereof) in the wireless network (e.g., E-UTRAN, NG-RAN).

These exemplary methods can include sending, to a UE connected to the first RNN, a QoE measurement configuration for one or more services provided by an application layer of the UE. These exemplary methods can also include sending, to the UE, a configuration for access-layer multi-connectivity of the UE with a second RNN in the wireless network. These exemplary methods can also include receiving one or more QoE measurement reports, in accordance with the QoE measurement configuration, from at least one of the UE and the second RNN. The QoE measurement reports include measurements made by the UE while in multi-connectivity with the first and second RNNs.

In some embodiments, these exemplary methods can also include receiving, from the UE, an indication of whether data on which the UE will perform measurements for the one or more services is carried by the first RNN, by the second RNN, or by both the first and second RNNs. In some of these embodiments, these exemplary methods can also include sending the QoE measurement configuration to the second RNN when the indication indicates that the data on which the UE will perform the measurements is carried at least in part by the second RNN.

In some embodiments, these exemplary methods can also include sending, to the second RNN, a request to establish or to modify access-layer multi-connectivity with the UE. In such embodiments, the request can include the QoE measurement configuration.

In some embodiments, the QoE measurement configuration can include a QoE reporting configuration that indicates that QoE measurement reports should be sent by the UE according to one of the following options:
  only to the first RNN;
  only to the second RNN;
  to one or more of the first or second RNN as selected by the UE;
  as duplicates to both the first and second RNNs; and
  to the RNN that carried the data on which the measurements were performed.

In some embodiments, the multi-connectivity includes a master cell group (MCG) for the first RNN and a secondary cell group (SCG) for the second RNN. In such embodiments, the QoE measurement reports can be received from the UE via a split SCG signaling radio bearer (SRB) or via a split MCG SRB.

In some embodiments, these exemplary methods can also include sending, to the second RNN, a request for QoE measurement reports received by the second RNN from the UE in accordance with the QoE measurement configuration. In such embodiments, the receiving operations can include receiving, from the second RNN, a response including one or more of the following: at least one of the requested QoE measurement reports; and an indication of availability or non-availability of the requested QoE measurement reports.

In some embodiments, these exemplary methods can also include receiving, from the second RNN, an unsolicited indication of availability of QoE measurement reports received by the second RNN from the UE. In such embodiments, the request for the QoE measurement reports can be sent in response to the unsolicited indication. In some embodiments, these exemplary methods can also include, based on receiving a response including an indication of non-availability, performing one or more of the following operations:

configuring QoE measurements by one or more other UE;

notifying a measurement collection entity (MCE) of the non-availability; and refraining from sending the second RNN one or more further QoE measurement configurations for the UE.

In some embodiments, these exemplary methods can also include, based on at least one of the QoE measurement reports received from the second RNN, initiating a procedure with a third RNN to operate in access-layer multi-connectivity with the UE and the first RNN; sending the QoE measurement configuration to the third RNN. For example, the procedure can be an SN change, an MN change, or an SN addition.

In some embodiments, these exemplary methods can also include sending, to the second RNN, one or more of the QoE measurement reports that were received from the UE. In some embodiments, these operations can be based on determining that the one more QoE measurements reports received from the UE include measurements made by the UE on data carried by the second RNN. In some of these embodiments, each of the QoE measurement reports received from second RNN or sent to the second RNN includes an identifier of the UE.

Other embodiments include exemplary methods (e.g., procedures) for receiving QoE measurements by UEs in a wireless network, according to various exemplary embodiments of the present disclosure. These exemplary methods can be performed by a second RNN (e.g., base station, eNB, gNB, ng-eNB, en-gNB, CU, DU, etc., or component thereof) in the wireless network (e.g., E-UTRAN, NG-RAN).

These exemplary methods can include receiving, from a first RNN in the wireless network, a request to establish access-layer multi-connectivity with a UE and the first RNN. These exemplary methods can also include receiving, from the first RNN, a QoE measurement configuration for measurements by the UE in relation to one or more services provided by an application layer of the UE. These exemplary methods can also include receiving one or more QoE measurement reports, in accordance with the QoE measurement configuration, from at least one of the UE and the first RNN. The QoE measurement reports include measurements made by the UE while in multi-connectivity with the first and second RNNs.

In some embodiments, the multi-connectivity includes a master cell group (MCG) for the first RNN and a secondary cell group (SCG) for the second RNN. In such embodiments, the QoE measurement reports can be received from the UE via an SCG SRB, via a split SCG SRB, or via a split MCG SRB.

In some embodiments, the QoE measurement configuration can include a QoE reporting configuration that indicates that QoE measurement reports should be sent by the UE according to one of the following options:

only to the first RNN;

only to the second RNN;

to one or more of the first or second RNN as selected by the UE;

as duplicates to both the first and second RNNs; and to the RNN that carried the data on which the measurements were performed.

In some embodiments, these exemplary methods can also include receiving, from the first RNN, a request for QoE measurement reports received by the second RNN from the UE in accordance with the QoE measurement configuration; and sending, to the first RNN, a response including at least one of the QoE measurement reports received from the UE and/or an indication of availability or non-availability of the requested QoE measurement reports.

In some of these embodiments, these exemplary methods can also include sending, to the first RNN, an unsolicited indication of availability of QoE measurement reports received by the second RNN from the UE. In such embodiments, the request can be received subsequent to (the unsolicited indication. In some of these embodiments, each of the QoE measurement reports received from first RNN or sent to the first RNN includes an identifier of the UE.

In some embodiments, the one more QoE measurements reports include at least one QoE measurement report, received from the first RNN, that includes measurements made by the UE on data carried by the second RNN.

Other embodiments include exemplary methods (e.g., procedures) for performing QoE measurements configured by a wireless network. These exemplary methods can be performed by a UE (e.g., wireless device, IoT device, etc.) operating in the wireless network (e.g., E-UTRAN, NG-RAN).

These exemplary methods can include, while connected to a first radio access network node (RNN) in the wireless network, receiving a QoE measurement configuration one or more services provided by an application layer of the UE. These exemplary methods can also include receiving a configuration for access-layer multi-connectivity of the UE with a second RNN in the wireless network. These exemplary methods can also include, while in layer multi-connectivity with the first and second RNNs, performing measurements for the one or more services in accordance with the QoE measurement configuration. These exemplary methods can also include sending one or more QoE measurement reports, in accordance with the QoE measurement configuration, to at least one of the first RNN and the second RNN.

In some embodiments, the multi-connectivity includes a master cell group (MCG) for the first RNN and a secondary cell group (SCG) for the second RNN. In such embodiments, each QoE measurement reports can be sent by the UE according to one of the following:

to the second RNN via an SCG signaling radio bearer, SRB;

to the second RNN via a split SCG SRB or a split MCG SRB; or to the first RNN via the split SCG SRB or the split MCG SRB.

In some embodiments, these exemplary methods can also include sending, to the first RNN, an indication of whether data on which the UE will perform measurements for the one or more services is carried by the first RNN, by the second RNN, or by both the first and second RNNs.

In some embodiments, the QoE measurement configuration can include a QoE reporting configuration that indicates that QoE measurement reports should be sent by the UE according to one of the following options:

only to the first RNN;

only to the second RNN;

to one or more of the first or second RNN as selected by the UE;

as duplicates to both the first and second RNNs; and to the RNN that carried the data on which the measurements were performed.

In some embodiments, these exemplary methods can also include selecting at least one of the first and second RNNs to receive the QoE measurement reports based on one or more of the following: a QoE reporting configuration provided by the first RNN; quality of the respective radio links to the first and second RNNs; and data rate of the respective radio links to the first and second RNNs.

Other embodiments include first and second RNNs (e.g., base stations, eNBs, gNBs, ng-eNBs, en-gNBs, CUs, DUs, etc., or components thereof) and UEs (e.g., wireless devices, IoT devices, etc.) configured to perform operations corresponding to any of the exemplary methods described herein. Other embodiments include non-transitory, computer-readable media storing program instructions that, when executed by processing circuitry, configure such RNNs and UEs to perform operations corresponding to any of the exemplary methods described herein.

These and other embodiments of the present disclosure improve configuration and reporting of QoE measurements by a UE in multi-connectivity. In general, the UE can send QoE measurements to a preferred and/or optimum network node according to various conditions and/or criteria. As a more specific example, if the MN is an LTE eNB and the SN is an NR gNB, the UE can more efficiently transfer the QoE measurement files via NR than via LTE. By improving the configuration and reporting of QoE measurements, embodiments enable a network to improve application-level QoE for users based on such measurements.

These and other objects, features, and advantages of embodiments of the present disclosure will become apparent upon reading the following Detailed Description in view of the Drawings briefly described below.

BRIEF DESCRIPTION OF THE DRAWINGS

FIG. 1 is a high-level block diagram of an exemplary architecture of the LTE E-UTRAN and EPC network, as standardized by 3GPP.

FIG. 2 illustrates a block diagram of an exemplary control plane (CP) protocol stack between a UE, an eNB, and an MME.

FIGS. 3, 4A, and 4B illustrate various aspects of dual connectivity (DC) in an LTE network.

FIG. 5 shows a high-level views of an exemplary 5G network architecture.

FIG. 8 is a block diagram showing a high-level comparison of EN-DC, NE-DC, and NGEN-DC options.

FIGS. 16A-D show various procedures between a UTRAN and a UE for QoE measurements in a legacy UMTS network.

FIGS. 17A-C illustrate various aspects of QoE measurement configuration for a UE in an LTE network.

FIGS. 18A-C illustrate various aspects of QoE measurement collection for a UE in an LTE network.

FIGS. 20A-B show exemplary ASN.1 data structures for RadioBearerConfig and RLC-BearerConfig information elements (IEs), respectively, according to various exemplary embodiments of the present disclosure.

FIG. 21, which includes FIGS. 21A-B, is a flow diagram of an exemplary method (e.g., procedure) for a first RAN node (RNN, e.g., base station, eNB, gNB, ng-eNB, en-gNB, CU, DU, etc., or component thereof), according to various exemplary embodiments of the present disclosure.

FIG. 22 is a flow diagram of an exemplary method (e.g., procedure) for a second RNN (e.g., base station, eNB, gNB, ng-eNB, en-gNB, CU, DU, etc., or component thereof), according to various exemplary embodiments of the present disclosure.

FIG. 23 is a flow diagram of an exemplary method (e.g., procedure) for a user equipment (UE, e.g., wireless device, IoT device, etc., or component thereof), according to various exemplary embodiments of the present disclosure.

FIGS. 29-32 are flow diagrams of exemplary methods and/or procedures for transmission and/or reception of user data, according to various exemplary embodiments of the present disclosure.

DETAILED DESCRIPTION

Figures 1, 2, 3:
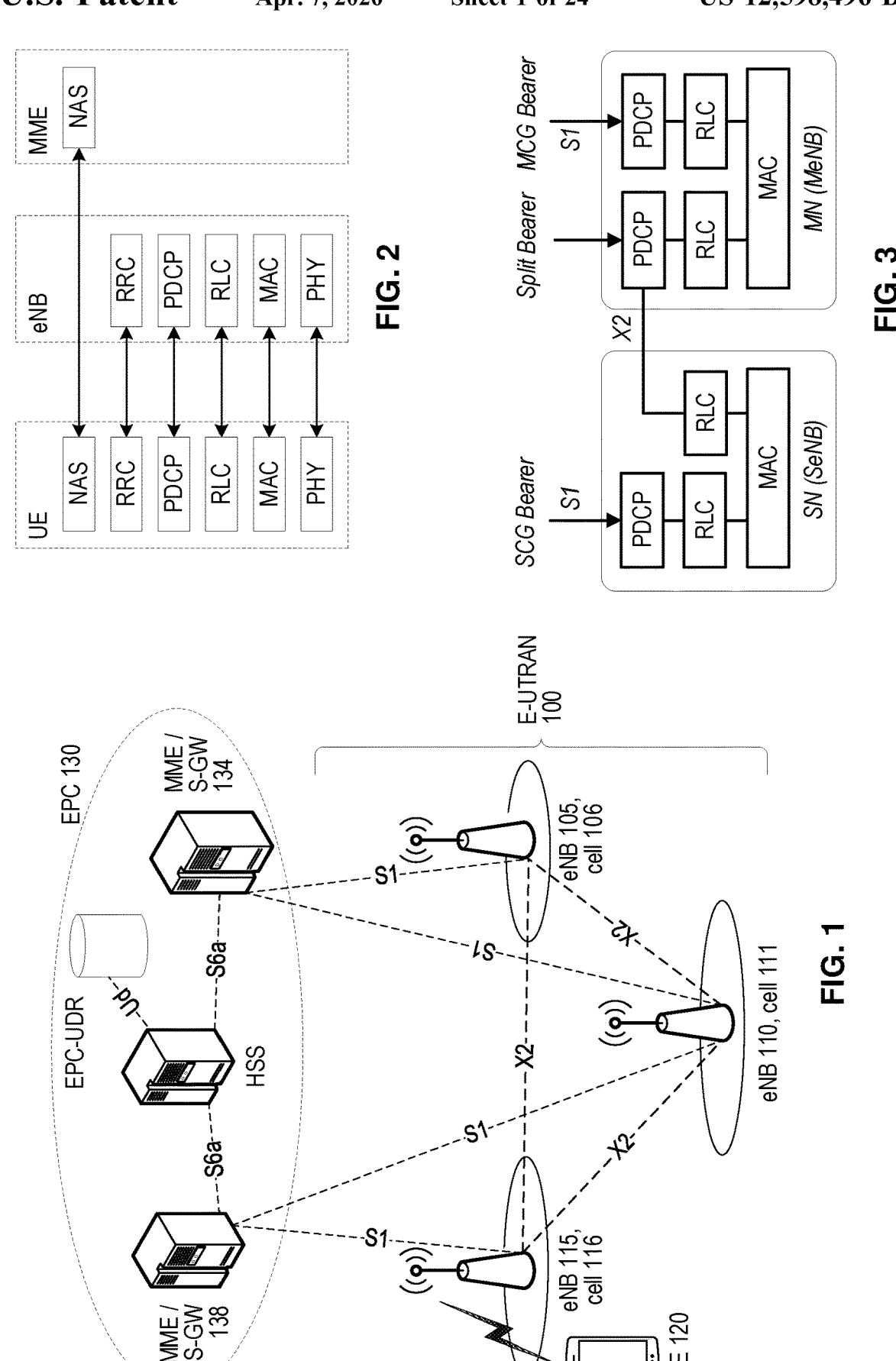

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

Furthermore, the following terms are used throughout the description given below:

Radio Node: As used herein, a "radio node" can be either a "radio access node" or a "wireless device."

Radio Access Node: As used herein, a "radio access node" (or equivalently "radio network node," "radio access network node," or "RAN node") can be any node in a radio access network (RAN) of a cellular communications network that operates to wirelessly transmit and/or receive signals. Some examples of a radio access node include, but are not limited to, a base station (e.g., a New Radio (NR) base station (gNB/en-gNB) in a 3GPP Fifth Generation (5G) NR network or an enhanced or evolved Node B (eNB/ng-eNB) in a 3GPP LTE network), base station distributed components (e.g., CU and DU), base station control- and/or user-plane components (e.g., CU-CP, CU-UP), a high-power or macro base station, a low-power base station (e.g., micro, pico, femto, or home base station, or the like), an integrated access backhaul (IAB) node, a transmission point, a remote radio unit (RRU or RRH), and a relay node.

Core Network Node: As used herein, a "core network node" is any type of node in a core network. Some examples of a core network node include, e.g., a Mobility Management Entity (MME), a serving gateway (SGW), a Packet Data Network Gateway (P-GW), an access and mobility management function (AMF), a session management function (AMF), a user plane function (UPF), a Service Capability Exposure Function (SCEF), or the like.

Wireless Device: As used herein, a "wireless device" (or "WD" for short) is any type of device that has access to (i.e., is served by) a cellular communications network by communicate wirelessly with network nodes and/or other wireless devices. Communicating wirelessly can involve transmitting and/or receiving wireless signals using electromagnetic waves, radio waves, infrared waves, and/or other types of signals suitable for conveying information through air. Some examples of a wireless device include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc. Unless otherwise noted, the term "wireless device" is used interchangeably herein with the term "user equipment" (or "UE" for short).

Network Node: As used herein, a "network node" is any node that is either part of the radio access network (e.g., a radio access node or equivalent name discussed above) or of the core network (e.g., a core network node discussed above) of a cellular communications network. Functionally, a network node is equipment capable, configured, arranged, and/or operable to communicate directly or indirectly with a wireless device and/or with other network nodes or equipment in the cellular communications network, to enable and/or provide wireless access to the wireless device, and/or to perform other functions (e.g., administration) in the cellular communications network.

Note that the description herein focuses on a 3GPP cellular communications system and, as such, 3GPP terminology or terminology similar to 3GPP terminology is oftentimes used. However, the concepts disclosed herein are not limited to a 3GPP system. Furthermore, although the term "cell" is used herein, it should be understood that (particularly with respect to 5G NR) beams may be used instead of cells and, as such, concepts described herein apply equally to both cells and beams.

As briefly mentioned above, the existing framework for QoE measurements does not address the various options and/or complexities of a UE's connectivity with networks that include both LTE and NR. Furthermore, the existing framework does not provide the level of granularity and/or control for QoE measurements in these networks. This is discussed in more detail below, following a description of NR network architecture and various dual connectivity (DC) aspects.

In DC, the UE is configured with a Master Cell Group (MCG) associated with the MN and a Secondary Cell Group (SCG) associated with the SN. Each of the CGs is a group of serving cells that includes one MAC entity, a set of logical channels with associated RLC entities, a primary cell (PCell), and optionally one or more secondary cells (SCells). The term "Special Cell" (or "SpCell" for short) refers to the PCell of the MCG or the PSCell of the SCG depending on whether the UE's MAC entity is associated with the MCG or the SCG, respectively. In non-DC operation (e.g., CA), SpCell refers to the PCell. An SpCell is always activated and supports physical uplink control channel (PUCCH) transmission and contention-based random access by UEs.

The MN provides system information (SI) and terminates the control plane connection towards the UE and, as such, is the controlling node of the UE, including handovers to and from SNs. In LTE DC, for example, the MN terminates the connection between the eNB and the Mobility Management Entity (MME) for the UE. An SN provides additional radio resources (e.g., bearers) for radio resource bearers include MCG bearers, SCG bearers, and split bearers that have resources from both MCG and SCG. The reconfiguration, addition, and removal of SCells can be performed by RRC. When adding a new SCell, dedicated RRC signaling is used to send the UE all required SI of the SCell, such that UEs need not acquire SI directly from the SCell broadcast. It is also possible to support CA in either or both of MCG and SCG. In other words, either or both of the MCG and the SCG can include multiple cells working in CA.

FIG. 3 shows an aggregated user plane (UP) protocol stack for LTE DC, while FIG. 4A shows the inter-eNB connectivity for the LTE DC UP. The UP aggregation shown in FIG. 3 achieves benefits such as increasing the throughput for users with good channel conditions and the capability of receiving and transmitting at higher data rates than can be supported by a single node, even without a low-latency backhaul connection between MeNB/MN and SeNB/SN.

As shown in FIG. 3, the LTE DC UP includes three different types of bearers. MCG bearers are terminated in the MN, and the S1-U connection for the corresponding bearer (s) to the S-GW is terminated in the MN (shown in FIG. 4A). The SN is not involved in the transport of UP data for MCG bearers. Likewise, SCG bearers are terminated in the SN, which can be directly connected with the S-GW via S1-U (as shown in FIG. 4A). The MN is not involved in the transport of UP data for SCG bearers. An S1-U connection between S-GW and SN is only present if SCG bearers are configured. Finally, split bearers are also terminated in the MN, with PDCP data being transferred between MN and SN via X2-U interface (shown in FIG. 4A). Both SN and MN are involved in transmitting data for split bearers.

FIG. 4B shows the inter-eNB CP connectivity for LTE DC. In this arrangement, all MME signaling is carried over the MeNB's S1-MME interface to the MME, with the SeNB's signaling also carried over the X2-C interface with the MeNB. The network's RRC connection with the UE is handled only by the MeNB, such that SRBs are always configured as MCG bearer type and only use radio resources of the MeNB. However, the MeNB can also configure the UE based on input from the SeNB and, in this manner, the SeNB can indirectly control the UE.

FIG. 5 illustrates a high-level view of the 5G network architecture, consisting of a Next Generation RAN (NG-RAN) 599 and a 5G Core (5GC) 598. NG-RAN 599 can include a set of gNodeB's (gNBs) connected to the 5GC via one or more NG interfaces, such as gNBs 500, 550 connected via interfaces 502, 552, respectively. In addition, the gNBs can be connected to each other via one or more Xn interfaces, such as Xn interface 540 between gNBs 500 and 550. With respect the NR interface to UEs, each of the gNBs can support frequency division duplexing (FDD), time division duplexing (TDD), or a combination thereof.

NG-RAN 599 is layered into a Radio Network Layer (RNL) and a Transport Network Layer (TNL). The NG-RAN architecture, i.e., the NG-RAN logical nodes and interfaces between them, is defined as part of the RNL. For each NG-RAN interface (NG, Xn, F1) the related TNL protocol and the functionality are specified. The TNL provides services for user plane transport and signaling transport. In some exemplary configurations, each gNB is connected to all 5GC nodes within an "AMF Region," which is defined in 3GPP TS 23.501 (v16.4.0). If security protection for CP and UP data on TNL of NG-RAN interfaces is supported, NDS/IP shall be applied.

The NG RAN logical nodes shown in FIG. 5 include a central (or centralized) unit (CU or gNB-CU) and one or more distributed (or decentralized) units (DU or gNB-DU). For example, gNB 500 includes gNB-CU 510 and gNB-DUs 520 and 540. CUs (e.g., gNB-CU 510) are logical nodes that host higher-layer protocols and perform various gNB functions such controlling the operation of DUs. Each DU is a logical node that hosts lower-layer protocols and can include, depending on the functional split, various subsets of the gNB functions. As such, each of the CUs and DUs can include various circuitry needed to perform their respective functions, including processing circuitry, transceiver circuitry (e.g., for communication), and power supply circuitry. Moreover, the terms "central unit" and "centralized unit" are used interchangeably herein, as are the terms "distributed unit" and "decentralized unit."

A gNB-CU connects to gNB-DUs over respective F1 logical interfaces, such as interfaces 522 and 532 shown in FIG. 5. The gNB-CU and connected gNB-DUs are only visible to other gNBs and the 5GC as a gNB. In other words, the F1 interface is not visible beyond gNB-CU. In the gNB split CU-DU architecture illustrated by FIG. 4, DC can be achieved by allowing a UE to connect to multiple DUs served by the same CU or by allowing a UE to connect to multiple DUs served by different CUs.

DC is also envisioned as an important feature for 5G/NR networks. 3GPP TR 38.804 (v14.0.0) describes various exemplary dual-connectivity (DC) scenarios or configurations in which the MN and SN can apply either NR RAT, LTE RAT, or both, and can connect to either EPC or 5GC. The following terminology is used to describe these exemplary DC scenarios or configurations:

DC: LTE DC (i.e., both MN and SN employ LTE, as discussed above);

EN-DC: LTE-NR DC where MN (eNB) employs LTE and SN (gNB) employs NR, and both are connected to EPC.

NGEN-DC: LTE-NR dual connectivity where a UE is connected to one ng-eNB that acts as a MN and one gNB that acts as a SN. The ng-eNB is connected to the 5GC and the gNB is connected to the ng-eNB via the Xn interface.

NE-DC: LTE-NR dual connectivity where a UE is connected to one gNB that acts as a MN and one ng-eNB that acts as a SN. The gNB is connected to 5GC and the ng-eNB is connected to the gNB via the Xn interface.

NR-DC (or NR-NR DC): both MN and SN employ NR and connect to 5GC via NG.

MR-DC (multi-RAT DC): a generalization of the Intra-E-UTRA Dual Connectivity (DC) described in 3GPP TS 36.300 (v16.0.0), where a multiple Rx/Tx UE may be configured to utilize resources provided by two different nodes connected via non-ideal backhaul, one providing E-UTRA access and the other one providing NR access. One node acts as the MN and the other as the SN, with one using LTE and the other using NR. The MN and SN are connected via a network interface and at least the MN is connected to the core network. EN-DC, NE-DC, and NGEN-DC are different example cases of MR-DC.

Figure 6:
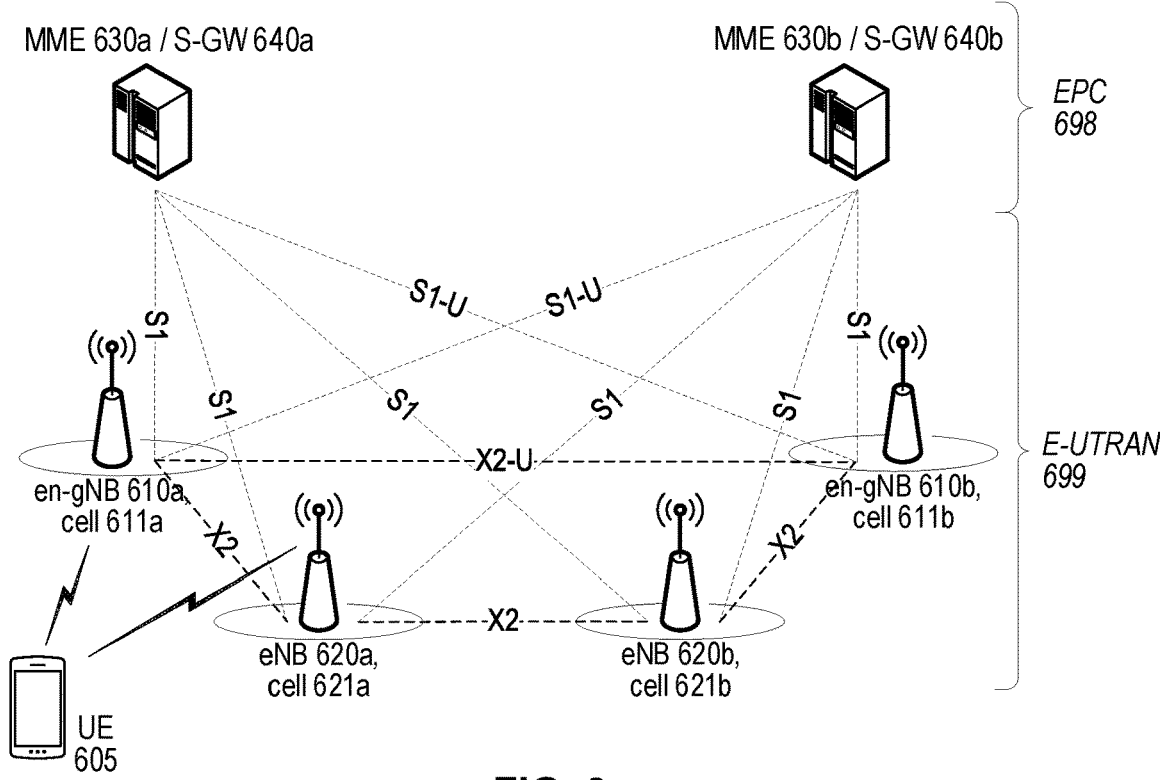
FIGS. 6-7 show high-level views of exemplary network architectures that support multi-RAT DC (MR-DC) using EPC and 5GC, respectively.

FIG. 6 shows a high-level view of an exemplary network architecture that supports EN-DC, including an E-UTRAN 699 and an EPC 698. As shown in the figure, E-UTRAN 699 can include en-gNBs 610 (e.g., 610a,b) and eNBs 620 (e.g., 620a,b) that are interconnected with each other via respective X2 (or X2-U) interfaces. The eNBs 620 can be similar to those shown in FIG. 1, while the ng-eNBs can be similar to the gNBs shown in FIG. 5 except that they connect to EPC 698 via an S1-U interface rather than to a 5GC via an X2 interface. The eNBs also connect to EPC 698 via an S1 interface, similar to the arrangement shown in FIG. 1. More specifically, en-gNBs 610 (e.g., 610a,b) and eNBs 620 (e.g., 620a,b) connect to MMEs (e.g., MMEs 630a,b) and S-GWs (e.g., S-GWs 640a,b) in EPC 698.

Each of the en-gNBs and eNBs can serve a geographic coverage area including one more cells, including cells 611*a-b* and 621*a-b* shown as exemplary in FIG. 6. Depending on the particular cell in which it is located, a UE 605 can communicate with the en-gNB or eNB serving that particular cell via the NR or LTE radio interface, respectively. In addition, UE 605 can be in EN-DC connectivity with a first cell served by an eNB and a second cell served by an en-gNB, such as cells 620*a* and 610*a* shown in FIG. 6.

Figure 7:
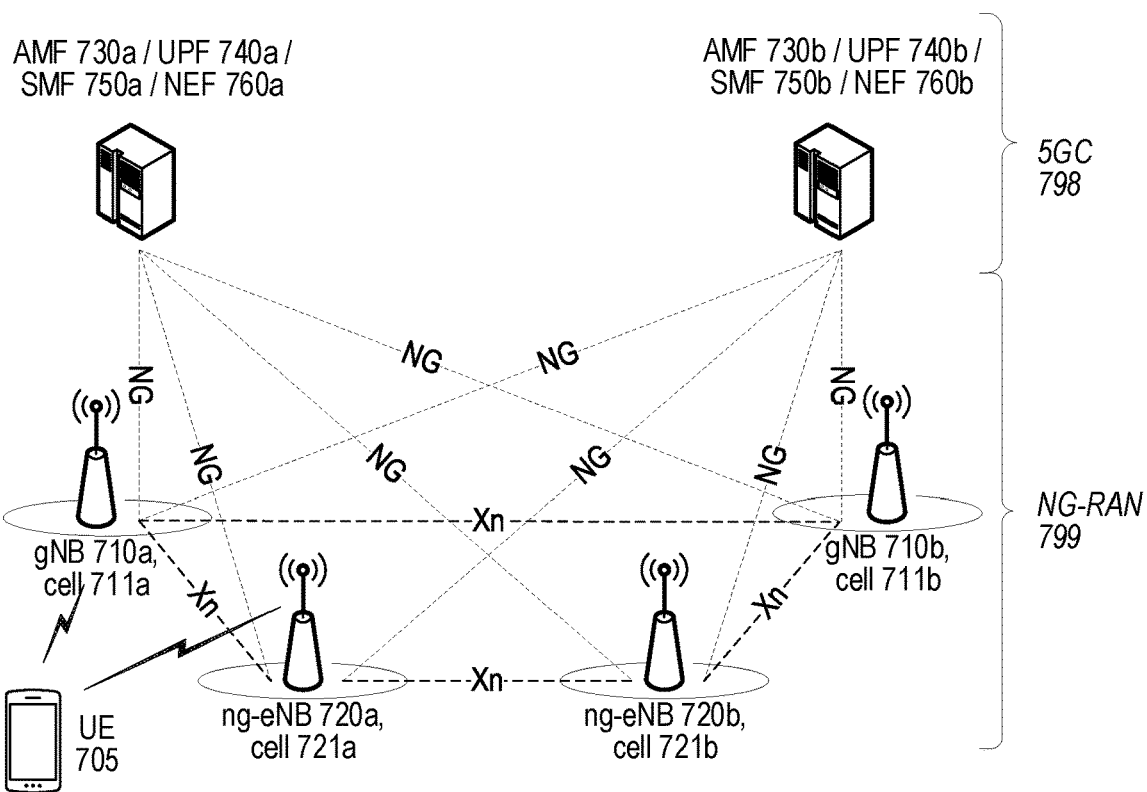

FIG. 7 shows a high-level view of an exemplary network architecture that supports MR-DC configurations based on a 5GC. More specifically, FIG. 7 shows an NG-RAN 799 and a 5GC 798. NG-RAN 799 can include gNBs 710 (e.g., 710*a,b*) and ng-eNBs 720 (e.g., 720*a,b*) that are interconnected with each other via respective Xn interfaces. The gNBs and ng-eNBs are also connected via the NG interfaces to 5GC 798, more specifically to the AMF (Access and Mobility Management Function) 730 (e.g., AMFs 730*a,b*) via respective NG-C interfaces and to the UPF (User Plane Function) 740 (e.g., UPFs 740*a,b*) via respective NG-U interfaces. Moreover, the AMFs 730*a,b* can communicate with one or more session management functions (SMFs, e.g., SMFs 750*a,b*) and network exposure functions (NEFs, e.g., NEFs 760*a,b*).

Each of the gNBs 710 can be similar to those shown in FIG. 5, while each of the ng-eNBs can be similar to the eNBs shown in FIG. 1 except that they connect to 5GC 798 via an NG interface rather than to EPC via an S1 interface. Each of the gNBs and ng-eNBs can serve a geographic coverage area including one more cells, including cells 711*a-b* and 721*a-b* shown as exemplary in FIG. 7. The gNBs and ng-eNBs can also use various directional beams to provide coverage in the respective cells. Depending on the particular cell in which it is located, a UE 705 can communicate with the gNB or ng-eNB serving that particular cell via the NR or LTE radio interface, respectively. In addition, UE 705 can be in MR-DC connectivity with a first cell served by an ng-eNB and a second cell served by a gNB, such as cells 720*a* and 710*a* shown in FIG. 7.

FIG. 8 is a block diagram showing a high-level comparison of the EN-DC, NE-DC, and NGEN-DC options briefly mentioned above. In EN-DC (A), the NR en-gNB (SN) is operating in NSA mode and has no direct control-plane (CP) interface with the EPC. Rather, the en-gNB's CP connection to the EPC is indirect via the X2 interface to the eNB (MN), which has a CP connection with the EPC via S1-C interface and with the UE (e.g., via Uu interface). Both the eNB and the en-gNB have UP connections with the EPC via S1-U interface and with the UE (e.g., via Uu interface).

In NE-DC (B), the LTE ng-eNB (SN) has no direct control-plane (CP) interface with the 5GC. Rather, the ng-eNB's CP connection to the 5GC is indirect via the Xn interface to the gNB (MN), which has a CP connection with the 5GC via the NG-C interface and with the UE (e.g., via Uu interface). Both the gNB and the ng-eNB have UP connections with the 5GC via NG-U interface and with the UE (e.g., via Uu interface).

In NGEN-DC (C), the NR gNB (SN) has no direct control-plane (CP) interface with the 5GC. Rather, the gNB's CP connection to the 5GC is indirect via the Xn interface to the ng-eNB (MN), which has a CP connection with the 5GC via NG-C interface and with the UE (e.g., via Uu interface). Both the gNB and the ng-eNB have UP connections with the 5GC via NG-U interface and with the UE (e.g., via Uu interface).

FIGS. 9-15 illustrate various procedures related to multi-connectivity for a UE. These procedures include various messages exchanged between UE, MN, SN, and other network nodes. Although the following description uses specific names for these messages, these names are intended to be exemplary rather than definitive.

Figure 9:
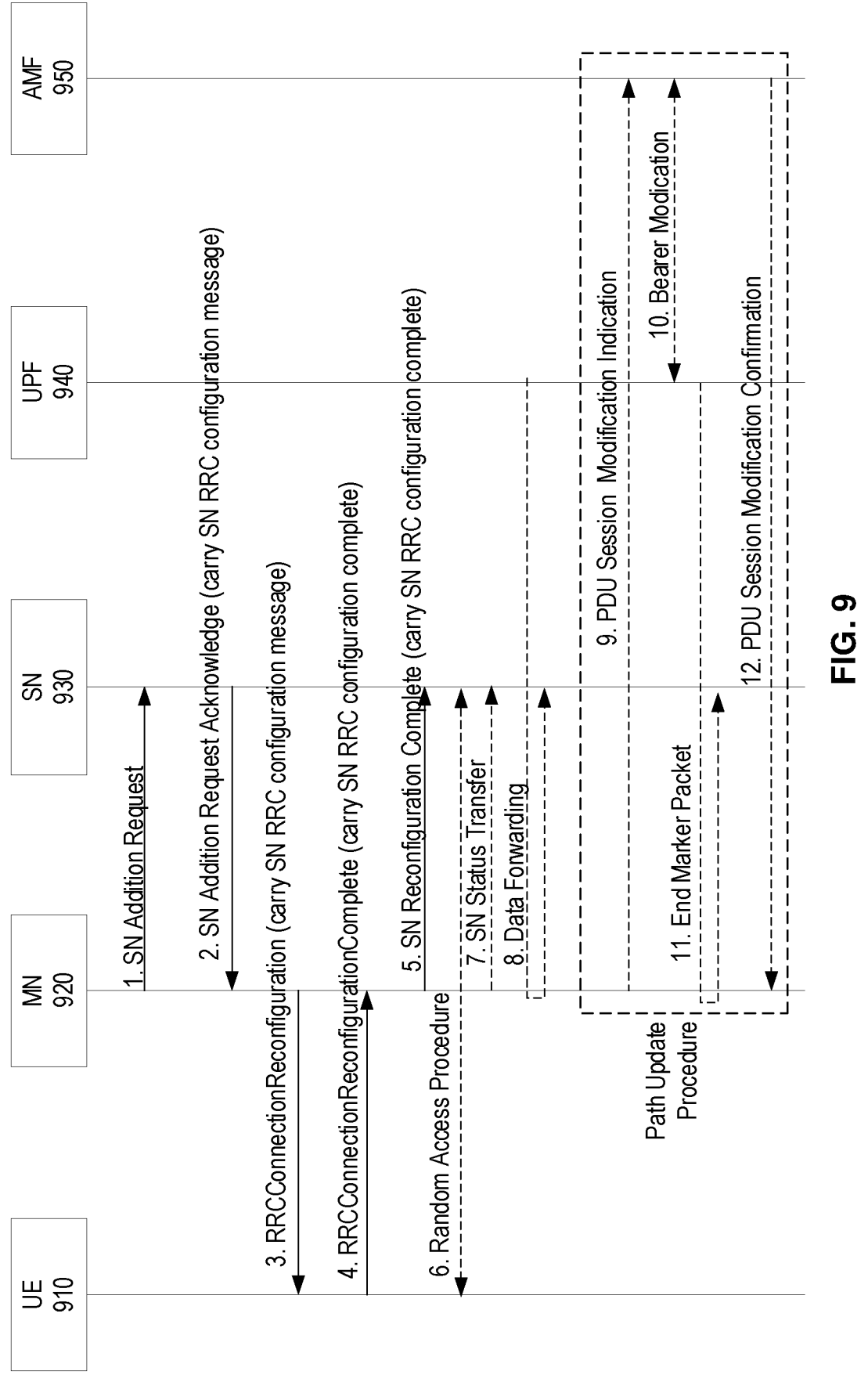
FIG. 9 illustrates an exemplary SN Addition procedure for MR-DC utilizing a 5GC.

An SN Addition procedure is initiated by the MN and is used to establish a UE context at the SN in order to provide radio resources from the SN to the UE. For bearers requiring SCG radio resources, this procedure is used to add at least the initial SCG serving cell of the SCG. This procedure can also be used to configure an SN terminated MCG bearer (where no SCG configuration is needed). FIG. 9 illustrates an exemplary SN Addition procedure for MR-DC cases utilizing a 5GC. As shown in FIG. 9, the procedure involves a UE (910), a MN (920), an SN (930), a user plane function (UPF, 940), and an access and mobility management function (AMF, 950). The UPF and AMF are functions in the 5GC.

The SN Addition procedure shown in FIG. 9 is initiated by the MN and is used to establish a UE context at the SN to facilitate the SN providing radio resources to the UE. For bearers requiring SCG radio resources, this procedure can be used to add at least the initial SCG serving cell of the SCG. This procedure can also be used to configure an SN-terminated MCG bearer (where no SCG configuration is needed). The operations shown in FIG. 9 are labelled numerically, but this numbering is used to facilitate the following description rather than to imply or require a particular order unless expressly stated otherwise. Dashed lines indicate optional operations that may depend on one or more conditions.

In operation 1, the MN sends an SN Addition Request message to request the target SN to allocate radio resources for one or more specific PDU Sessions/QoS Flows, indicating QoS Flows characteristics (QoS Flow Level QoS parameters, PDU session level transport network layer (TNL) address information, and PDU session level Network Slice info). For example, the TNL address information can include a GPRS Tunneling Protocol (GTP) Tunnel Endpoint Identifier (TEID) and a TNL Internet Protocol (IP) address, such as defined in 3GPP TS 38.423 (v16.1.0). This TNL address information generally identifies a "tunnel." Accordingly, in the following description, the terms "tunnel information," "tunnel identifier(s)," and "TNL address information" are used interchangeably.

In addition, for bearers requiring SCG radio resources, MN indicates the requested SCG configuration information, including the entire UE capabilities and the UE capability coordination result. In this case, the MN also provides the latest measurement results for the SN to use when choosing and configuring the SCG cell(s). The MN can also request the SN to allocate radio resources for split SRB operation. The MN can also provide the needed security information to the SN (e.g., even if no SN-terminated bearers are setup) to enable SRB3 to be setup based on SN decision. For bearer options that require Xn-U resources between the MN and the SN, MN can also provide Xn-U TNL address information, e.g., Xn-U DL TNL address information for SN-terminated bearers and Xn-U UL TNL address information for MN terminated bearers. The SN may reject the request.

In operation 2, if the RRM entity in the SN is able to admit the resource request, it allocates respective radio resources and, dependent on the bearer type options, respective transport network resources. For bearers requiring SCG radio resources the SN triggers UE Random Access so that synchronization of the SN radio resource configuration can be performed. The SN decides the PScell and other SCG SCells and provides the new SCG radio resource configuration to the MN in a SN RRC configuration message contained in the SN Addition Request Acknowledge message. In case of bearer options that require Xn-U resources between the MN and the SN, the SN provides Xn-U TNL address information for the respective E-RAB, Xn-U UL TNL address information for SN-terminated bearers, Xn-U DL TNL address information for MN terminated bearers. For SN-terminated bearers, the SN provides the NG-U DL TNL address information for the respective PDU Session and security algorithm. If SCG radio resources have been requested, the SCG radio resource configuration is provided.

In operation 3, the MN sends an RRCConnectionReconfiguration message to the UE including the SN RRC configuration message, preferably without modifying it. In operation 4, the UE applies the new configuration and replies to MN with an RRCConnectionReconfiguration complete message, including a SN RRC response message for SN, if needed. In case the UE is unable to comply with (part of) the configuration included in the RRCConnection-Reconfiguration message, it performs the reconfiguration failure procedure. In operation 5, the MN informs the SN that the UE has completed the reconfiguration procedure successfully via SN Reconfiguration Complete message, including the encoded SN RRC response message, if received from the UE.

In operation 6, if configured with bearers requiring SCG radio resources, the UE performs random access (RA) towards the PSCell configured by the SN. The order the UE sends the MN RRC reconfiguration complete message and performs RA towards the SCG is not defined. A successful RA towards the SCG is not required for a successful completion of the RRC Connection Reconfiguration procedure. In operation 7, in case of SN-terminated bearers using RLC AM, the MN sends SN Status Transfer to the SN.

In operation 8, in case of SN-terminated bearers using RLC AM, and dependent on the bearer characteristics of the respective QoS Flows, the MN may take actions to minimize service interruption due to activation of MR-DC (Data forwarding). In operations 9-12, for SN-terminated bearers, the update of the UP path towards the 5GC is performed via PDU session Path Update procedure.

In the SN Addition Request message (operation 1), the MN provides the list of the UE's QoS flows/bearers that it wants to be handled by the SN (e.g., either as SN-terminated flows or MN-terminated bearers) in the PDU session resources to be added List IE (Information element), along with the PDU Session Resource Setup Info—SN terminated and PDU Session Resource Setup Info—MN terminated IEs that are part of it. Exemplary contents of these IEs are shown respectively in Tables 1-3 below.

TABLE 1

PDU session resources to be added list.

| PDU Session Resources To Be Added List | Presence | 1 |
| --- | --- | --- |
| >PDU Session Resources To Be Added Item | | 1 . . . <maxnoofPDUSessions> |
| >>PDU Session ID | M | |
| >>S-NSSAI | M | |
| >>Bearer Configurations To Be Added | | 1 . . . <maxnoofBearerConfigs> |
| >>>CHOICE Bearer Configuration | M | |
| >>>>SN terminated Bearer | | |
| >>>>>PDU Session Resource Setup Info-SN-terminated | M | |
| >>>>MN terminated Bearer | | |
| >>>>>PDU Session Resource Setup Info-MN terminated | M | |

TABLE 2

PDU Session Resource Setup Info-SN terminated

| IE/Group Name | Presence | Range |
| --- | --- | --- |
| UL NG-U UP TNL Information at UPF | M | |
| PDU Session Type | M | |
| QOS Flows To Be Setup List | | 1 |
| >QOS Flows To Be Setup Item IEs | | 1 . . . <maxnoofQoSFlows> |
| >>QoS Flow Indicator | M | |
| >>QoS Flow Level QoS Parameters | M | |
| >>Offered GBR QOS Flow Information | O | |
| DL Forwarding | O | |
| Security Indication | O | |

TABLE 3

PDU Session Resource Setup Info-MN terminated

| IE/Group Name | Presence | Range |
| --- | --- | --- |
| PDU Session Type | M | |
| DRBs To Be Setup List | | 1 |
| >DRBS to Be Setup Item IEs | | 1 . . . <maxnoof DRBs> |
| >>DRB ID | M | |
| >>MN UL PDCP UP TNL Information | M | |
| >>RLC Mode | | |
| >>QoS Flows To Be Setup List | | 1 |
| >>>QoS Flows To Be Setup Item IEs | | 1 . . . <maxnoof QosFlows> |
| >>>>QoS Flow Indicator | M | |
| >>>>QoS Flow Level QoS Parameters | M | |

In the PDU Session Resource Setup Info—SN terminated UE (Table 2), the MN provides a list of the QoS flows that it wants the SN to setup (i.e., SN-terminated) and also provides an "Offered GBR QoS Flow information", which is an indication to the SN that it can add this flow as part of a split bearer and how many resources the MN is willing to provide for this flow (whereas it is up to the SN whether or not to use the indicated resources). The UL NG-U UP TNL Information at UPF IE is sent also to the SN to provide the tunnel information for sending the UL data to the core network.

Note that the information in the PDU Session Resource Setup Info—SN terminated IE (Table 2) is communicated at QoS flow level. For example, the MN provides a list of QoS flows to the SN, which can decide how many radio resources (e.g., DRBs) to establish to serve these QoS flows. The MN doesn't know in advance how many bearers the SN will group the QoS flow into. For example, there can be 10 QoS flows in the list, and the SN can decide to have just two bearers, each aggregating 5 QoS flows. Consequently, the tunnel information is not provided in the PDU Session Resource Setup Info—SN terminated IE, since when sending the SN Addition Request, the MN does not know how many DRBs the SN will establish and therefore it does not know how many tunnels are required.

In the PDU Session Resource Setup Info—MN terminated IE (Table 3), the MN can provide a list of the bearers that it wants SN to setup, but only for MN terminated bearers (i.e., MCG split bearer). The MN can also provide the MN UL PDCP UP TNL Information for each bearer, which is the tunnel information to be used by the SN to forward UL data of MCG split bearers towards the MN. In contrast to the SN-terminated setup, the information in the PDU Session Resource Setup Info—MN terminated IE is at the bearer level. This is because, in this case, the MN decides how has admitted (grouped in the bearers that it has associated them with). If the SN has used the resources, if any, indicated by the MN (as provided in the Offered GBR QoS Flow information as discussed above), the SN indicates the amount of resources that the MN should provide in MCG requested GBR QoS Flow Information. This amount should be less than or equal to the Offered GBR QoS Flow information). The NG-U DL UP TNL Information at NG-RAN IE provides the tunnel information for sending the DL data from the core network. This information can be further forwarded from the MN to the CN later, so that both the tunnel end points are properly set for that PDU session in both the UL and DL directions.

In the PDU Session Resource Setup Info—MN terminated IE, the SN provides a list of the bearers that it has admitted (i.e., MCG split bearers) along with the S-Node DL SCG UP TNL Information, which is the tunnel information that the MN has to use to send data of MCG split bearers in the DL.

TABLE 4

PDU session resources Admitted to be added list.

PDU Session Resources Admitted To Be Added List

| | |
|---|---|
| >PDU Session Resources Admitted To Be Added Item | 1 . . . <maxnoofPDUSessions> |
| >>PDU Session ID | M |
| >>Bearer Configurations Admitted To Be Added | 1 . . . <maxnoofBearerConfigs> |
| >>>CHOICE Bearer Configuration | M |
| >>>>SN terminated Bearer | |
| >>>>>PDU Session Resource Setup Response Info-SN-terminated | M |
| >>>>MN terminated Bearer | |
| >>>>>PDU Session Resource Setup Response Info-MN terminated | M |

TABLE 5

PDU Session Resource Setup Response Info-SN terminated

| IE/Group Name | Presence | Range |
|---|---|---|
| NG-U DL UP TNL Information at NG-RAN | M | |
| DRBs To Be Setup List | | 1 |
| >DRBS to Be Setup Item IEs | | 1 . . . <maxnoof DRBs> |
| >>DRB ID | M | |
| >>SN UL PDCP UP TNL Information | O | |
| >>QoS Flows To Be Setup List | | 1 |
| >>>QoS Flows To Be Setup Item IEs | | 1 . . . <maxnoof QoS Flows> |
| >>>>QoS Flow Indicator | M | |
| >>>>MCG requested GBR QOS Flow Information | O | |
| QOS Flows Not Admitted List | O | |
| DL Forwarding UP TNL Information | O | |
| UL Forwarding UP TNL Information | O | | many DRBs to establish for serving the QoS flows. Therefore, it can directly provide the uplink tunnel information in the SN Addition Request message that can be used to establish the required tunnels.

In the SN-Addition Request Acknowledge message (operation 2), the SN can provide the list of the QoS flows/bearers that it has admitted (either as SCG bearers, SCG split bearers or MCG split bearers) in the PDU session resources admitted to be added List IE (shown below in Table 4), along with the PDU Session Resource Setup Response Info—SN terminated and PDU Session Resource Setup Response Info—MN terminated IES that are part of it (shown respectively in Tables 5-6 below).

In the PDU Session Resource Setup Response Info—SN terminated IE, the SN provides a list of the QoS flows that

TABLE 6

PDU Session Resource Setup Response Info-MN terminated

| IE/Group Name | Presence | Range |
|---|---|---|
| DRBs Admitted List | | 1 |
| >DRBS Admitted Item IEs | | 1 . . . <maxnoof DRBs> |
| >>DRB ID | M | |
| >>S-Node DL SCG UP TNL Information | M | |

Figure 10:
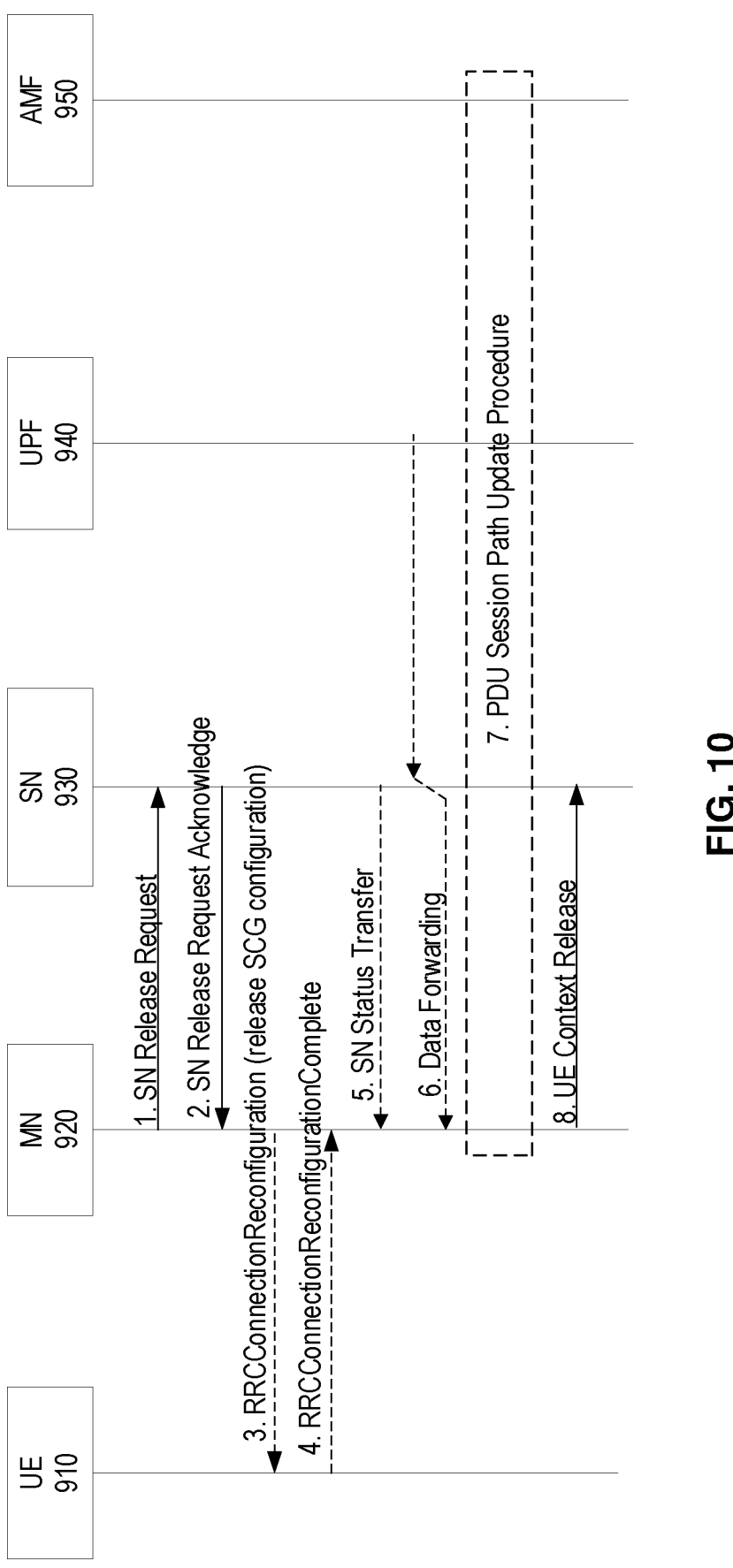
FIG. 10 illustrates an exemplary MN-initiated SN Release procedure for MR-DC utilizing a 5GC.

An SN Release procedure may be initiated either by the MN or by the SN and is used to initiate the release of the UE context and relevant resources at the SN. The recipient node of this request can reject it, e.g., if a SN change procedure is triggered by the SN. FIG. 10 illustrates an exemplary MN-initiated SN Release procedure for MR-DC cases utilizing a 5GC. As shown in FIG. 10, the procedure involves a UE (910), a MN (920), an SN (930), a user plane function (UPF, 940), and an access and mobility management function (AMF, 950). Each of these entities can correspond to an identically numbered entity in FIG. 9. The operations shown in FIG. 10 are labelled numerically, but this numbering is used to facilitate the following description rather than to imply or require a particular order unless expressly stated otherwise. Dashed lines indicate optional operations that may depend on one or more conditions.

In operation 1, the MN initiates the procedure by sending the SN Release Request message to the SN. If data forwarding is requested, the MN provides data forwarding addresses to the SN. In operation 2, the SN confirms SN Release by sending the SN Release Request Acknowledge message. Alternately, the SN may reject SN Release, e.g., if the SN change procedure is triggered by the SN. In operation 3, if needed, the MN indicates in an RRCConnectionReconfiguration message towards the UE that the UE shall release the entire SCG configuration. In case the UE is unable to comply with (part of) the configuration included in the RRCConnectionReconfiguration message, it performs the reconfiguration failure procedure. Otherwise, in operation 4, the UE responds with an RRCConnectionReconfiguration-Complete message.

In operation 5, if the released bearers use RLC AM, the SN sends an SN Status Transfer to the MN. In operation 6, the SN forwards data received from the UPF to the MN. In operation 7, if applicable, a PDU Session Path Update procedure is performed among the MN, SN, UPF, and AMF. In operation 8, the MN sends a UE context release message to the SN. Upon reception of this message, the SN can release radio- and CP-related resource associated with the UE context. Any ongoing data forwarding may continue, as needed.

Figure 11:
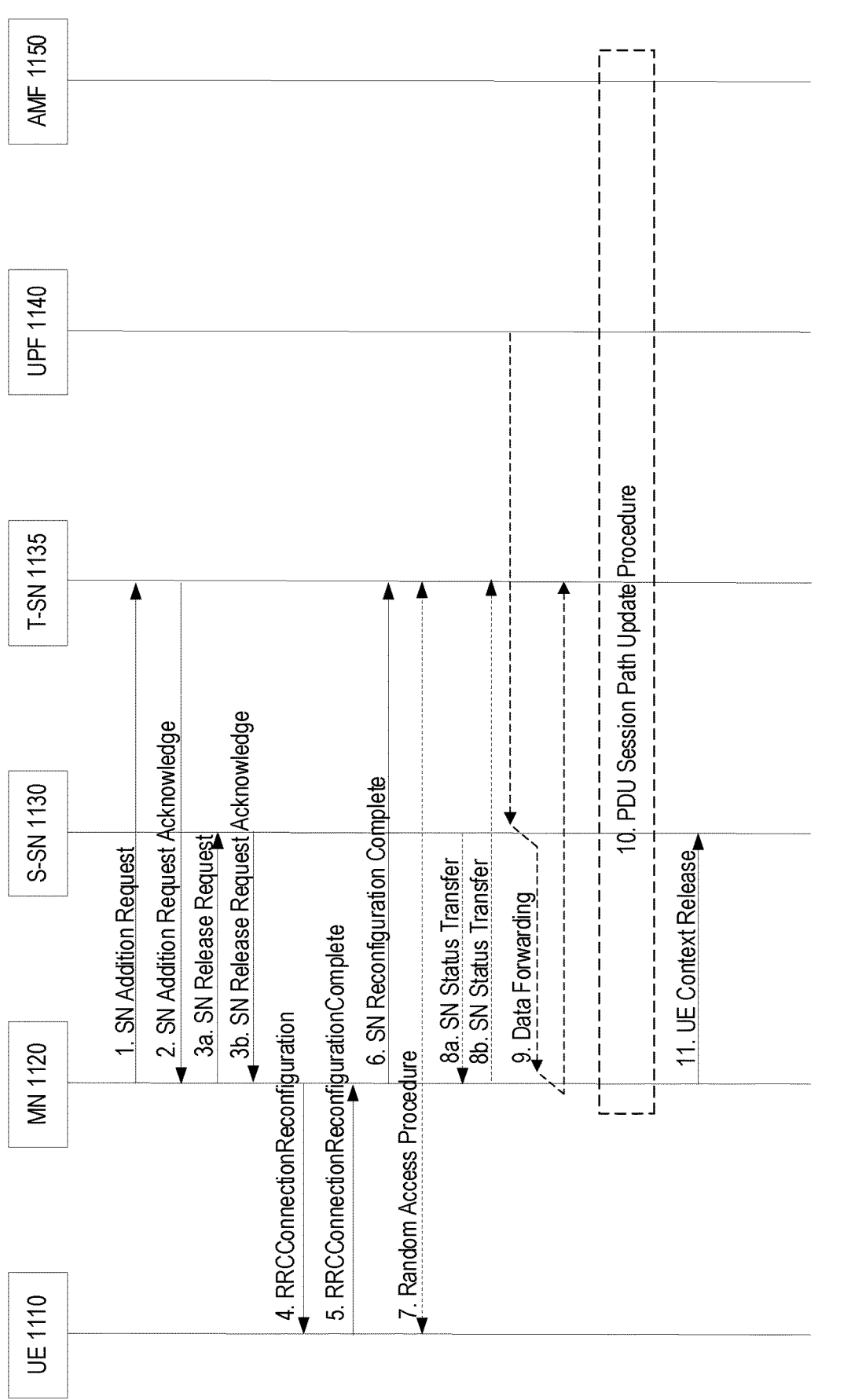
FIG. 11-12 illustrate exemplary MN- and SN-initiated SN Change procedures, respectively, for MR-DC utilizing a 5GC.

An SN Change procedure can be used to transfer a UE context from the source SN to a target SN and to change the SCG configuration in UE from the source SN to the target SN. The SN Change procedure can be MN-initiated or SN-initiated, but either case involves signaling over MCG SRB towards the UE. FIG. 11 illustrates an exemplary MN-initiated SN Change procedure for MR-DC scenarios utilizing a 5GC network. As shown in FIG. 11, the procedure involves a UE (1110), a MN (1120), a source SN (S-SN, 1130), a target SN (T-SN, 1135), a UPF (1140), and an AMF (1150). The operations shown in FIG. 11 are labelled numerically, but this numbering is used to facilitate the following description rather than to imply or require a particular order unless expressly stated otherwise. Dashed lines indicate optional operations that may depend on one or more conditions.

In operations 1, the MN initiates the SN change by invoking the SN Addition procedure, specifically by sending an SN Addition Request message requesting the target SN to allocate resources for the UE. The MN may include measurement results related to the target SN. If data forwarding is needed, the target SN provides data forwarding addresses to the MN in the acknowledgement (operation 2). The target SN can also include an indication of the full or delta RRC configuration.

In operation 3a, if the allocation of target SN resources was successful, the MN initiates the release of the source SN resources by sending an SN Release Request message, to the S-SN, that includes a Cause indicating SCG mobility. If data forwarding is needed, the MN provides data forwarding addresses to the source SN. If direct data forwarding is used for SN terminated bearers, the MN provides data forwarding addresses as received from the target SN to source SN. Reception of the SN Release Request message triggers the source SN to stop providing user data to the UE and, if applicable, to start data forwarding. In operation 3b, the source SN responds to the MN with an SN Release Request Acknowledge message.

Next, the MN triggers the UE to apply the new configuration. In operation 4, the MN indicates the new configuration to the UE in the RRCConnectionReconfiguration message including the target SN's RRC configuration message. The UE applies the new configuration and sends an RRC-ConnectionReconfigurationComplete message (operation 5) that includes the encoded SN RRC response message for the target SN, if needed. Alternately, if the UE is unable to comply with (part of) the configuration included in the RRCConnectionReconfiguration message, it performs the reconfiguration failure procedure.

In operation 6, if the RRC connection reconfiguration procedure was successful, the MN informs the target SN via SN Reconfiguration Complete message that includes the encoded RRC response message for the target SN, if received from the UE in operation 5. In operation 7, if the UE is configured with bearers requiring SCG radio resources, the UE performs a random access procedure to synchronize with the target SN. In operations 8a-b, for SN terminated bearers using RLC acknowledge mode (AM), the source SN sends the SN Status Transfer message to the MN, which the MN forwards to the target SN.

In operation 9, if applicable, forwarding of UP data from source SN to target SN occurs via the MN. It may be initiated as early as operation 3a when the source SN receives the SN Release Request message from the MN. In operation 10, if one of the PDU session/QoS Flow was terminated at the source SN, a PDU Session Path Update procedure is performed among the MN, T-SN, UPF, and AMF. In operation 11, the MN sends a UE Context Release message to the SN. Upon reception of this message, the SN can release radio- and CP-related resource associated with the UE context. Any ongoing data forwarding may continue, as needed.

Figure 12:
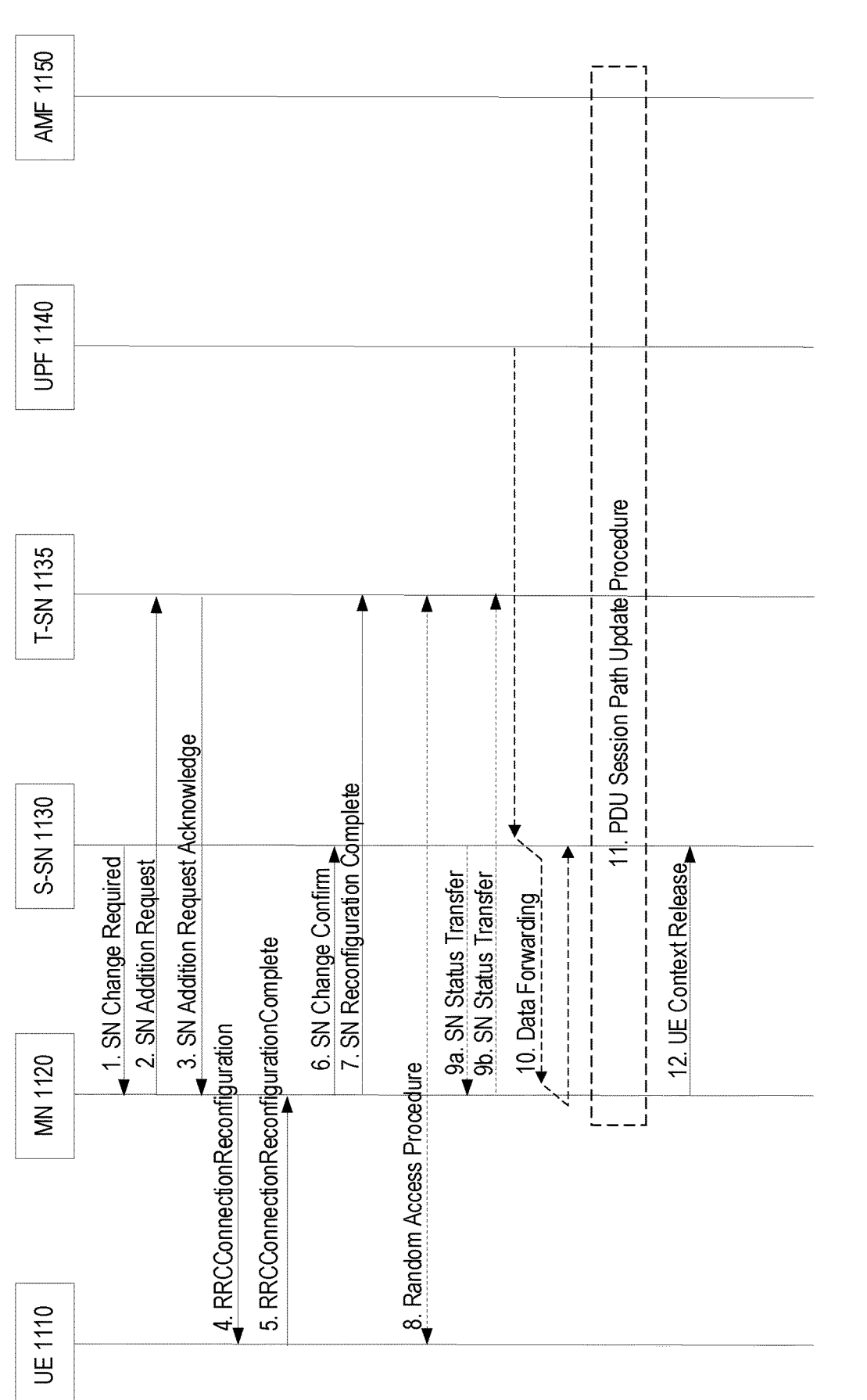

FIG. 12 illustrates an exemplary MN-initiated SN Change procedure for MR-DC scenarios utilizing a 5GC network. This procedure involves the same entities as shown in FIG. 11. The operations shown in FIG. 12 are labelled numerically, but this numbering is used to facilitate the following description rather than to imply or require a particular order unless expressly stated otherwise. Dashed lines indicate optional operations that may depend on one or more conditions.

In operation 1, the source SN initiates the SN change procedure by sending the SN Change Required message to the MN. This message includes a candidate target SN ID and may also include an SCG configuration (e.g., to support delta configuration) and measurement results related to the target SN. In operations 2, the MN sends an SN Addition Request message requesting the target SN to allocate resources for the UE. The MN may include measurement results related to the target SN, e.g., as received from the source SN. If data forwarding is needed, the target SN provides data forwarding addresses to the MN in the acknowledgement (operation 3). The target SN can also include an indication of the full or delta RRC configuration.

Next, the MN triggers the UE to apply the new configuration. In operation 4, the MN indicates the new configuration to the UE in the RRCConnectionReconfiguration message including the target SN's RRC configuration message. The UE applies the new configuration and sends an RRC-ConnectionReconfigurationComplete message (operation 5) that includes the encoded SN RRC response message for the target SN, if needed. Alternately, if the UE is unable to comply with (part of) the configuration included in the MN RRC reconfiguration message, it performs the reconfiguration failure procedure.

In operation 6, if the allocation of target SN resources was successful, the MN confirms the change to the source SN in an SN Change Confirm message. If data forwarding is needed, the MN provides data forwarding addresses to the source SN. If direct data forwarding is used for SN terminated bearers, the MN provides data forwarding addresses as received from the target SN. Reception of the SN Change Confirm message triggers the source SN to stop providing user data to the UE and, if applicable, to start data forwarding. Operations 7-12 in FIG. 12 are substantially similar to operations 6-11 in FIG. 11.

Figure 13:
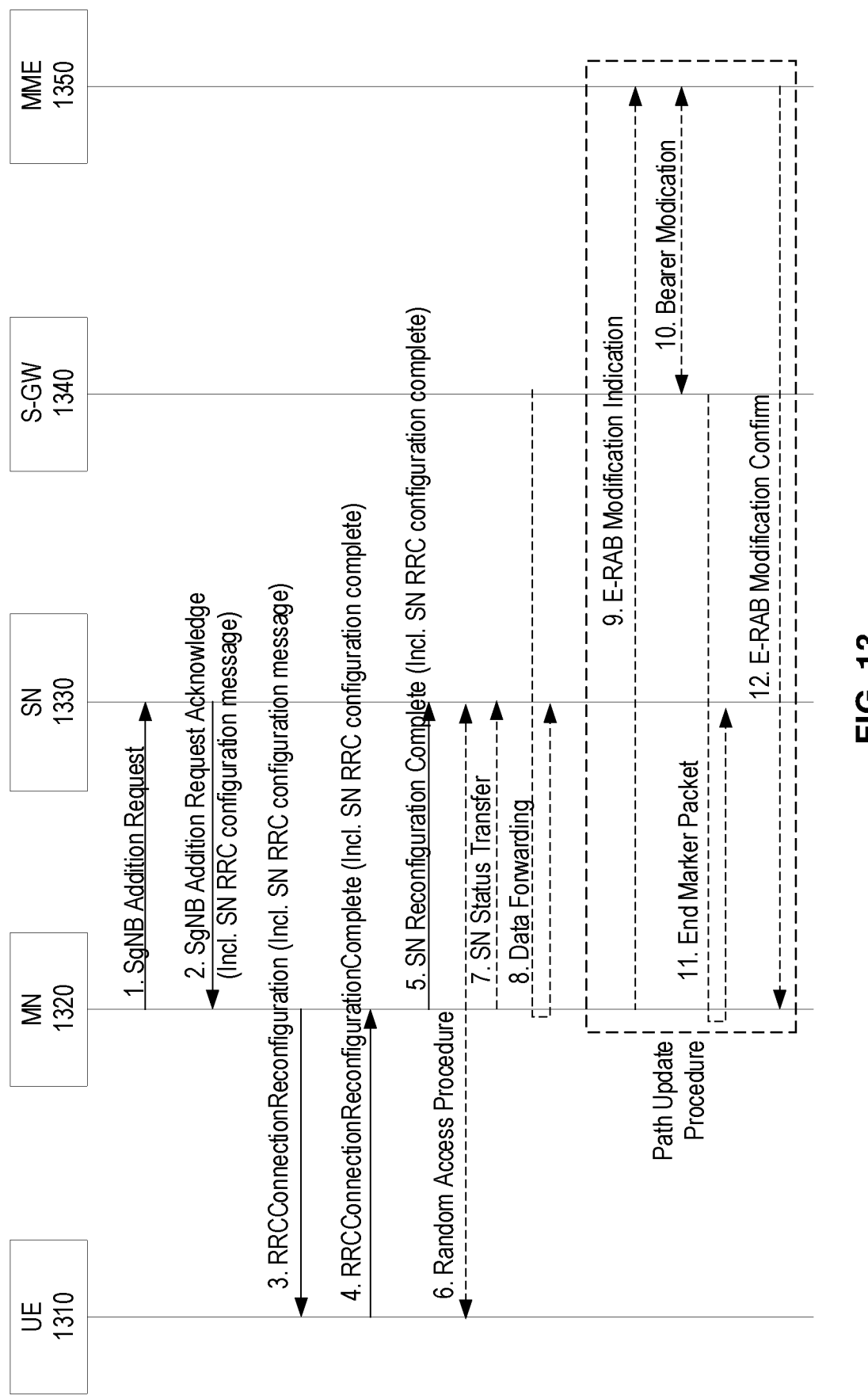
FIG. 13 illustrates an exemplary SN Addition procedure for MR-DC utilizing an EPC.

Similar procedures to those shown in FIGS. 9-12 can be used for MR-DC operation with an EPC, such as in EN-DC. FIG. 13 illustrates an exemplary SN Addition procedure for MR-DC utilizing an EPC. As shown in FIG. 13, the procedure involves a UE (1310), a MN (1320), an SN (1330), a S-GW (1340), and MME (1350). As illustrated in FIGS. 1 and 6, the S-GW and MME are functions in the EPC.

The SN Addition procedure shown in FIG. 13 is initiated by the MN and is used to establish a UE context at the SN to facilitate the SN providing radio resources to the UE. For bearers requiring SCG radio resources, this procedure can be used to add at least the initial SCG serving cell of the SCG. This procedure can also be used to configure an SN-terminated MCG bearer (where no SCG configuration is needed). The operations shown in FIG. 13 are labelled numerically, but this numbering is used to facilitate the following description rather than to imply or require a particular order unless expressly stated otherwise. Dashed lines indicate optional operations that may depend on one or more conditions.

In operation 1, the MN sends an SgNB Addition Request message to request the SN to allocate resources for a specific E-RAB, indicating E-RAB characteristics (e.g., E-RAB parameters, TNL address information corresponding to bearer type). In addition, for bearers requiring SCG radio resources, the MN indicates the requested SCG configuration information, including the entire UE capabilities and the UE capability coordination result. In this case, the MN also provides the latest measurement results for SN to choose and configure the SCG cell(s). The MN may request the SN to allocate radio resources for split SRB operation. The MN provides all the needed security information to the SN (even if no SN terminated bearers are setup) to enable SRB3 to be setup based on SN decision. In case of bearer options that require X2-U resources between the MN and the SN, the MN provides X2-U TNL address information for the respective E-RAB, X2-U DL TNL address information for SN terminated bearers, and X2-U UL TNL address information for MN terminated bearers. In case of SN terminated split bearers the MN provides the maximum QoS level that it can support.

The SN may reject the request received in operation 1. In operation 2, if the RRM entity in the SN is able to admit the resource request, it allocates respective radio resources and, dependent on the bearer option, respective transport network resources. For bearers requiring SCG radio resources, the SN triggers Random Access so that synchronization of the SN radio resource configuration can be performed. The SN decides the PSCell and other SCG SCells, and provides the new SCG radio resource configuration to the MN in a SN RRC configuration message contained in the SgNB Addition Request Acknowledge message. In case of bearer options that require X2-U resources between the MN and the SN, the SN provides X2-U TNL address information for the respective E-RAB, X2-U UL TNL address information for SN terminated bearers, and X2-U DL TNL address information for MN terminated bearers. For SN terminated bearers, the SN provides the S1-U DL TNL address information for the respective E-RAB and security algorithm. If SCG radio resources have been requested, the SCG radio resource configuration is provided.

In case of MN terminated bearers, transmission of UP data may take place after operation 2. In case of SN terminated bearers, SN Status Transfer (operation 7) and data forwarding (operation 7) may take place after operation 2. In operation 3, the MN sends to the UE the RRCConnectionReconfiguration message including the SN RRC configuration message received in operation 2, without modification. In operation 4, the UE applies the new configuration and replies to MN with RRCConnectionReconfigurationComplete message, including an SN RRC configuration complete message, if needed. In case the UE is unable to comply with (part of) the configuration included in the RRCConnectionReconfiguration message, it performs a reconfiguration failure procedure.

In operation 5, the MN informs the SN that the UE has completed the reconfiguration procedure successfully via SN ReconfigurationComplete message, including the encoded NR RRC response message, if received from the UE. In operation 6, if configured with bearers requiring SCG radio resources, the UE performs synchronization towards the PSCell of the SN. The order the UE sends the RRCConnectionReconfigurationComplete message and performs the Random Access procedure towards the SCG is not defined, and a successful RA procedure towards the SCG is not required for a successful completion of the RRC Connection Reconfiguration procedure.

In operation 7, if PDCP termination point is changed to the SN for bearers using RLC AM, and when RRC full configuration is not used, the MN sends an SN Status Transfer message to the SN. In operation 8, for SN terminated bearers moved from the MN, the MN may take actions to minimize service interruption due to activation of EN-DC dependent on the bearer characteristics of the respective E-RAB. This includes data forwarding from the S-GW to SN, as shown. In operations 9-12, an update of the UP path towards the EPC is performed, if needed.

An SN Modification procedure may be initiated either by the MN or by the SN and can be used to modify, establish, or release bearer contexts; transfer bearer contexts to and from the SN; or to modify other properties of the UE context within the same SN. The procedure may also be used to transfer an NR RRC message from the SN to the UE via the MN, and the response from the UE via MN to the SN (e.g., when SRB3 is not used). Other possible uses are described in 3GPP TS 37.340.

Figure 14:
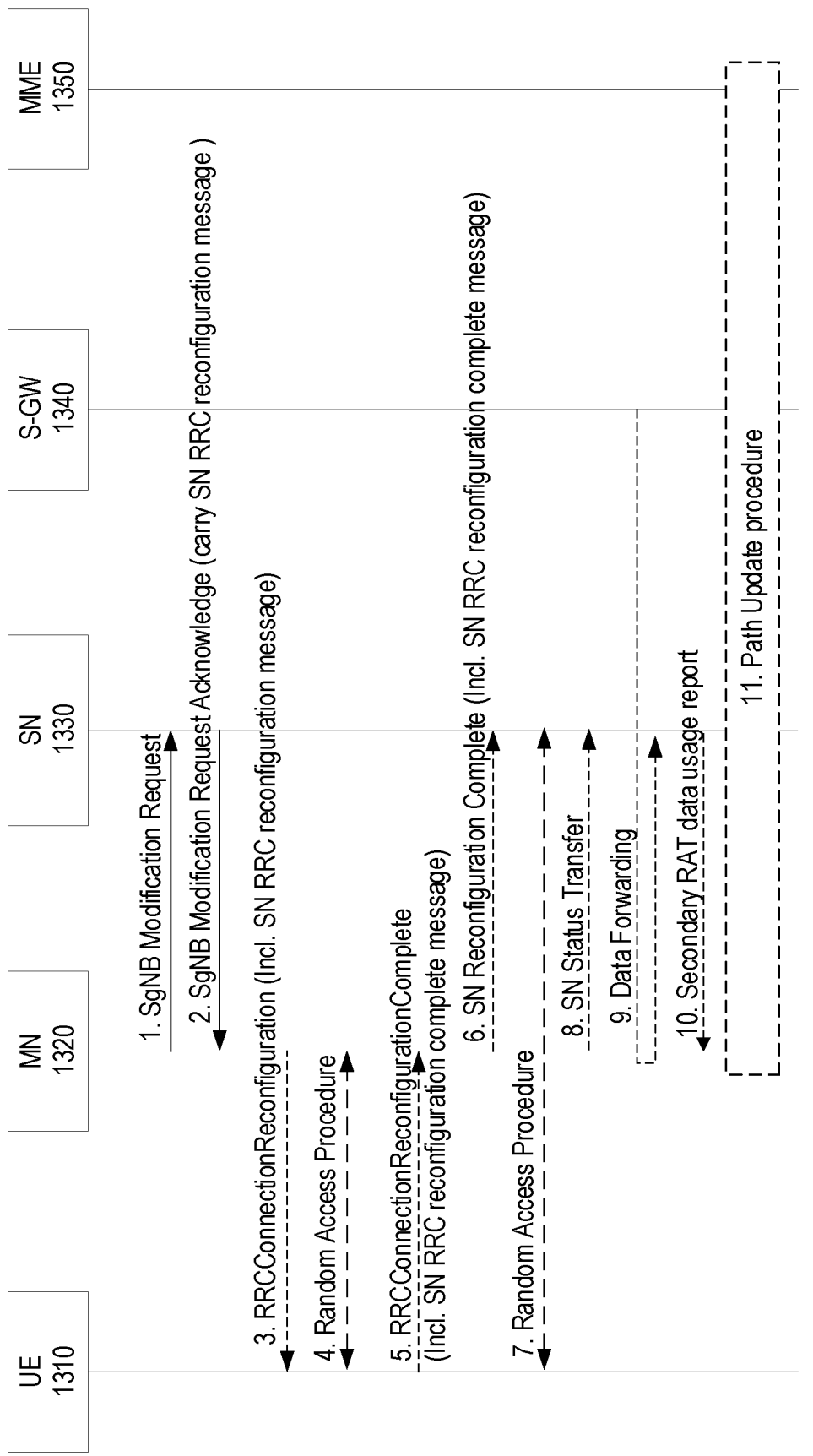
FIGS. 14-15 illustrate exemplary MN- and SN-initiated SN Modifications procedures, respectively, for MR-DC utilizing an EPC.
Figure 15:
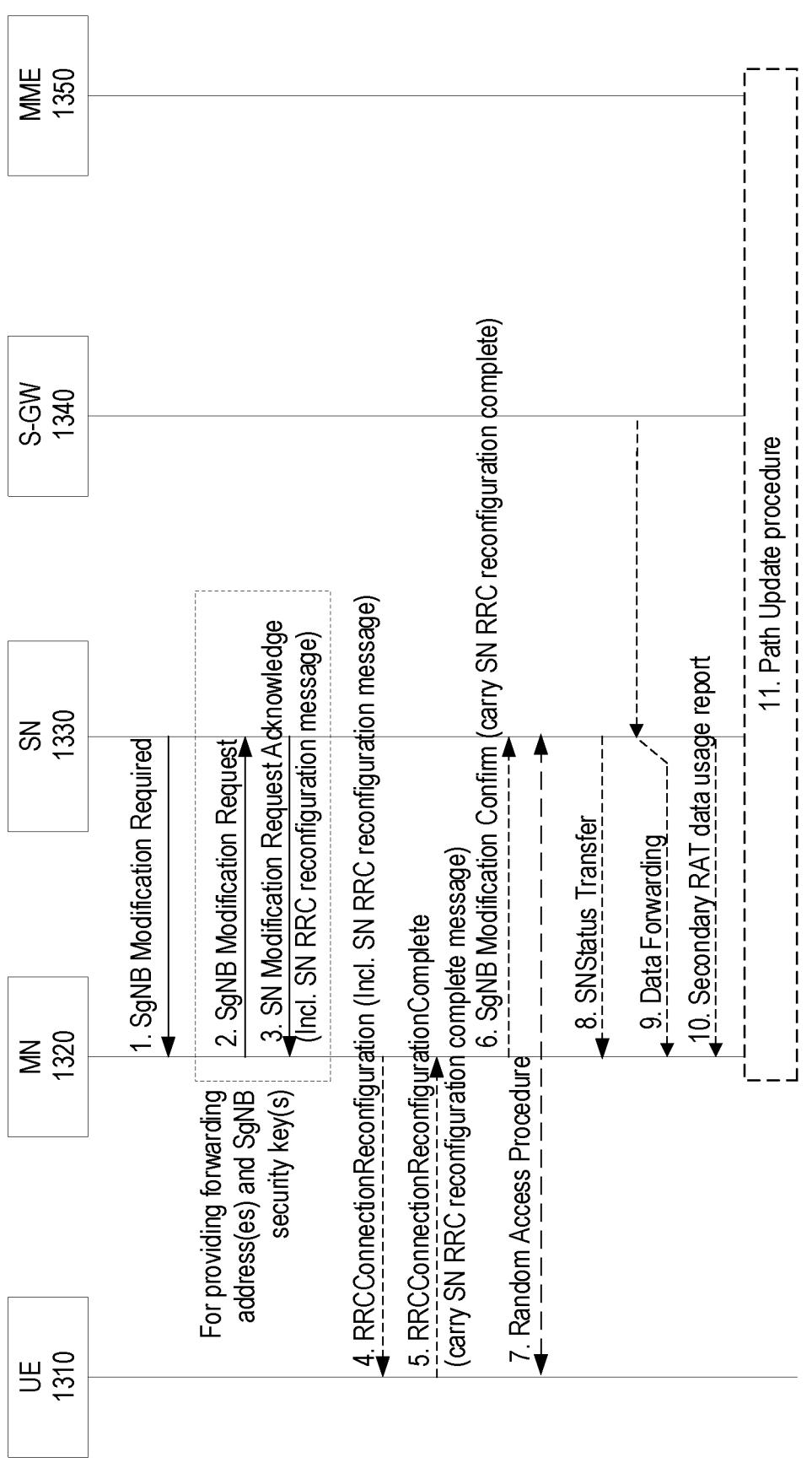

FIGS. 14-15 illustrate exemplary MN- and SN-initiated SN Modifications procedures, respectively, for MR-DC utilizing an EPC. As shown both figures, the procedure involves a UE (1310), a MN (1320), an SN (1330), a S-GW (1340), and MME (1350). Each of these entities may be the same as an identically-numbered entity in FIG. 13.

FIG. 14 will now be described. In operation 1, the MN sends an SgNB Modification Request message to the SN. The message may contain bearer context related or other UE context related information, data forwarding address information (if applicable), and requested SCG configuration information, including a UE capability coordination result to be used as basis for the reconfiguration by the SN. In case a security key update in the SN is required, a new SgNB Security Key is included. In case of SCG RLC re-establishment for E-RABs configured with an MN terminated bearer with an SCG RLC bearer for which no bearer type change is performed, the MN provides a new UL GTP tunnel endpoint to the SN. The SN shall continue sending UL PDCP PDUs to the MN with the previous UL GTP tunnel endpoint until it re-establishes the RLC after which it can use the new UL GTP tunnel endpoint. In case of PDCP re-establishment for E-RABs configured with an SN terminated bearer with an MCG RLC bearer for which no bearer type change is performed, the MN provides a new DL GTP tunnel endpoint to the SN. The SN shall continue sending DL PDCP PDUs to the MN with the previous DL GTP tunnel endpoint until it performs PDCP re-establishment and after which it can use the new DL GTP tunnel endpoint.

In operation 2, the SN responds with the SgNB Modification Request Acknowledge message, which may contain SCG radio resource configuration information within an SN RRC reconfiguration message and data forwarding address information (if applicable). In case of a security key update (with or without PSCell change), for E-RABs configured with the MN terminated bearer option that require X2-U resources between the MN and the SN, for which no bearer type change is performed, the SN provides a new DL GTP tunnel endpoint to the MN. The MN shall continue sending DL PDCP PDUs to the SN with the previous DL GTP tunnel endpoint until it performs PDCP re-establishment or PDCP data recovery, after which it can use the new DL GTP tunnel endpoint. In case of a security key update (with or without PSCell change), for E-RABs configured with the SN terminated bearer option that require X2-U resources between the MN and the SN, for which no bearer type change is performed, the SN provides a new UL GTP tunnel endpoint to the MN. The MN shall continue sending UL PDCP PDUs to the SN with the previous UL GTP tunnel endpoint until it re-establishes the RLC and use the new UL GTP tunnel endpoint after re-establishment.

In operation 3, the MN initiates an RRC connection reconfiguration procedure, including sending the UE an RRCConnectionReconfiguration message including the SN RRC configuration message received in operation 2. In operation 4, the UE applies the new configuration, performs random access to the MN (if instructed, in case of intra-MN handover), and replies in operation 5 with an RRCConnectionReconfigurationComplete message including an SN RRC reconfiguration complete message, if needed. In case the UE is unable to comply with (part of) the configuration included in the RRCConnectionReconfiguration message, it performs a reconfiguration failure procedure.

In operation 6, the MN indicates successful completion of the reconfiguration in the SN Reconfiguration Complete message. In operation 7, if instructed, the UE performs random access and synchronization towards the SN PSCell as described above for the SN Addition procedure. Otherwise, the UE may perform UL transmission after having applied the new configuration. In operation 8, if PDCP termination point is changed for bearers using RLC AM, and when RRC full configuration is not used, the SN Status Transfer takes place between the MN and the SN. FIG. 14 depicts the case where a bearer context is transferred from the MN to the SN.

In operation 9, if needed, data forwarding between MN and the SN takes place. In operation 10, the SN sends the Secondary RAT Data Usage Report message to the MN and includes the data volumes delivered to and received from the UE over the NR radio for the E-RABs to be released and for the E-RABs for which the S1 UL GTP Tunnel endpoint was requested to be modified. In operation 11, an update of the UP path towards the EPC is performed, if needed.

The SN-initiated procedure shown in FIG. 15 will now be described. In operation 1, the SN sends a SgNB Modification Required message including a NR RRC configuration message, which may contain bearer context related, other UE context related information, and the new SCG radio resource configuration. For bearer release or modification, a corresponding E-RAB list is included in the SgNB Modification Required message. In case of change of security key, the PDCP Change Indication indicates that a S-$K_{gNB}$ update is required. In case the MN needs to perform PDCP data recovery, the PDCP Change Indication indicates that PDCP data recovery is required. The SN can decide whether the change of security key is required.

A MN-initiated SN Modification procedure may be triggered by the SgNB Modification Required message, e.g., to provide information such as data forwarding addresses, new SN security key, measurement gap, etc. This involves operations 2-3, which can be similar to operations 1-2 in FIG. 14. In operation 4, the MN sends the UE an RRCConnection-Reconfiguration message including a SN RRC reconfiguration message, which includes a new SCG radio resource configuration.

In operation 5, the UE applies the new configuration and sends an RRCConnection-ReconfigurationComplete message, including an encoded SN RRC reconfiguration complete message, if needed. In case the UE is unable to comply with (part of) the configuration included in the RRCConnectionReconfiguration message, it performs the reconfiguration failure procedure. In operation 6, the MN indicates successful completion of the reconfiguration in the SgNB Modification Confirm message, which contains the encoded SN RRC reconfiguration complete message, if received from the UE.

In operation 7, if instructed in the message received in operation 4, the UE performs random access and synchronization towards the SN PSCell as described above in relation to the SN addition procedure. Otherwise, the UE may perform UL transmission after having applied the new configuration. In operation 8, if a PDCP termination point is changed for bearers using RLC AM, and when RRC full configuration is not used, the SN sends an SN Status Transfer message to the MN. FIG. 15 depicts the case where a bearer context is transferred from the SN to the MN. Operations 9-11 are substantially similar to operations 9-11 in FIG. 14, with the exception that data forwarding occurs in the opposite direction.

As briefly mentioned above, Quality of Experience (QoE) measurements have been specified for UEs operating in LTE networks and in earlier-generation UMTS networks. Measurements in both networks operate according to the same high-level principles. Their purpose is to measure the experience of end users when using certain applications over a network. For example, QoE measurements for streaming services and for MTSI (Mobility Telephony Service for IMS) are supported in LTE.

QoE measurements may be initiated towards the RAN from an O&M node generically for a group of UEs (e.g., all UEs meeting one or more criteria), or they may also be initiated from the CN to the RAN for a specific UE. The configuration of the measurement includes the measurement details, which is encapsulated in a container that is transparent to RAN.

A "TRACE START" S1AP message is used by the LTE EPC for initiating QoE measurements by a specific UE. This message carries details about the measurement configuration the application should collect in the "Container for application layer measurement configuration" IE, which transparent to the RAN. This message also includes details needed to reach the TCE to which the measurements should be sent.

FIGS. 16A-D show various procedures between a UTRAN and a UE for QoE measurements in a legacy UMTS network. As shown in FIG. 16A, the UTRAN can send a UE Capability Enquiry message to request the UE to report its application layer measurement capabilities. As shown in FIG. 16B, the UE can provide its application layer measurement capabilities to the UTRAN via a UE Capability Information message, particularly in a "Measurement Capability" IE that includes information related to UE capability to perform the QoE measurement collection for streaming services and/or MTSI services. Table 7 below shows exemplary contents of this IE:

TABLE 7

| IE/Group name | Need | Type and reference | Semantics description | Version |
|---|---|---|---|---|
| QoE Measurement Collection for streaming services | CV-not_iRAT_HoInfo | Enumerated (TRUE) | TRUE means that the UE supports QoE Measurement Collection for streaming services. | REL-14 |
| QoE Measurement Collection for MTSI services | CV-not_iRAT_HoInfo | Enumerated (TRUE) | TRUE means that the UE supports QoE Measurement Collection for MTSI services. | REL-15 |

The UTRAN can respond with a UE Capability Information Confirm message. FIG. 16C shows that the UTRAN can send a Measurement Control message containing "Application layer measurement configuration" IE in order to configure QoE measurement in the UE. Table 8 below shows exemplary contents of this IE:

TABLE 8

| IE/Group name | Need | Type and reference | Version |
|---|---|---|---|
| Container for application layer measurement configuration | MP | Octet string (1 . . . 1000) | REL-14 |
| Service type | MP | Enumerated (QoEStreaming, QoEMTSI) | REL-15 |

FIG. 16D shows that the UE can send QoE measurement results via UTRAN to the TCE using a Measurement Report message that includes an "Application layer measurement reporting" IE. Table 9 below shows exemplary contents of this IE:

TABLE 9

| IE/Group name | Need | Type and reference | Version |
|---|---|---|---|
| Container for application layer measurement reporting | MP | Octet string (1 . . . 8000) | REL-14 |
| Service type | MP | Enumerated (QoEStreaming, QoEMTSI) | REL-15 |

FIGS. 17A-C illustrate a procedure between an E-UTRAN and a UE for configuring QoE measurements in an LTE network. FIG. 17A shows an exemplary UE capability transfer procedure used to transfer UE radio access capability information from the UE to E-UTRAN. Initially, the E-UTRAN can send a UE Capability Inquiry message, similar to the arrangement shown in FIG. 16A. The UE can respond with a UE Capability Information message that includes a "UE-EUTRA-Capability" IE. The E-UTRAN can respond with a UE Capability Information Confirm message, similar to the arrangement shown in FIG. 16B.

This IE may further include a UE-EUTRA-Capability-v1530 IE, which can be used to indicate whether the UE supports QoE Measurement Collection for streaming services and/or MTSI services. In particular, the UE-EUTRA-Capability-v1530 IE can include a "measParameters-v1530" IE containing the information about the UE's measurement support. In some cases, the "UE-EUTRA-Capability" IE can also include a "UE-EUTRA-Capability-v16xy-IE", which can include a "qoe-Extensions-r16" field. FIG. 17B shows an exemplary ASN.1 data structure for these various IEs, with the various fields defined in Table 10 below.

TABLE 10

| Field name | Description |
|---|---|
| qoe-MeasReport | Indicates whether the UE supports QoE Measurement Collection for streaming services. |
| qoe-MTSI-MeasReport | Indicates whether the UE supports QoE Measurement Collection for MTSI services. |
| qoe-Extensions | Indicates whether the UE supports the Rel-16 extensions for QoE Measurement Collection, i.e., support of more than one QoE measurement type at a time and signaling of withinArea, sessionRecordingIndication, qoe-Reference, temporaryStopQoE and restartOoE |

TABLE 10-continued

| Field name | Description |
|---|---|
| temporaryStopQoE | Indicates that reporting, but not collection, of QoE measurements shall be temporarily stopped. |
| withinArea | Indicates at handover, for each application layer measurement, whether the new cell is inside the area for the measurement, i.e., whether the UE is allowed to start new measurements in the cell |
| restartQoE | Indicates that QoE measurements can be reported again after a temporary stop. |

FIG. 17C shows an exemplary ASN.1 data structure for the qoe-Reference parameter mentioned in Table 10 above.

FIGS. 18A-C illustrate various aspects of QoE measurement collection for a UE in an LTE network. In particular, FIG. 18A shows an exemplary signal flow diagram of a QoE measurement collection process for LTE. To initiate QoE measurements, the serving eNB sends to a UE in RRC_CONNECTED state an RRCConnectionReconfiguration message that includes a QoE configuration file, e.g., a measConfigAppLayer IE within an OtherConfig IE. As discussed above, the QoE configuration file is an application-layer measurement configuration received by the eNB (e.g., from EPC) encapsulated in a transparent container, which is forwarded to UE in the RRC message. The UE responds with an RRCConnectionReconfigurationComplete message. Subsequently, the UE performs the configured QoE measurements and sends a MeasReportAppLayer RRC message to the eNB, including a QoE measurement result file. Although not shown, the eNB can forward this result file transparently (e.g., to EPC).

FIG. 18B shows an exemplary ASN.1 data structure for a measConfigAppLayer IE, including a measConfigAppLayerToAddModList-r16 and a measConfigAppLayerToRelease-List-r16. The former may be used to add or modify multiple QoE measurement configurations (up to maxQoE-Measurement-r16), and the latter may be used to remove multiple QoE measurement configuration (up to maxQoE-Measurement-r16). In the serviceType field, a value of "qoe" indicates Quality of Experience Measurement Collection for streaming services and a value of "qoemtsi" indicates Enhanced Quality of Experience Measurement Collection for MTSI. This field also includes various spare values.

The following procedural statements exemplify desired UE behavior upon reception of the a measConfigAppLayer IE in the OtherConfig IE within the RRCReconfiguration:
  1> if the received otherConfig includes the measConfigAppLayerToAddModList:
    2> for each serviceType and qoe-Reference included in the measConfigAppLayerToAddModList:
    2> forward measConfigAppLayerContainer, qoe-Reference and serviceType to upper layers considering the serviceType;
    2> consider itself to be configured to send application layer measurement report in accordance with 5.6.19;
    2> forward withinArea to upper layers if received;
    2> forward temporaryStopQoE to upper layers if received;
    2> forward restartQoE to upper layers if received;
  1> if the received otherConfig includes the measConfigAppLayerToReleaseList:
    2> for each serviceType and qoe-Reference included in the measConfigAppLayerToReleaseList:
    2> inform upper layers to clear the associated stored application layer measurement configuration;

2> discard received associated application layer measurement report information from upper layers;
    2> consider itself not to be configured to send the associated application layer measurement report for that serviceType and qoe-Reference.

FIG. 18C shows an exemplary ASN.1 data structure for a measReportAppLayer IE, by which a UE can send to the E-UTRAN (e.g., via SRB4) the QoE measurement results of an application (or service). The service for which the report is being sent is indicated in the "serviceType" IE. The measReportAppLayer IE can also include a qoe-reference IE, as discussed above, containing the PLMN identity and an ID associated with the QoE measurement collection.

A UE capable of application layer measurement reporting in RRC_CONNECTED may initiate the procedure when configured with application layer measurement, i.e., when measConfigAppLayer has been configured by E-UTRAN. Upon initiating the procedure, the UE shall:
  1> if configured with application layer measurement, and SRB4 is configured, and the UE has received application layer measurement report information from upper layers:
    2> set the measReportAppLayerContainer in the MeasReportAppLayer message to the value of the application layer measurement report information;
    2> set the serviceType in the MeasReportAppLayer message to the type of the application layer measurement report information;
    2> set the qoe-Reference in the MeasReportAppLayer message to the value received from upper layer;
    2> set the recordingSessionIndication in the MeasReportAppLayer message to the value received from upper layer;
    2> submit MeasReportAppLayer message to lower layers for transmission via SRB4.

Figure 19:
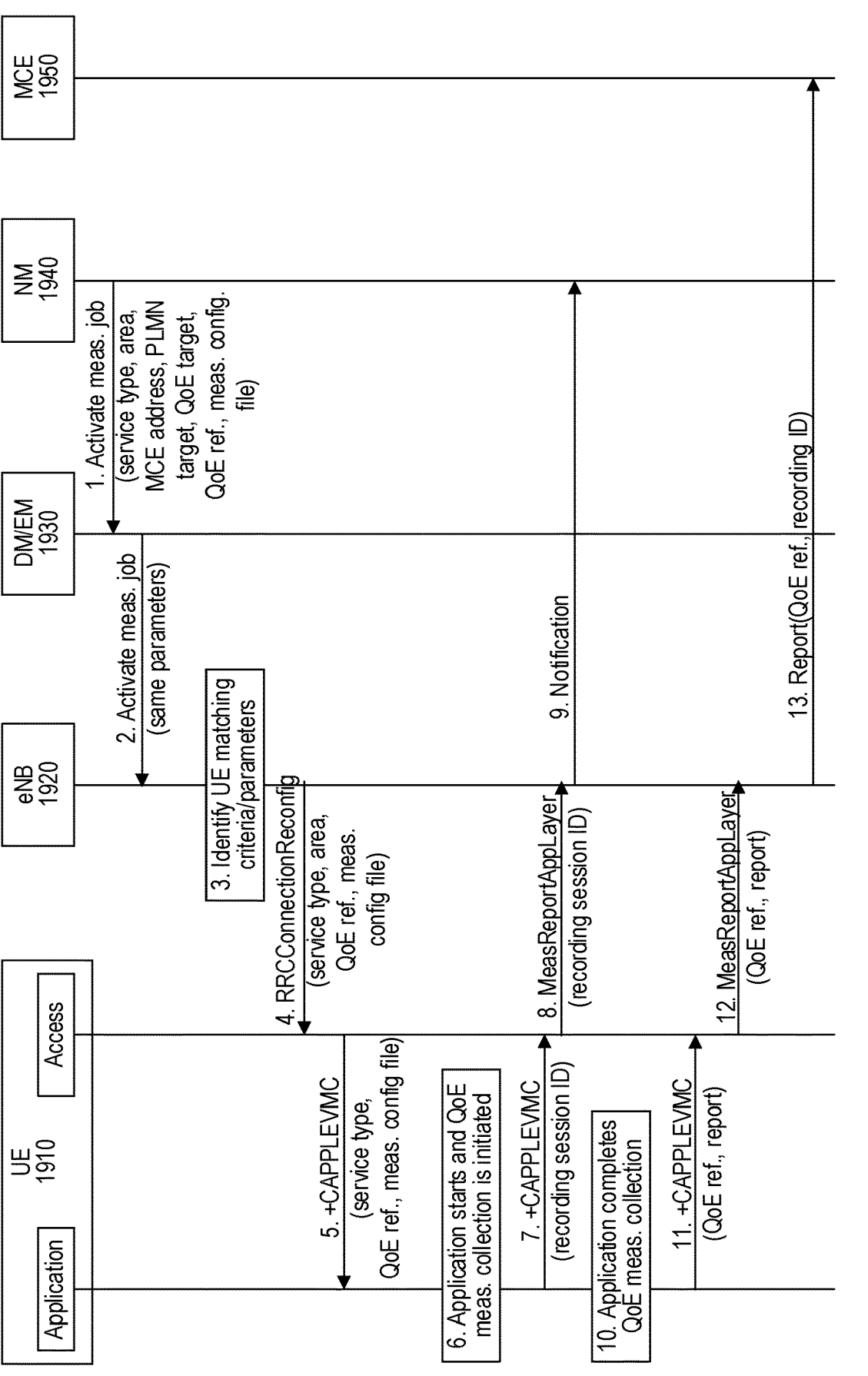
FIG. 19 shows a more detailed signal flow of activation of QoE measurement collection and reporting of collected information for a UE in an LTE network.

FIG. 19 shows a more detailed signal flow of activation of QoE measurement collection and reporting of collected information without UE mobility in an LTE network. This signal flow is between a measurement collection entity (MCE, 1950), a network manager (NM, 1940), a domain manager (DM/EM, 1930), one or more eNBs (1920) in E-UTRAN, and the UE (1910)—particularly access stratum (or access, for short) and application parts of the UE. The following description omits these reference numbers for brevity. Although the operations shown in FIG. 19 are given numerical labels, these labels are intended to facilitate the following description rather than to require and/or imply a particular order of the operations.

In operation 1, the NM sends an Activate Measurement Job message to the DM, which forwards the message to the eNB in operation 2. The message includes a service type (e.g., streaming), an area scope, a measurement configuration file for the QoE measurements to be performed, and a QoE reference identifier. In operation 3, the eNB identifies served cells matching the area scope, as well as UEs in these served cells that match other parameters in the message (e.g., service type). The eNB can base this determination on UE capability information sent from the UE to the eNB (not shown).

In operation 4, after identifying the UE matching the received criteria, the eNB sends an RRCConnectionRecon-figuration message to the AS (e.g., RRC layer) of the UE. The eNB includes the service type, the area scope (e.g., one or more cells, tracking areas, etc.), the measurement con-figuration file, and the QoE reference.

In operation 5, the UE AS forwards this information to the UE application part using an AT command +CAPPLEVMC, as specified in 3GPP TS 27.007 (v16.4.0). In general, AT commands can be used to transfer information between different layers in the UE, such as between application and AS. In particular, AT command +CAPPLEVMC is of the following form when used for QoE measurement configu-ration:

+CAPPLEVMC: <app-meas_service_type>,<start-sto-p_reporting>[,<app-meas_config_file_length>,<app-meas_config-file>], where the various fields are defined below:

<n>: integer type. Disable and enable presentation of the unsolicited result code +CAPPLEVMC to the TE.
0 Disable presentation of the unsolicited result code
1 Enable presentation of the unsolicited result code
<app-meas_service_type>: integer type. Contains the indication of what application that is target for the application level measurement configuration.
1 QoE measurement collection for streaming services
2 QoE measurement collection for MTSI services
<start-stop_reporting>: integer type. Indicates the start and stop of the application level measurement reporting for the application indicated by the <app-meas_service-_type>.
0 start the application level measurement reporting
1 stop the application level measurement reporting
<app-meas_config_file_length>: integer type. Indicates the number of octets of the <app-meas_config-file> parameter.
<app-meas_config-file>: string of octets. Contains the application level measurement configuration file for the application indicated by the <app-meas_service_type>. The parameter shall not be subject to conventional character conversion as per +CSCS.

Returning to the discussion of FIG. 19, in operation 6, the UE starts an application associated with the service type and initiates measurement collection according to the received configuration and area. The UE assigns this measurement collection a recording session ID and reports this ID (in operation 7) to the UE AS using the same AT command. In operation 8, the UE AS sends this ID to the eNB in a MeasReportAppLayer RRC message, and the eNB notifies the NM of the initiation of the measurement collection in operation 9.

The UE application layer completes the QoE measure-ment collection according to the received configuration (operation 10) and reports the results to the UE AS via AT command +CAPPLEVMR (operation 11) along with the associated QoE reference ID received earlier. The report can be a transparent container, as discussed earlier. AT command +CAPPLEVMC is of the following form when used for QoE measurement reporting:

+CAPPLEVMC=<app-meas_service_type>,<app-meas-_report_length>,<app-meas_report> where the various fields are defined below:

<app_meas_service_type>: integer type. Contains the indication of what application that is providing the application level measurement report.
1 QoE measurement collection for streaming ser-vices
2 QoE measurement collection for MTSI services
<app-meas_report_length>: integer type. Indicates the number of octets of the <app-meas_report> param-eter.
<app-meas_report>: string of octets. Contains the application level measurement configuration file for the application indicated by the <app-meas_service-_type>. The parameter shall not be subject to con-ventional character conversion as per +CSCS.

In operation 12, the UE AS sends the report and the QoE reference ID to the eNB in a MeasReportAppLayer RRC message. The eNB subsequently forwards the report to the MCE (operation 13). In some cases, the MCE may forward the QoE measurement report another entity in the network for analysis and further action (e.g. in the OAM system).

In LTE, a TRACE ACTIVATION message (or IE) is used to transfer QoE related information between eNBs over the X2 interface. Table 11 below shows exemplary contents of a TRACE ACTIVATION message. The QoE-related infor-mation is contained in the UE Application layer measure-ment configuration IE, which is further defined in Table 12.

TABLE 11

| IE/Group Name | Presence | IE type/ref. | Semantics description |
|---|---|---|---|
| E-UTRAN Trace ID | M | OCTET STRING (SIZE(8)) | The E-UTRAN Trace ID IE is composed of the following: Trace Reference defined in TS 32.422 [10] (leftmost 6 octets, with PLMN information coded as in 9.2.3.8), and Trace Recording Session Reference defined in TS 32.422 [10] (last 2 octets). |
| Interfaces To Trace | M | BIT STRING (SIZE(8)) | Each position in the bitmap represents an eNB or en-gNB interface: first bit = S1-MME, second bit = X2, third bit = Uu, fourth bit = F1-C, fifth bit = E1, and other bits reserved for future use. |

TABLE 11-continued

| IE/Group Name | Presence | IE type/ref. | Semantics description |
|---|---|---|---|
| | | | Value '1' indicates 'should be traced'; '0' indicates 'should not be traced' |
| Trace depth | M | ENUMERATED(minimum, medium, maximum, MinimumWithoutVendorSpecificExtension, Medium WithoutVendorSpecificExtension, MaximumWithoutVendorSpecificExtension, . . . ) | Defined in 3GPP TS 32.422. |
| Trace Collection Entity IP Address | M | Transport Layer Address 9.2.2.1 | Defined in 3GPP TS 32.422. |
| MDT Configuration | O | 9.2.1.81 | |
| UE Application layer measurement configuration | O | 9.2.1.128 | |

TABLE 12

| IE/Group Name | Presence | Range | IE type/ref. | Semantics description |
|---|---|---|---|---|
| Container for application layer measurement configuration | M | | Octet string (1 . . . 1000) | Indicates application layer measurement configuration. |
| CHOICE Area Scope of QMC | M | | | |
| >Cell based | | | | |
| >>Cell ID List for QMC | | 1 . . . maxnoofCellIDforQMC> | | |
| >>>E-CGI | M | | 9.2.1.38 | |
| >TA based | | | | |
| >>TA List for QMC | | 1 . . . <maxnoofTAforQMC> | | |
| >>>TAC | M | | 9.2.3.7 | TAI is derived using the current serving PLMN. |
| >TAI based | | | | |
| >>TAI List for QMC | | 1 . . . <maxnoofTAforQMC> | | |
| >>>TAI | M | | 9.2.3.16 | |
| >PLMN area based | | | | |
| >>PLMN List for QMC | | 1 . . . <maxnoofPLMNforQMC> | | |
| >>>PLMN Identity | M | | 9.2.3.8 | |
| Service Type | M | | ENUMERATED (QMC for streaming service, QMC for MTSI service, . . . ) | Indicates the service type of UE application layer measurements. |

A new study item for "Study on NR QoE management and optimizations for diverse services" has been approved for NR Rel-16. The purpose is to study solutions for QoE measurements in NR, not only for streaming services as in LTE but also for other services such as augmented or virtual reality (AR/VR), URLLC, etc. Based on requirements of the various services, the NR study will also include more adaptive QoE management schemes that enable intelligent network optimization to satisfy user experience for diverse services.

Similar to LTE, UE QoE measurements made in NG-RAN may be initiated by a management function (e.g., OAM) in a generic way for a group of UEs, or they may be initiated by the core network (e.g., 5GC) towards a specific UE based on signaling with the NG-RAN. As mentioned above, the configuration of the measurement includes the measurement details, which is encapsulated in a container that is transparent to the NG-RAN.

In general, the RAN (e.g., E-UTRAN or NG-RAN) is not aware of an ongoing streaming session for a UE and nor of when QoE measurements are being performed by the UE. Even so, it is important for the client or management function analyzing the measurements that the entire streaming session is measured. It is beneficial, then, that the UE maintains QoE measurements for the entire session, even during handover situation. It has been concluded during a 3GPP study that fragmented QoE reports are of little use. However, it is an implementation decision when RAN stops the QoE measurements. For example, it could be done when the UE has moved outside the measured area, e.g., due to a handover.

Even so, there are various problems, issues, and/or difficulties with current QoE measurement procedures such that they are unable to meet the requirements for the variety of services that will be deployed in 5G networks that may include both E-UTRAN and NG-RAN. For example, currently there is no defined behavior for QoE measurements by a UE in DC, including MR-DC with EPC or 5GC. This can lead to undesirable and/or unpredictable behavior in the UE and the network, as well as wasting of network resources for sending/receiving QoE measurement reports to and within the network (e.g., RAN).

Accordingly, embodiments of the present disclosure provide network signaling techniques that facilitate configuration of QoE measurements for UEs in DC with a MN and a SN, and reporting of configured QoE measurements to one or both of the MN and the SN. These embodiments can provide various benefits, advantages, and/or solutions to problems described herein. For example, a UE can send QoE measurements to a preferred and/or optimum network node when working in DC. This facilitates better resource utilization in the network, and more flexible and/or efficient QoE measurement reporting by the UE. For example, if the MN is an LTE eNB and the SN is an NR gNB, the UE can more efficiently transfer the QoE measurement files via NR than via LTE. By improving the configuration and reporting of QoE measurements, embodiments facilitate a network to improve application-level QoE for users based on such measurements.

In the following description of exemplary embodiments, the following groups of terms and/or abbreviations are used synonymously:

"QoE measurement report", "QMR", "QoE report", "measurement report"; and "report";

"QoE measurement configuration" and "QoE measurement";

"Service" and "application";

"leg" and "path";

"Measurement collection entity", "MCE", "trace collection entity", and "TCE".

In addition, the term "NG-RAN node" is used to refer to either a gNB or an ng-eNB, such as discussed above. Likewise, an "NG-RAN node CU" refers to a gNB-CU or an ng-eNB-CU, while "NG-RAN node DU" refers to a gNB-DU or an ng-eNB-DU.

Some embodiments include methods (e.g., procedures) performed by a UE. These methods can include various operations, summarized below. For example, the UE can receive an RRC message including a QoE measurement configuration, and receive the same or a different RRC message including configuration for QoE measurements in DC. This latter message possibly includes a QoE measurement configuration related to the SN. The UE can then perform QoE measurements in the application layer while in DC in the access layer, and send QoE measurement reports (e.g., measurement results files) to the MN, the SN, or both in accordance with the QoE measurement configuration. Put differently, the QoE measurement configuration can include a reporting configuration with respect to DC.

Other embodiments include methods (e.g., procedures) performed by a first radio access network node (RNN). These methods can include various operations, summarized below. For example, the first RNN can create QoE measurement configurations for the UE and send all or part of the QoE measurement configurations to the UE. In addition, the first RNN can send all or part of the QoE measurement configurations to a second RNN (e.g., eNB or gNB) when setting up or reconfiguring the second RNN for DC with the UE. The QoE measurement configurations related to the SN and the MN may be different. The first RNN can then receive QoE measurement reports (e.g., measurement results files) from the UE via the second RNN.

In various embodiments, the first and second RNNs can also transfer UE QoE measurement reports between them when in DC with a UE, depending on the MN/SN role of each RNN. In some embodiments, an SN can send UE QoE measurement reports in aggregation (e.g., of multiple reports) or upon a trigger condition (e.g., occurrence of a particular event). In some embodiments, the RNN receiving the QoE measurement report(s) (also referred to as "receiving RNN") sends to the other RNN (also referred to as "sending RNN") a request to be notified (also referred to as a "notification request") of the availability of QoE measurement report(s). In some embodiments, the receiving RNN can poll the sending RNN for available QoE measurement report(s), e.g., by sending a request. In some embodiments, the sending RNN can indicate to the receiving RNN that requested QoE measurement report(s) are not available.

In some embodiments, the MN for DC with the UE can send a QoE measurement configuration for the UE to a third RNN during inter-MN handover with or without SN change. In such scenarios, the third RNN becomes the new MN for the UE. In other embodiments, the MN for DC with the UE can send a QoE measurement configuration for the UE to a third RNN during SN-only change (i.e., without MN change). In such scenarios, the third RN becomes the new SN for the UE.

The embodiments summarized above will now be described in more detail. Various embodiments are related to a scenario in which the UE is being configured with a QoE configuration and DC is being set up. Conventionally, neither MN/SN for a UE nor an operations/administration/maintenance (OAM) function associated the RAN are aware of which of the DC legs (or both) will be used for transporting/carrying the data associated with the measured application (e.g., streaming data for a streaming application).

In some embodiments, upon receiving a QoE measurement configuration related to a particular application, the UE indicates to the RAN which of the DC legs will be used for the application session. This indication can be sent from the UE to the MN (e.g., via SRB1), the SN (e.g., via SRB3), or both. This indication can be in the form of a newly defined IE included in existing RRC messages, or in the form of a newly defined RRC message. Based on this indication from the UE to the MN and/or SN, various other configurations are possible, as described below.

In some embodiments, if the UE indicates that the data for the application is to be carried, in full or in part, over the SN leg, the MN may decide to transfer the QoE measurement configuration to the SN. If transfer of QoE measurement configurations should be supported between the MN and SN, the SN knows that the UE is configured with QoE measurements. For example, QoE-related information can be added to the SN Addition Request message of operation 1 in FIG. 9 or to the SgNB Addition Request message in operation 1 of FIG. 13. As a more specific example, a TRACE ACTIVATION IE similar to the one shown in Table 12 above can be added to the SN Addition Request message (also referred to as "S-Node Addition Request"). Table 13 below shows the contents of an exemplary TRACE ACTI-VATION IE that can be added to an SN Addition Request message in this manner.

bearers). For QoE measurements, these types of bearers could potentially be reused for sending QoE measurement reports. In LTE, QoE measurement configurations and QoE

TABLE 13

| IE/Group Name | Pres. | IE type/ref. | Semantics description |
|---|---|---|---|
| NG-RAN Trace ID | M | 9.2.3.97 | |
| Interfaces To Trace | M | BIT STRING (SIZE(8)) | Each position in the bitmap represents an NG-RAN node interface: first bit = NG-C, second bit = Xn-C, third bit = Uu, fourth bit = F1-C, fifth bit = E1, other bits reserved for future use. Value '1' indicates 'should be traced'; '0' indicates 'should not be traced'. |
| Trace Depth | M | ENUMERATED (minimum, medium, maximum, MinimumWithoutVendorSpecificExtension, MediumWithoutVendorSpecificExtension, MaximumWithoutVendorSpecificExtension, . . . ) | Defined in TS 32.422 [23]. |
| Trace Collection Entity IP Address | M | Transport Layer Address 9.2.3.29 | Defined in TS 32.422 [23] |
| UE Application layer measurement configuration | O | 9.2.x | |

In various embodiments, a RNN (e.g., MN) can configure a UE to send QoE measurement reports on one or more DC legs depending on the configuration and the situation in the network, e.g., load situation. In some embodiments, the UE is configured by the MN to send the report to only the MN. This can be considered the existing behavior. In other embodiments, the UE can be configured by the MN and/or SN to send QoE measurement reports to the MN, the SN, or both.

In some embodiments, the UE can be configured to send the same QoE measurement reports to both the MN and the SN. In other embodiments, the UE is configured to send the different QoE measurement reports to the MN and the SN respectively. For instance, the UE may send QoE measurement reports containing data collected via the MN leg (i.e., in MCG) to the MN and send QoE measurement reports containing data collected via the SN leg (i.e., in SCG) to the SN. In other embodiments, where the UE is configured to send all or some of the QoE measurement reports to the SN, the SN may be instructed to forward all or some of these reports to the MN, which then forwards them to the TCE or MCE.

In other embodiments, the UE can be configured to autonomously select the MN, the SN, or both for receiving its QoE measurement reports. The UE may base this decision on the current radio link qualities to the respective nodes, the currently available data rate in the MCG and SCG, etc. The UE may make this selection for each QoE measurement report or for each application.

In some embodiments, a QoE measurement report received from the UE triggers an RNN to establish DC with the UE, such as by adding an SN and an SCG consisting of at least one cell (e.g., PSCell). This can be done to increase the UE data rate or to improve robustness (e.g., reduce the rate of lost packets). In other embodiments, a QoE measurement report received from the UE triggers the RNN to add another SN and another SCG consisting of at least one cell.

As mentioned above, different types of bearer can be configured for DC, including MCG bearers, SCG bearers, split bearers, and duplicated bearers. This can be done for both SRBs (signaling radio bearers) and DRBs (data radio measurement reports are sent via the CP using a specific SRB (e.g., SRB4) that can be configured with lower priority than other SRBs carrying more important RRC messages. If SRB4 is chosen as a solution also for NR, the existing SRB4 configuration can be broadened and to cover possible configurations in NR. Similar configurations can be used for DRBs if NR QoE measurement reports are sent by UEs via UP.

The NR scenario in which reports are only sent via MN is similar to single connectivity and only corresponding configuration of SRB4 as in LTE needs to be added. In other reporting configurations, the SRB carrying reports could be configured as a split SRB so that reports can be transmitted via MN and/or SN depending on the configuration and current load situation. In case the QoE measurement report contains very important data, (e.g., for a URLLC application), the MN can have the possibility to configure the UE to send QoE measurement reports using PDCP duplication.

Another possibility is to configure SRB4 only as an SCG SRB. All QoE measurement report files would then be sent via the SCG, and the SN forwards the reports to the TCE or MCE. SRB4 in the SCG could also be configured as a split or duplicated SRB using CA.

As defined in 3GPP TS 38.331 (RRC specification), the CellGroupConfig IE includes configurations for either MN or SN and the sub-IE RLC-BearerConfig includes RLC configurations of SRBs and DRBs. In addition, the radioBearerConfig IE (which can be carried, e.g., in an RRCReconfiguration message) can be used to add, modify and release SRBs and/or DRBs and specifically carries the parameters for PDCP and, if applicable, SDAP. Configuration of split or duplicated SRBs and DRBs is already supported, and the only addition to support the configuration of split or duplicated SRB4 or configuration of SRB4 in the MCG or SCG is extension of the SRB range. FIGS. 20A and 20B show radioBearerConfig and RLC-BearerConfig IEs, respectively, modified to include and extension of the SRB range to include SRB4. These IEs can be used to setup and/or modify various DRBs or SRBs (including SRB4) for carrying QoE measurement reports according to the various embodiments described above.

In some embodiments, applicable to IAB nodes, where the IAB node serving the UE operates in EN-DC, the IAB-DU of this node is instructed via which leg to send the F1-C messages encapsulating a QoE measurement report. For example, the IAB-DU serving the UE may be instructed to send these F1-C uplink messages towards the IAB donor CU over the LTE leg, the NR leg, or both.

As mentioned above, a first RNN may want to receive UE QoE measurement reports that were sent to a second RNN, e.g., in case the first and second RNNs are in DC with the UE. In various embodiments, the first RNN can control and/or configure reception of these reports from the second RNN in various ways described below.

In some embodiments, a first RNN wanting to receive UE QoE measurement reports from a second RNN (e.g., in EN-DC or NR-DC) can poll the second RNN, either periodically or in response to certain events, e.g., change in first RNN load, release of the connection towards the SN node, SN Cell Change, etc. In response, the second RNN can indicate that the requested reports are available or unavailable and, if available, send the requested reports to the first RNN.

In some embodiments, the first RNN can instruct the second RNN to initiate the sending of QoE measurement result at the time as the UE connection to the second RNN is established. This can be part of an SN Addition Request message, as discussed above.

In other embodiments, the second RNN can indicate to first RNN that QoE measurement reports from the UE are available without an explicit poll. The second RNN can then send the reports without waiting for an explicit request from the first RNN, or it can wait for the explicit request before sending.

In case the second RNN indicates to the first RNN (either autonomously or in response to a poll/request) that UE QoE measurement reports are unavailable, the first RNN can respond to this indication in various ways including:

configuring QoE measurements by (an)other UE(s);
notifying the MCE that "fresh" data are no longer available from the UE; and
refrain from sending to the second RNN one or more further QoE measurement configurations for the UE.

In various embodiments, the first RNN (e.g., DC MN) can also send UE QoE measurement configurations to the second RNN (e.g., DC SN). In some embodiments, if the SN is operating in shared/unlicensed spectrum using LTE-LAA or NR-U, the MN can send the SN QoE measurement configurations related to measurement, collection, and or reporting of LBT and/or channel occupancy statistics.

In some embodiments, QoE measurement configurations sent from the MN to the SN may contain an instruction to the SN to send all or some of the QoE measurement reports it receives from the UE directly to an MCE or TCE. In this case, this instruction may contain address information enabling the SN to reach the MCE or TCE, such as an IP address, a port number, a URL, and/or a fully qualified domain name (FQDN). If a URL or FQDN is used, the SN may contact a DNS server to derive an IP address for the MCE or TCE.

In some embodiments, the SN may use the QoE measurement configuration(s) received from the MN to configure the UE, optionally creating further QoE measurement configurations and sending them to the UE together with the received QoE measurement configurations. If the SN adds further QoE measurement configurations, it may also send them to the MN. As another option, the SN can send the further QoE measurement configurations to the MN rather than to the UE. The MN can then send these QoE measurement configurations to the UE, possibly after modification by the MN (in which case the MN can inform the SN of the modifications). As another option, after receiving QoE measurement configurations from the SN, the MN sends back a confirmation and lets the SN send the QoE measurement configurations to the UE (with or without modifications by the MN, which can be indicated to the SN). As another option, the SN sends the further QoE measurement configuration(s) to the MN for informational purposes in addition to sending them to the UE, in which case the MN can store the received information for further reference.

In some embodiments, the MCG and SCG can operate using different RATs, such as any of the following combinations: LTE MCG and NR SCG; LTE MCG and LTE-LAA SCG (i.e., operation in shared/unlicensed spectrum); NR MCG and LTE SCG; NR MCG and NR-U SCG (i.e., operation in shared/unlicensed spectrum). In some embodiments, more than two nodes are involved in a multi-connectivity configuration for the UE. In this case, more than two RATs may be used in the setup.

Modification of QoE measurements during DC is currently not supported in LTE, and some modifications to various messages, protocols, and/or procedures are needed for support of this features. In particular, modification and/or reconfigurations of QoE measurements in the SN is a new case which would require modifications. For example, the MN- and SN-initiated SN modification procedures shown in FIGS. 14-15, respectively, can be modified according to these principles.

For MN-initiated SN modifications, the SgNB Modification Request message in operation 1 of FIG. 14 can be modified to include a TRACE ACTIVATION IE similar to the one shown in Table 13. For SN-initiated SN modifications, the SgNB Modification Required message in operation 1 of FIG. 15 can be modified to include a TRACE ACTIVATION IE similar to the one shown in Table 13.

As mentioned above, UE QoE measurement reports can also be exchanged between a MN and an SN arranged in DC with the UE. As an example, a new QoE Report Information IE can be defined for this purpose and included in various messages sent from MN (e.g., MgNB or Mng-eNB) to SN (e.g., SgNB or Sng-eNB) over the Xn interface, or in the opposite direction. Table 14 below shows exemplary contents of a QoE Report Information IE according to these embodiments.

TABLE 14

| IE/Group Name | Pres. | Range | IE type/ref. | Semantics description |
|---|---|---|---|---|
| QoE Report Information | | 0 . . . 1 | | |
| >QoE Report List Item | | 1 . . . | | |
| | | <maxnoofQoEReports> | | |
| >>M NG RAN node UE XnAP ID | O | | NG-RAN node UE XnAP ID 9.2.3.16 | |

TABLE 14-continued

| IE/Group Name | Pres. | Range | IE type/ref. | Semantics description |
|---|---|---|---|---|
| >>S NG RAN node UE XnAP ID | O | | NG-RAN node UE XnAP ID 9.2.3.16 | |
| >>NR QOE Report Container | O | | OCTET STRING | nr-QoE-Report-r17 IE defined elsewhere. |

The embodiments described above can be further illustrated with reference to FIGS. 21-23, which show exemplary methods (e.g., procedures) performed by a first RAN node (RNN), a second RNN, and a UE, respectively. In other words, various features of operations described below correspond to various embodiments described above. These exemplary methods can also be used cooperatively to provide various exemplary benefits and/or advantages. Although FIGS. 21-23 show specific blocks in a particular order, the operations of the respective methods can be performed in different orders than shown and can be combined and/or divided into blocks having different functionality than shown. Optional blocks or operations are indicated by dashed lines.

In particular, FIG. 21 shows a flow diagram of an exemplary method (e.g., procedure) for configuring quality of experience (QoE) measurements by user equipment (UEs) in a wireless network, according to various exemplary embodiments of the present disclosure. The exemplary method can be performed by a first RNN (e.g., base station, eNB, gNB, ng-eNB, en-gNB, CU, DU, etc., or component thereof) in a wireless network (e.g., E-UTRAN, NG-RAN), such as an RNN described elsewhere herein.

The exemplary method can include operations of block 2110, where the first RNN can send, to a UE connected to the first RNN, a QoE measurement configuration for one or more services provided by an application layer of the UE. The exemplary method can also include operations of block 2130, where the first RNN can send, to the UE, a configuration for access-layer multi-connectivity of the UE with a second RNN in the wireless network. The exemplary method can also include operations of block 2170, where the first RNN can receive one or more QoE measurement reports, in accordance with the QoE measurement configuration, from at least one of the UE and the second RNN. The QoE measurement reports include measurements made by the UE while in multi-connectivity with the first and second RNNs.

In some embodiments, the exemplary method can also include operations of block 2140, where the first RNN can receive, from the UE, an indication of whether data on which the UE will perform measurements for the one or more services is carried by the first RNN, by the second RNN, or by both the first and second RNNs. In some of these embodiments, the exemplary method can also include operations of block 2150, where the first RNN can send the QoE measurement configuration to the second RNN when the indication indicates that the data on which the UE will perform the measurements is carried at least in part by the second RNN.

In some embodiments, the exemplary method can also include operations of block 2120, where the first RNN can send, to the second RNN, a request to establish or to modify access-layer multi-connectivity with the UE. In such embodiments, the request can include the QoE measurement configuration. In some embodiments, the QoE measurement configuration is sent to the UE in a radio resource control (RRC) message together with the configuration for access-layer DC. For example, in such embodiments the operations of blocks 2110 and 2130 can be combined.

In some embodiments, the QoE measurement configuration can include a QoE reporting configuration that indicates that QoE measurement reports should be sent by the UE according to one of the following options:

only to the first RNN;

only to the second RNN;

to one or more of the first or second RNN as selected by the UE;

as duplicates to both the first and second RNNs; and to the RNN that carried the data on which the measurements were performed.

In some embodiments, the multi-connectivity includes a master cell group (MCG) for the first RNN and a secondary cell group (SCG) for the second RNN. In such embodiments, the QoE measurement reports can be received from the UE (e.g., in block 2170 via a split SCG signaling radio bearer (SRB) or via a split MCG SRB. As an example, the split SCG SRB or the split MCG SRB can be SRB4.

In some embodiments, the exemplary method can also include operations of block 2165, where the first RNN can send, to the second RNN, a request for QoE measurement reports received by the second RNN from the UE in accordance with the QoE measurement configuration. In such embodiments, the receiving operations of block 2170 can include the operations of sub-block 2171, where the first RNN can receive, from the second RNN, a response including one or more of the following: at least one of the requested QoE measurement reports; and an indication of availability or non-availability of the requested QoE measurement reports.

In some embodiments, the exemplary method can also include operations of block 2160, where the first RNN can receive, from the second RNN, an unsolicited indication of availability of QoE measurement reports received by the second RNN from the UE. In such embodiments, the request for the QoE measurement reports can be sent (e.g., in block 2165) in response to the unsolicited indication. In some embodiments, the exemplary method can also include operations of block 2180, where the first RNN can, based on receiving a response (e.g., to the request sent in block 2165) including an indication of non-availability, perform one or more of the following operations:

configuring QoE measurements by one or more other UE;

notifying a measurement collection entity (MCE) of the non-availability; and refraining from sending the second RNN one or more further QoE measurement configurations for the UE.

In some embodiments, the exemplary method can also include the operations of blocks 2190-95. In block 2190, the first RNN can, based on at least one of the QoE measurement reports received from the second RNN (e.g., in block 2170), initiate a procedure with a third RNN to operate in access-layer multi-connectivity with the UE and the first RNN. In block 2195, the first RNN can send the QoE measurement configuration to the third RNN. For example, the procedure can be an SN change, an MN change, or an SN addition.

In some embodiments, the exemplary method can also include the operations of block 2185, the first RNN can send, to the second RNN, one or more of the QoE measurement reports that were received from the UE. In some embodiments, these operations can be based on the operations of block 2186, where the first RNN can determine that the one more QoE measurements reports received from the UE include measurements made by the UE on data carried by the second RNN. In some of these embodiments, each of the QoE measurement reports received from second RNN (e.g., in block 2170) or sent to the second RNN (e.g., in block 2185) includes an identifier of the UE. The parameters MNG RAN node UE XnAP ID and S NG RAN node UE XnAP ID in Table 17 are examples of an identifier of a UE.

In addition, FIG. 22 shows a flow diagram of another exemplary method (e.g., procedure) for receiving quality of experience (QoE) measurements by user equipment (UEs), according to various exemplary embodiments of the present disclosure. The exemplary method can be performed by a second RNN (e.g., base station, eNB, gNB, ng-eNB, en-gNB, CU, DU, etc., or component thereof) in a wireless network (e.g., E-UTRAN, NG-RAN) such as RNNs described elsewhere herein.

The exemplary method can include the operations of block 2210, where the second RNN can receive, from a first RNN in the wireless network, a request to establish access-layer multi-connectivity with a UE and the first RNN. The exemplary method can also include the operations of block 2220, where the second RNN can receive, from the first RNN, a QoE measurement configuration for measurements by the UE in relation to one or more services provided by an application layer of the UE. The exemplary method can also include the operations of block 2250, where the second RNN can receive one or more QoE measurement reports, in accordance with the QoE measurement configuration, from at least one of the UE and the first RNN. The QoE measurement reports include measurements made by the UE while in multi-connectivity with the first and second RNNs.

In some embodiments, the request to establish multi-connectivity includes the QoE measurement configuration. For example, in such embodiments the operations of blocks 2210 and 2220 can be combined.

In some embodiments, the multi-connectivity includes a master cell group (MCG) for the first RNN and a secondary cell group (SCG) for the second RNN. In such embodiments, the QoE measurement reports can be received from the UE (e.g., in block 2250) via an SCG SRB, via a split SCG SRB, or via a split MCG SRB. As an example, the SRB, the split SCG SRB or the split MCG SRB can be SRB4.

In some embodiments, the QoE measurement configuration (e.g., received in block 2220) can include a QoE reporting configuration that indicates that QoE measurement reports should be sent by the UE according to one of the following options:

only to the first RNN;
    only to the second RNN;
    to one or more of the first or second RNN as selected by the UE;
    as duplicates to both the first and second RNNs; and
    to the RNN that carried the data on which the measurements were performed.

In some embodiments, the exemplary method can also include the operations of blocks 2270-2280. In block 2270, the second RNN can receive, from the first RNN, a request for QoE measurement reports received by the second RNN from the UE in accordance with the QoE measurement configuration. In block 2280, the second RNN can send, to the first RNN, a response including at least one of the QoE measurement reports received from the UE and/or an indication of availability or non-availability of the requested QoE measurement reports.

In some of these embodiments, the exemplary method can also include the operations of block 2260, where the second RNN can send, to the first RNN, an unsolicited indication of availability of QoE measurement reports received by the second RNN from the UE. In such embodiments, the request can be received (e.g., in block 2270) subsequent to (e.g., in response to) the unsolicited indication. In some of these embodiments, each of the QoE measurement reports received from first RNN (e.g., in block 2250) or sent to the first RNN (e.g., in block 2280) includes an identifier of the UE. The parameters MNG RAN node UE XnAP ID and S NG RAN node UE XnAP ID in Table 17 are examples of an identifier of a UE.

In some embodiments, the one more QoE measurements reports (e.g., received in block 2250) include at least one QoE measurement report, received from the first RNN, that includes measurements made by the UE on data carried by the second RNN.

In some embodiments, the exemplary method can also include the operations of blocks 2230-2240. In block 2230, the second RNN can determine a further QoE measurement configuration for the one or more services and/or one or more further services provided by the UE application layer based on the QoE measurement configuration (e.g., received in block 2220). In block 2240, the second RNN can send the further QoE measurement configuration to the UE. In such embodiments, the one or more measurement reports are received (e.g., in block 2250) in accordance with the QoE measurement configuration and the further QoE measurement configuration.

In addition, FIG. 23 shows a flow diagram of another exemplary method (e.g., procedure) for performing quality of experience (QoE) measurements configured by a wireless network, according to various exemplary embodiments of the present disclosure. The exemplary method can be performed by a UE (e.g., wireless device, IoT device, etc.) operating in the wireless network (e.g., E-UTRAN, NG-RAN), such as UEs described elsewhere herein.

The exemplary method can include the operations of block 2310, where UE can, while connected to a first RNN in the wireless network, receive a QoE measurement configuration one or more services provided by an application layer of the UE. The exemplary method can also include the operations of block 2320, where the UE can receive a configuration for access-layer multi-connectivity of the UE with a second RNN in the wireless network. The exemplary method can also include the operations of block 2350, where the UE can, while in layer multi-connectivity with the first and second RNNs, perform measurements for the one or more services in accordance with the QoE measurement configuration. The exemplary method can also include the operations of block 2370, where the UE can send one or more QoE measurement reports, in accordance with the QoE measurement configuration, to at least one of the first RNN and the second RNN.

In some embodiments, the multi-connectivity includes a master cell group (MCG) for the first RNN and a secondary cell group (SCG) for the second RNN. In such embodiments, each QoE measurement reports can be sent by the UE (e.g., in block 2370) according to one of the following:

to the second RNN via an SCG signaling radio bearer, SRB;

to the second RNN via a split SCG SRB or a split MCG SRB; or to the first RNN via the split SCG SRB or the split MCG SRB.

As an example, the SRB, the split SCG SRB or the split MCG SRB can be SRB4.

In some embodiments, the exemplary method can also include the operations of block 2330, where the UE can send, to the first RNN, an indication of whether data on which the UE will perform measurements for the one or more services is carried by the first RNN, by the second RNN, or by both the first and second RNNs.

In some embodiments, the QoE measurement configuration can include a QoE reporting configuration that indicates that QoE measurement reports should be sent by the UE according to one of the following options:

only to the first RNN;

only to the second RNN;

to one or more of the first or second RNN as selected by the UE;

as duplicates to both the first and second RNNs; and to the RNN that carried the data on which the measurements were performed.

In some embodiments, the exemplary method can also include the operations of block 2360, where the UE can select at least one of the first and second RNNs to receive the QoE measurement reports based on one or more of the following: a QoE reporting configuration provided by the first RNN; quality of the respective radio links to the first and second RNNs; and data rate of the respective radio links to the first and second RNNs.

In some embodiments, the QoE measurement configuration can be received in a radio resource control (RRC) message together with the configuration for access-layer multi-connectivity. For example, in such embodiments the operations of blocks 2310 and 2320 can be combined.

In some embodiments, the exemplary method can also include the operations of block 2340, where the UE can receive, from the second RNN, a further QoE measurement configuration for the one or more applications and/or one or more further applications. In such embodiments, the measurements can be performed (e.g., in block 2350) in accordance with the QoE measurement configuration and the further QoE measurement configuration.

Although various embodiments are described herein above in terms of methods, apparatus, devices, computer-readable medium and receivers, the person of ordinary skill will readily comprehend that such methods can be embodied by various combinations of hardware and software in various systems, communication devices, computing devices, control devices, apparatuses, non-transitory computer-readable media, etc.

Figure 24:
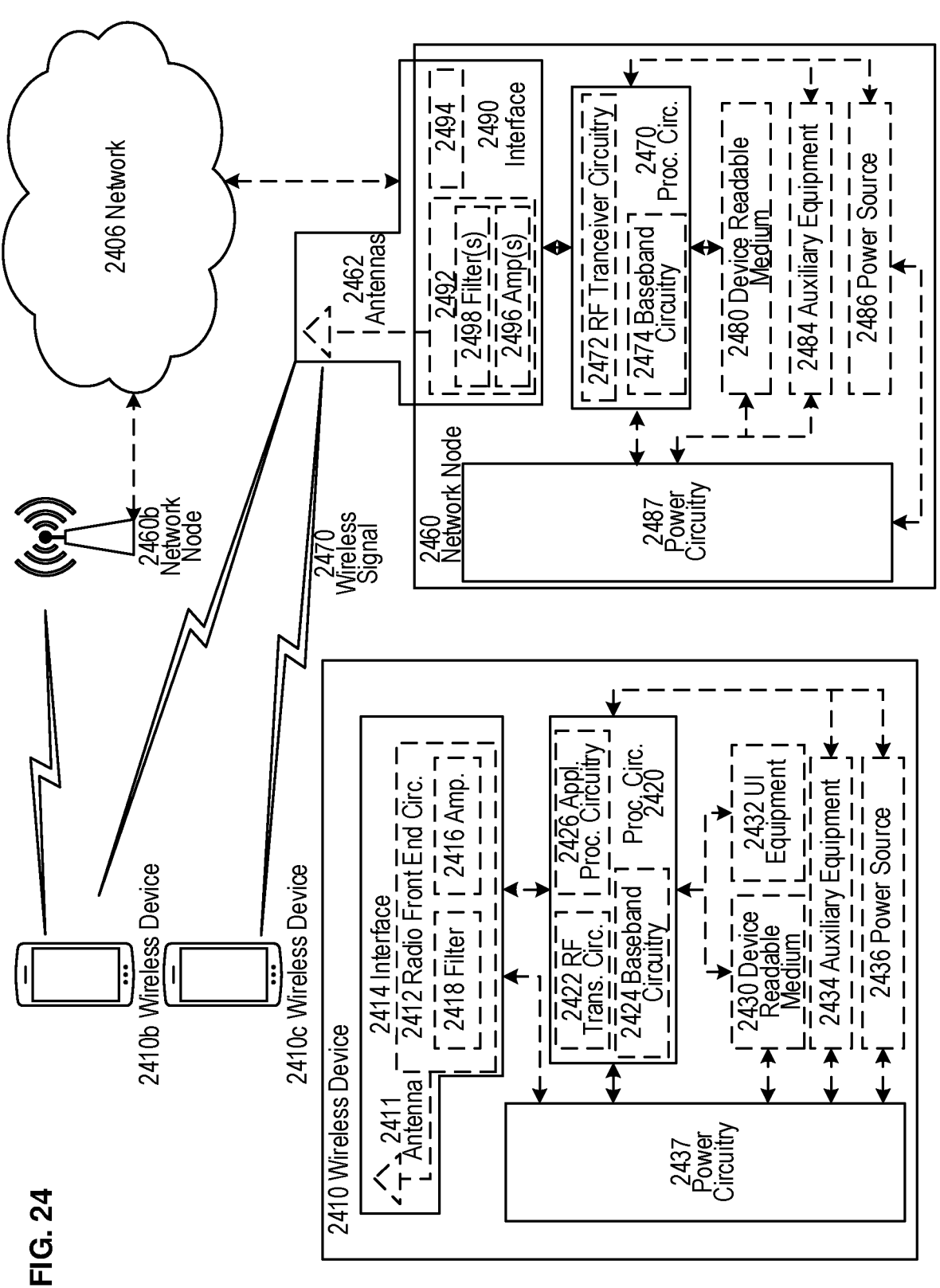
FIG. 24 illustrates an exemplary embodiment of a wireless network, according to various exemplary embodiments of the present disclosure.

For example, FIG. 24 shows an exemplary wireless network in which various embodiments disclosed herein can be implemented. For simplicity, the wireless network of FIG. 24 only depicts network 2406, network nodes 2460 and 2460*b*, and WDs 2410, 2410*b*, and 2410*c*. In practice, a wireless network can further include any additional elements suitable to support communication between wireless devices or between a wireless device and another communication device, such as a landline telephone, a service provider, or any other network node or end device. Of the illustrated components, network node 2460 and wireless device (WD) 2410 are depicted with additional detail. The wireless network can provide communication and other types of services to one or more wireless devices to facilitate the wireless devices' access to and/or use of the services provided by, or via, the wireless network.

The wireless network can comprise and/or interface with any type of communication, telecommunication, data, cellular, and/or radio network or other similar type of system. In some embodiments, the wireless network can be configured to operate according to specific standards or other types of predefined rules or procedures. Thus, particular embodiments of the wireless network can implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 2406 can comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 2460 and WD 2410 comprise various components described in more detail below. These components work together in order to provide network node and/or wireless device functionality, such as providing wireless connections in a wireless network. In different embodiments, the wireless network can comprise any number of wired or wireless networks, network nodes, base stations, controllers, wireless devices, relay stations, and/or any other components or systems that can facilitate or participate in the communication of data and/or signals whether via wired or wireless connections.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations can be categorized based on the amount of coverage they provide (or, stated differently, their transmit power level) and can then also be referred to as femto base stations, pico base stations, micro base stations, or macro base stations. A base station can be a relay node or a relay donor node controlling a relay. A network node can also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station can also be referred to as nodes in a distributed antenna system (DAS).

Further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node can be a virtual network node as described in more detail below. More generally, however, network nodes can represent any suitable device (or group of devices) capable, configured, arranged, and/or operable to enable and/or provide a wireless device with access to the wireless network or to provide some service to a wireless device that has accessed the wireless network.

In FIG. 24, network node 2460 includes processing circuitry 2470, device readable medium 2480, interface 2490, auxiliary equipment 2484, power source 2486, power circuitry 2487, and antenna 2462. Although network node 2460 illustrated in the example wireless network of FIG. 24 can represent a device that includes the illustrated combination of hardware components, other embodiments can comprise network nodes with different combinations of components. It is to be understood that a network node comprises any suitable combination of hardware and/or software needed to perform the tasks, features, functions and methods and/or procedures disclosed herein. Moreover, while the components of network node 2460 are depicted as single boxes located within a larger box, or nested within multiple boxes, in practice, a network node can comprise multiple different physical components that make up a single illustrated component (e.g., device readable medium 2480 can comprise multiple separate hard drives as well as multiple RAM modules).

Similarly, network node 2460 can be composed of multiple physically separate components (e.g., a NodeB component and a RNC component, or a BTS component and a BSC component, etc.), which can each have their own respective components. In certain scenarios in which network node 2460 comprises multiple separate components (e.g., BTS and BSC components), one or more of the separate components can be shared among several network nodes. For example, a single RNC can control multiple NodeB's. In such a scenario, each unique NodeB and RNC pair, can in some instances be considered a single separate network node. In some embodiments, network node 2460 can be configured to support multiple radio access technologies (RATs). In such embodiments, some components can be duplicated (e.g., separate device readable medium 2480 for the different RATs) and some components can be reused (e.g., the same antenna 2462 can be shared by the RATs). Network node 2460 can also include multiple sets of the various illustrated components for different wireless technologies integrated into network node 2460, such as, for example, GSM, WCDMA, LTE, NR, WiFi, or Bluetooth wireless technologies. These wireless technologies can be integrated into the same or different chip or set of chips and other components within network node 2460.

Processing circuitry 2470 can be configured to perform any determining, calculating, or similar operations (e.g., certain obtaining operations) described herein as being provided by a network node. These operations performed by processing circuitry 2470 can include processing information obtained by processing circuitry 2470 by, for example, converting the obtained information into other information, comparing the obtained information or converted information to information stored in the network node, and/or performing one or more operations based on the obtained information or converted information, and as a result of said processing making a determination.

Processing circuitry 2470 can comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide various functionality of network node 2460, either alone or in conjunction with other network node 2460 components (e.g., device readable medium 2480). Such functionality can include any of the various wireless features, functions, or benefits discussed herein.

For example, processing circuitry 2470 can execute instructions stored in device readable medium 2480 or in memory within processing circuitry 2470. In some embodiments, processing circuitry 2470 can include a system on a chip (SOC). As a more specific example, instructions (also referred to as a computer program product) stored in medium 2480 can include instructions that, when executed by processing circuitry 2470, can configure network node 2460 to perform operations corresponding to various exemplary methods (e.g., procedures) described herein.

In some embodiments, processing circuitry 2470 can include one or more of radio frequency (RF) transceiver circuitry 2472 and baseband processing circuitry 2474. In some embodiments, radio frequency (RF) transceiver circuitry 2472 and baseband processing circuitry 2474 can be on separate chips (or sets of chips), boards, or units, such as radio units and digital units. In alternative embodiments, part or all of RF transceiver circuitry 2472 and baseband processing circuitry 2474 can be on the same chip or set of chips, boards, or units In certain embodiments, some or all of the functionality described herein as being provided by a network node, base station, eNB or other such network device can be performed by processing circuitry 2470 executing instructions stored on device readable medium 2480 or memory within processing circuitry 2470. In alternative embodiments, some or all of the functionality can be provided by processing circuitry 2470 without executing instructions stored on a separate or discrete device readable medium, such as in a hard-wired manner. In any of those embodiments, whether executing instructions stored on a device readable storage medium or not, processing circuitry 2470 can be configured to perform the described functionality. The benefits provided by such functionality are not limited to processing circuitry 2470 alone or to other components of network node 2460 but are enjoyed by network node 2460 as a whole, and/or by end users and the wireless network generally.

Device readable medium 2480 can comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that can be used by processing circuitry 2470. Device readable medium 2480 can store any suitable instructions, data or information, including a computer program, software, an application including one or more of logic, rules, code, tables, etc. and/or other instructions capable of being executed by processing circuitry 2470 and, utilized by network node 2460. Device readable medium 2480 can be used to store any calculations made by processing circuitry 2470 and/or any data received via interface 2490. In some embodiments, processing circuitry 2470 and device readable medium 2480 can be considered to be integrated.

Interface 2490 is used in the wired or wireless communication of signaling and/or data between network node 2460, network 2406, and/or WDs 2410. As illustrated, interface 2490 comprises port(s)/terminal(s) 2494 to send and receive data, for example to and from network 2406 over a wired connection. Interface 2490 also includes radio front end circuitry 2492 that can be coupled to, or in certain embodiments a part of, antenna 2462. Radio front end circuitry 2492 comprises filters 2498 and amplifiers 2496. Radio front end circuitry 2492 can be connected to antenna 2462 and processing circuitry 2470. Radio front end circuitry can be configured to condition signals communicated between antenna 2462 and processing circuitry 2470. Radio front end circuitry 2492 can receive digital data that is to be sent out to other network nodes or WDs via a wireless connection. Radio front end circuitry 2492 can convert the digital data into a radio signal having the appropriate channel and bandwidth parameters using a combination of filters 2498 and/or amplifiers 2496. The radio signal can then be transmitted via antenna 2462. Similarly, when receiving data, antenna 2462 can collect radio signals which are then converted into digital data by radio front end circuitry 2492. The digital data can be passed to processing circuitry 2470. In other embodiments, the interface can comprise different components and/or different combinations of components.

In certain alternative embodiments, network node 2460 may not include separate radio front end circuitry 2492, instead, processing circuitry 2470 can comprise radio front end circuitry and can be connected to antenna 2462 without separate radio front end circuitry 2492. Similarly, in some embodiments, all or some of RF transceiver circuitry 2472 can be considered a part of interface 2490. In still other embodiments, interface 2490 can include one or more ports or terminals 2494, radio front end circuitry 2492, and RF transceiver circuitry 2472, as part of a radio unit (not shown), and interface 2490 can communicate with baseband processing circuitry 2474, which is part of a digital unit (not shown).

Antenna 2462 can include one or more antennas, or antenna arrays, configured to send and/or receive wireless signals. Antenna 2462 can be coupled to radio front end circuitry 2490 and can be any type of antenna capable of transmitting and receiving data and/or signals wirelessly. In some embodiments, antenna 2462 can comprise one or more omni-directional, sector or panel antennas operable to transmit/receive radio signals between, for example, 2 GHz and 66 GHz. An omni-directional antenna can be used to transmit/receive radio signals in any direction, a sector antenna can be used to transmit/receive radio signals from devices within a particular area, and a panel antenna can be a line of sight antenna used to transmit/receive radio signals in a relatively straight line. In some instances, the use of more than one antenna can be referred to as MIMO. In certain embodiments, antenna 2462 can be separate from network node 2460 and can be connectable to network node 2460 through an interface or port.

Antenna 2462, interface 2490, and/or processing circuitry 2470 can be configured to perform any receiving operations and/or certain obtaining operations described herein as being performed by a network node. Any information, data and/or signals can be received from a wireless device, another network node and/or any other network equipment. Similarly, antenna 2462, interface 2490, and/or processing circuitry 2470 can be configured to perform any transmitting operations described herein as being performed by a network node. Any information, data and/or signals can be transmitted to a wireless device, another network node and/or any other network equipment.

Power circuitry 2487 can comprise, or be coupled to, power management circuitry and can be configured to supply the components of network node 2460 with power for performing the functionality described herein. Power circuitry 2487 can receive power from power source 2486.

Power source 2486 and/or power circuitry 2487 can be configured to provide power to the various components of network node 2460 in a form suitable for the respective components (e.g., at a voltage and current level needed for each respective component). Power source 2486 can either be included in, or external to, power circuitry 2487 and/or network node 2460. For example, network node 2460 can be connectable to an external power source (e.g., an electricity outlet) via an input circuitry or interface such as an electrical cable, whereby the external power source supplies power to power circuitry 2487. As a further example, power source 2486 can comprise a source of power in the form of a battery or battery pack which is connected to, or integrated in, power circuitry 2487. The battery can provide backup power should the external power source fail. Other types of power sources, such as photovoltaic devices, can also be used.

Alternative embodiments of network node 2460 can include additional components beyond those shown in FIG. 24 that can be responsible for providing certain aspects of the network node's functionality, including any of the functionality described herein and/or any functionality necessary to support the subject matter described herein. For example, network node 2460 can include user interface equipment to allow and/or facilitate input of information into network node 2460 and to allow and/or facilitate output of information from network node 2460. This can allow and/or facilitate a user to perform diagnostic, maintenance, repair, and other administrative functions for network node 2460.

In some embodiments, a wireless device (WD, e.g., WD 2410) can be configured to transmit and/or receive information without direct human interaction. For instance, a WD can be designed to transmit information to a network on a predetermined schedule, when triggered by an internal or external event, or in response to requests from the network. Examples of a WD include, but are not limited to, smart phones, mobile phones, cell phones, voice over IP (VoIP) phones, wireless local loop phones, desktop computers, personal digital assistants (PDAs), wireless cameras, gaming consoles or devices, music storage devices, playback appliances, wearable devices, wireless endpoints, mobile stations, tablets, laptops, laptop-embedded equipment (LEE), laptop-mounted equipment (LME), smart devices, wireless customer-premise equipment (CPE), mobile-type communication (MTC) devices, Internet-of-Things (IoT) devices, vehicle-mounted wireless terminal devices, etc.

A WD can support device-to-device (D2D) communication, for example by implementing a 3GPP standard for sidelink communication, vehicle-to-vehicle (V2V), vehicle-to-infrastructure (V2I), vehicle-to-everything (V2X) and can in this case be referred to as a D2D communication device. As yet another specific example, in an Internet of Things (IoT) scenario, a WD can represent a machine or other device that performs monitoring and/or measurements and transmits the results of such monitoring and/or measurements to another WD and/or a network node. The WD can in this case be a machine-to-machine (M2M) device, which can in a 3GPP context be referred to as an MTC device. As one particular example, the WD can be a UE implementing the 3GPP narrow band internet of things (NB-IoT) standard. Particular examples of such machines or devices are sensors, metering devices such as power meters, industrial machinery, or home or personal appliances (e.g., refrigerators, televisions, etc.) personal wearables (e.g., watches, fitness trackers, etc.). In other scenarios, a WD can represent a vehicle or other equipment that is capable of monitoring and/or reporting on its operational status or other functions associated with its operation. A WD as described above can represent the endpoint of a wireless connection, in which case the device can be referred to as a wireless terminal. Furthermore, a WD as described above can be mobile, in which case it can also be referred to as a mobile device or a mobile terminal.

As illustrated, wireless device 2410 includes antenna 2411, interface 2414, processing circuitry 2420, device readable medium 2430, user interface equipment 2432, auxiliary equipment 2434, power source 2436 and power circuitry 2437. WD 2410 can include multiple sets of one or more of the illustrated components for different wireless technologies supported by WD 2410, such as, for example, GSM, WCDMA, LTE, NR, WiFi, WiMAX, or Bluetooth wireless technologies, just to mention a few. These wireless technologies can be integrated into the same or different chips or set of chips as other components within WD 2410.

Antenna 2411 can include one or more antennas or antenna arrays, configured to send and/or receive wireless signals, and is connected to interface 2414. In certain alternative embodiments, antenna 2411 can be separate from WD 2410 and be connectable to WD 2410 through an interface or port. Antenna 2411, interface 2414, and/or processing circuitry 2420 can be configured to perform any receiving or transmitting operations described herein as being performed by a WD. Any information, data and/or signals can be received from a network node and/or another WD. In some embodiments, radio front end circuitry and/or antenna 2411 can be considered an interface.

As illustrated, interface 2414 comprises radio front end circuitry 2412 and antenna 2411. Radio front end circuitry 2412 comprise one or more filters 2418 and amplifiers 2416. Radio front end circuitry 2414 is connected to antenna 2411 and processing circuitry 2420 and can be configured to condition signals communicated between antenna 2411 and processing circuitry 2420. Radio front end circuitry 2412 can be coupled to or a part of antenna 2411. In some embodiments, WD 2410 may not include separate radio front end circuitry 2412; rather, processing circuitry 2420 can comprise radio front end circuitry and can be connected to antenna 2411. Similarly, in some embodiments, some or all of RF transceiver circuitry 2422 can be considered a part of interface 2414. Radio front end circuitry 2412 can receive digital data that is to be sent out to other network nodes or WDs via a wireless connection. Radio front end circuitry 2412 can convert the digital data into a radio signal having the appropriate channel and bandwidth parameters using a combination of filters 2418 and/or amplifiers 2416. The radio signal can then be transmitted via antenna 2411. Similarly, when receiving data, antenna 2411 can collect radio signals which are then converted into digital data by radio front end circuitry 2412. The digital data can be passed to processing circuitry 2420. In other embodiments, the interface can comprise different components and/or different combinations of components.

Processing circuitry 2420 can comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide WD 2410 functionality either alone or in combination with other WD 2410 components, such as device readable medium 2430. Such functionality can include any of the various wireless features or benefits discussed herein.

For example, processing circuitry 2420 can execute instructions stored in device readable medium 2430 or in memory within processing circuitry 2420 to provide the functionality disclosed herein. More specifically, instructions (also referred to as a computer program product) stored in medium 2430 can include instructions that, when executed by processor 2420, can configure wireless device 2410 to perform operations corresponding to various exemplary methods (e.g., procedures) described herein.

As illustrated, processing circuitry 2420 includes one or more of RF transceiver circuitry 2422, baseband processing circuitry 2424, and application processing circuitry 2426. In other embodiments, the processing circuitry can comprise different components and/or different combinations of components. In certain embodiments processing circuitry 2420 of WD 2410 can comprise a SOC. In some embodiments, RF transceiver circuitry 2422, baseband processing circuitry 2424, and application processing circuitry 2426 can be on separate chips or sets of chips. In alternative embodiments, part or all of baseband processing circuitry 2424 and application processing circuitry 2426 can be combined into one chip or set of chips, and RF transceiver circuitry 2422 can be on a separate chip or set of chips. In still alternative embodiments, part or all of RF transceiver circuitry 2422 and baseband processing circuitry 2424 can be on the same chip or set of chips, and application processing circuitry 2426 can be on a separate chip or set of chips. In yet other alternative embodiments, part or all of RF transceiver circuitry 2422, baseband processing circuitry 2424, and application processing circuitry 2426 can be combined in the same chip or set of chips. In some embodiments, RF transceiver circuitry 2422 can be a part of interface 2414. RF transceiver circuitry 2422 can condition RF signals for processing circuitry 2420.

In certain embodiments, some or all of the functionality described herein as being performed by a WD can be provided by processing circuitry 2420 executing instructions stored on device readable medium 2430, which in certain embodiments can be a computer-readable storage medium. In alternative embodiments, some or all of the functionality can be provided by processing circuitry 2420 without executing instructions stored on a separate or discrete device readable storage medium, such as in a hard-wired manner. In any of those particular embodiments, whether executing instructions stored on a device readable storage medium or not, processing circuitry 2420 can be configured to perform the described functionality. The benefits provided by such functionality are not limited to processing circuitry 2420 alone or to other components of WD 2410, but are enjoyed by WD 2410 as a whole, and/or by end users and the wireless network generally.

Processing circuitry 2420 can be configured to perform any determining, calculating, or similar operations (e.g., certain obtaining operations) described herein as being performed by a WD. These operations, as performed by processing circuitry 2420, can include processing information obtained by processing circuitry 2420 by, for example, converting the obtained information into other information, comparing the obtained information or converted information to information stored by WD 2410, and/or performing one or more operations based on the obtained information or converted information, and as a result of said processing making a determination.

Device readable medium 2430 can be operable to store a computer program, software, an application including one or more of logic, rules, code, tables, etc. and/or other instructions capable of being executed by processing circuitry 2420. Device readable medium 2430 can include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that can be used by processing circuitry 2420. In some embodiments, processing circuitry 2420 and device readable medium 2430 can be considered to be integrated.

User interface equipment 2432 can include components that allow and/or facilitate a human user to interact with WD 2410. Such interaction can be of many forms, such as visual, audial, tactile, etc. User interface equipment 2432 can be operable to produce output to the user and to allow and/or facilitate the user to provide input to WD 2410. The type of interaction can vary depending on the type of user interface equipment 2432 installed in WD 2410. For example, if WD 2410 is a smart phone, the interaction can be via a touch screen; if WD 2410 is a smart meter, the interaction can be through a screen that provides usage (e.g., the number of gallons used) or a speaker that provides an audible alert (e.g., if smoke is detected). User interface equipment 2432 can include input interfaces, devices and circuits, and output interfaces, devices and circuits. User interface equipment 2432 can be configured to allow and/or facilitate input of information into WD 2410 and is connected to processing circuitry 2420 to allow and/or facilitate processing circuitry 2420 to process the input information. User interface equipment 2432 can include, for example, a microphone, a proximity or other sensor, keys/buttons, a touch display, one or more cameras, a USB port, or other input circuitry. User interface equipment 2432 is also configured to allow and/or facilitate output of information from WD 2410, and to allow and/or facilitate processing circuitry 2420 to output information from WD 2410. User interface equipment 2432 can include, for example, a speaker, a display, vibrating circuitry, a USB port, a headphone interface, or other output circuitry. Using one or more input and output interfaces, devices, and circuits, of user interface equipment 2432, WD 2410 can communicate with end users and/or the wireless network and allow and/or facilitate them to benefit from the functionality described herein.

Auxiliary equipment 2434 is operable to provide more specific functionality which may not be generally performed by WDs. This can comprise specialized sensors for doing measurements for various purposes, interfaces for additional types of communication such as wired communications etc. The inclusion and type of components of auxiliary equipment 2434 can vary depending on the embodiment and/or scenario.

Power source 2436 can, in some embodiments, be in the form of a battery or battery pack. Other types of power sources, such as an external power source (e.g., an electricity outlet), photovoltaic devices or power cells, can also be used. WD 2410 can further comprise power circuitry 2437 for delivering power from power source 2436 to the various parts of WD 2410 which need power from power source 2436 to carry out any functionality described or indicated herein. Power circuitry 2437 can in certain embodiments comprise power management circuitry. Power circuitry 2437 can additionally or alternatively be operable to receive power from an external power source; in which case WD 2410 can be connectable to the external power source (such as an electricity outlet) via input circuitry or an interface such as an electrical power cable. Power circuitry 2437 can also in certain embodiments be operable to deliver power from an external power source to power source 2436. This can be, for example, for the charging of power source 2436.

Power circuitry 2437 can perform any converting or other modification to the power from power source 2436 to make it suitable for supply to the respective components of WD 2410.

Figure 25:
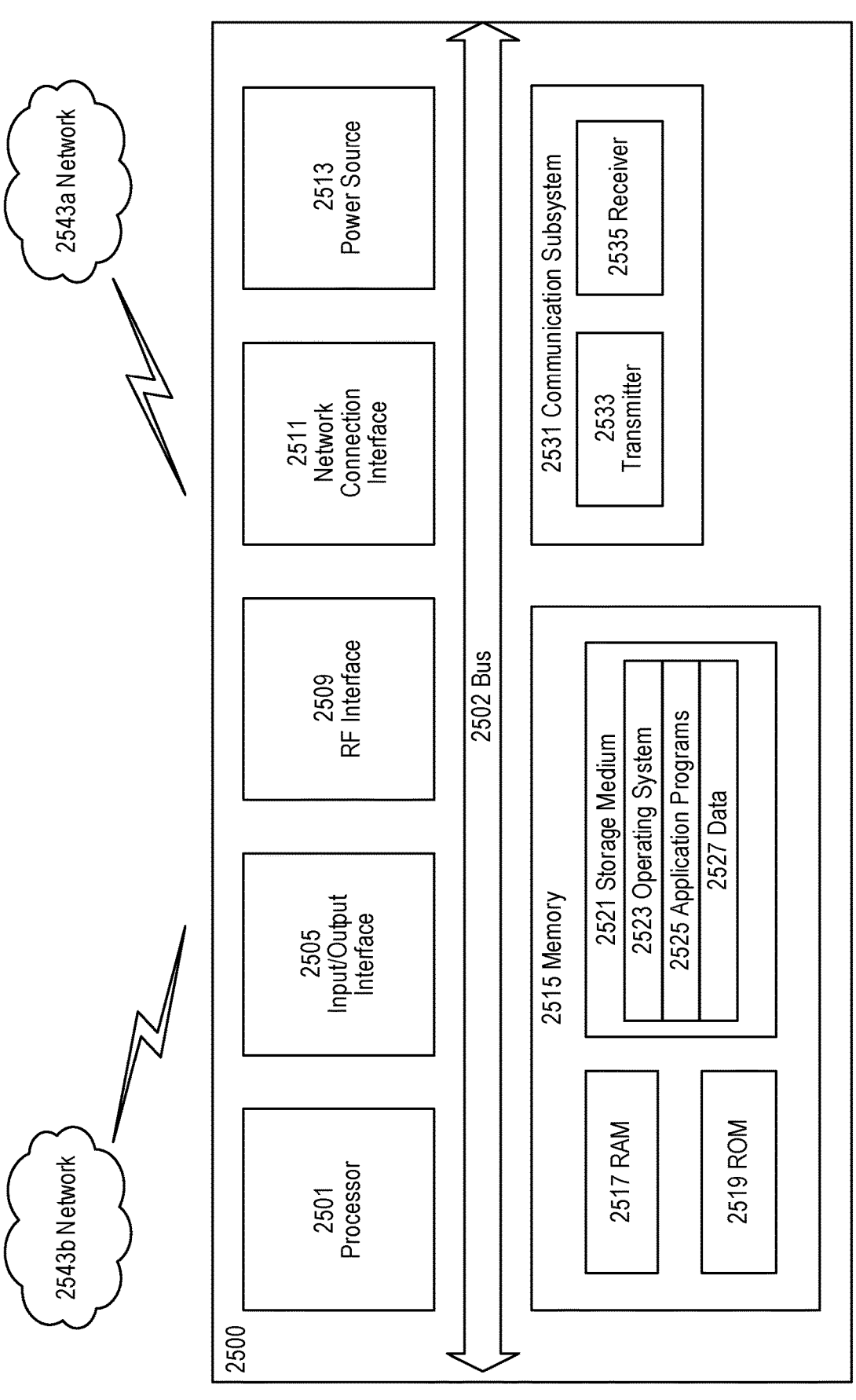
FIG. 25 illustrates an exemplary embodiment of a UE, according to various exemplary embodiments of the present disclosure.

FIG. 25 illustrates one embodiment of a UE in accordance with various aspects described herein. As used herein, a user equipment or UE may not necessarily have a user in the sense of a human user who owns and/or operates the relevant device. Instead, a UE can represent a device that is intended for sale to, or operation by, a human user but which may not, or which may not initially, be associated with a specific human user (e.g., a smart sprinkler controller). Alternatively, a UE can represent a device that is not intended for sale to, or operation by, an end user but which can be associated with or operated for the benefit of a user (e.g., a smart power meter). UE 25200 can be any UE identified by the $3^{rd}$ Generation Partnership Project (3GPP), including a NB-IoT UE, a machine type communication (MTC) UE, and/or an enhanced MTC (eMTC) UE. UE 2500, as illustrated in FIG. 25, is one example of a WD configured for communication in accordance with one or more communication standards promulgated by the $3^{rd}$ Generation Partnership Project (3GPP), such as 3GPP's GSM, UMTS, LTE, and/or 5G standards. As mentioned previously, the term WD and UE can be used interchangeable. Accordingly, although FIG. 25 is a UE, the components discussed herein are equally applicable to a WD, and vice-versa.

In FIG. 25, UE 2500 includes processing circuitry 2501 that is operatively coupled to input/output interface 2505, radio frequency (RF) interface 2509, network connection interface 2511, memory 2515 including random access memory (RAM) 2517, read-only memory (ROM) 2519, and storage medium 2521 or the like, communication subsystem 2531, power source 2533, and/or any other component, or any combination thereof. Storage medium 2521 includes operating system 2523, application program 2525, and data 2527. In other embodiments, storage medium 2521 can include other similar types of information. Certain UEs can utilize all of the components shown in FIG. 25, or only a subset of the components. The level of integration between the components can vary from one UE to another UE. Further, certain UEs can contain multiple instances of a component, such as multiple processors, memories, transceivers, transmitters, receivers, etc.

In FIG. 25, processing circuitry 2501 can be configured to process computer instructions and data. Processing circuitry 2501 can be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 2501 can include two central processing units (CPUs). Data can be information in a form suitable for use by a computer.

In the depicted embodiment, input/output interface 2505 can be configured to provide a communication interface to an input device, output device, or input and output device. UE 2500 can be configured to use an output device via input/output interface 2505. An output device can use the same type of interface port as an input device. For example, a USB port can be used to provide input to and output from UE 2500. The output device can be a speaker, a sound card, a video card, a display, a monitor, a printer, an actuator, an emitter, a smartcard, another output device, or any combination thereof. UE 2500 can be configured to use an input device via input/output interface 2505 to allow and/or facilitate a user to capture information into UE 2500. The input device can include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display can include a capacitive or resistive touch sensor to sense input from a user. A sensor can be, for instance, an accelerometer, a gyroscope, a tilt sensor, a force sensor, a magnetometer, an optical sensor, a proximity sensor, another like sensor, or any combination thereof. For example, the input device can be an accelerometer, a magnetometer, a digital camera, a microphone, and an optical sensor.

In FIG. 25, RF interface 2509 can be configured to provide a communication interface to RF components such as a transmitter, a receiver, and an antenna. Network connection interface 2511 can be configured to provide a communication interface to network 2543*a*. Network 2543*a* can encompass wired and/or wireless networks such as a local-area network (LAN), a wide-area network (WAN), a computer network, a wireless network, a telecommunications network, another like network or any combination thereof. For example, network 2543*a* can comprise a Wi-Fi network. Network connection interface 2511 can be configured to include a receiver and a transmitter interface used to communicate with one or more other devices over a communication network according to one or more communication protocols, such as Ethernet, TCP/IP, SONET, ATM, or the like. Network connection interface 2511 can implement receiver and transmitter functionality appropriate to the communication network links (e.g., optical, electrical, and the like). The transmitter and receiver functions can share circuit components, software or firmware, or alternatively can be implemented separately.

RAM 2517 can be configured to interface via bus 2502 to processing circuitry 2501 to provide storage or caching of data or computer instructions during the execution of software programs such as the operating system, application programs, and device drivers. ROM 2519 can be configured to provide computer instructions or data to processing circuitry 2501. For example, ROM 2519 can be configured to store invariant low-level system code or data for basic system functions such as basic input and output (I/O), startup, or reception of keystrokes from a keyboard that are stored in a non-volatile memory. Storage medium 2521 can be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives.

In one example, storage medium 2521 can be configured to include operating system 2523; application program 2525 such as a web browser application, a widget or gadget engine or another application; and data file 2527. Storage medium 2521 can store, for use by UE 2500, any of a variety of various operating systems or combinations of operating systems. For example, application program 2525 can include executable program instructions (also referred to as a computer program product) that, when executed by processor 2501, can configure UE 2500 to perform operations corresponding to various exemplary methods (e.g., procedures) described herein.

Storage medium 2521 can be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 2521 can allow and/or facilitate UE 2500 to access computer-executable instructions, application programs or the like, stored on transitory or non-transitory memory media, to off-load data, or to upload data. An article of manufacture, such as one utilizing a communication system can be tangibly embodied in storage medium 2521, which can comprise a device readable medium.

In FIG. 25, processing circuitry 2501 can be configured to communicate with network 2543*b* using communication subsystem 2531. Network 2543*a* and network 2543*b* can be the same network or networks or different network or networks. Communication subsystem 2531 can be configured to include one or more transceivers used to communicate with network 2543*b*. For example, communication subsystem 2531 can be configured to include one or more transceivers used to communicate with one or more remote transceivers of another device capable of wireless communication such as another WD, UE, or base station of a radio access network (RAN) according to one or more communication protocols, such as IEEE 802.25, CDMA, WCDMA, GSM, LTE, UTRAN, WiMax, or the like. Each transceiver can include transmitter 2533 and/or receiver 2535 to implement transmitter or receiver functionality, respectively, appropriate to the RAN links (e.g., frequency allocations and the like). Further, transmitter 2533 and receiver 2535 of each transceiver can share circuit components, software or firmware, or alternatively can be implemented separately.

In the illustrated embodiment, the communication functions of communication subsystem 2531 can include data communication, voice communication, multimedia communication, short-range communications such as Bluetooth, near-field communication, location-based communication such as the use of the global positioning system (GPS) to determine a location, another like communication function, or any combination thereof. For example, communication subsystem 2531 can include cellular communication, Wi-Fi communication, Bluetooth communication, and GPS communication. Network 2543*b* can encompass wired and/or wireless networks such as a local-area network (LAN), a wide-area network (WAN), a computer network, a wireless network, a telecommunications network, another like network or any combination thereof. For example, network 2543*b* can be a cellular network, a Wi-Fi network, and/or a near-field network. Power source 2513 can be configured to provide alternating current (AC) or direct current (DC) power to components of UE 2500.

The features, benefits and/or functions described herein can be implemented in one of the components of UE 2500 or partitioned across multiple components of UE 2500. Further, the features, benefits, and/or functions described herein can be implemented in any combination of hardware, software or firmware. In one example, communication subsystem 2531 can be configured to include any of the components described herein. Further, processing circuitry 2501 can be configured to communicate with any of such components over bus 2502. In another example, any of such components can be represented by program instructions stored in memory that when executed by processing circuitry 2501 perform the corresponding functions described herein. In another example, the functionality of any of such components can be partitioned between processing circuitry 2501 and communication subsystem 2531. In another example, the non-computationally intensive functions of any of such components can be implemented in software or firmware and the computationally intensive functions can be implemented in hardware.

Figure 26:
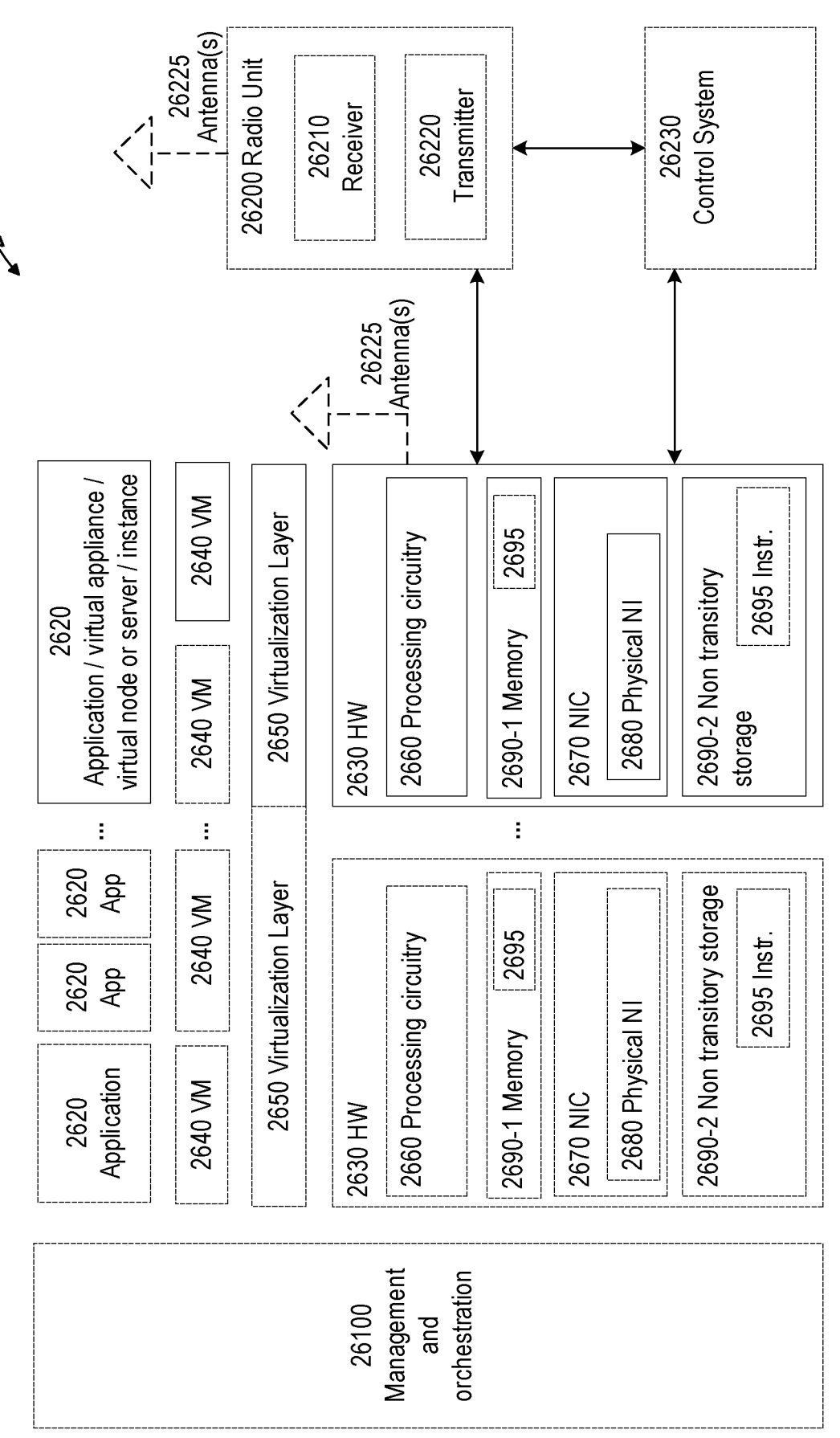
FIG. 26 is a block diagram illustrating an exemplary virtualization environment usable for implementation of various embodiments of network nodes described herein.

FIG. 26 is a schematic block diagram illustrating a virtualization environment 2600 in which functions implemented by some embodiments can be virtualized. In the present context, virtualizing means creating virtual versions of apparatuses or devices which can include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein can be implemented as virtual components executed by one or more virtual machines implemented in one or more virtual environments 2600 hosted by one or more of hardware nodes 2630. Further, in embodiments in which the virtual node is not a radio access node or does not require radio connectivity (e.g., a core network node), then the network node can be entirely virtualized.

The functions can be implemented by one or more applications 2620 (which can alternatively be called software instances, virtual appliances, network functions, virtual nodes, virtual network functions, etc.) operative to implement some of the features, functions, and/or benefits of some of the embodiments disclosed herein. Applications 2620 are run in virtualization environment 2600 which provides hardware 2630 comprising processing circuitry 2660 and memory 2690. Memory 2690 contains instructions 2695 executable by processing circuitry 2660 whereby application 2620 is operative to provide one or more of the features, benefits, and/or functions disclosed herein.

Virtualization environment 2600 can include general-purpose or special-purpose network hardware devices (or nodes) 2630 comprising a set of one or more processors or processing circuitry 2660, which can be commercial off-the-shelf (COTS) processors, dedicated Application Specific Integrated Circuits (ASICs), or any other type of processing circuitry including digital or analog hardware components or special purpose processors. Each hardware device can comprise memory 2690-1 which can be non-persistent memory for temporarily storing instructions 2695 or software executed by processing circuitry 2660. For example, instructions 2695 can include program instructions (also referred to as a computer program product) that, when executed by processing circuitry 2660, can configure hardware node 2620 to perform operations corresponding to various exemplary methods (e.g., procedures) described herein. Such operations can also be attributed to virtual node(s) 2620 that is/are hosted by hardware node 2630.

Each hardware device can comprise one or more network interface controllers (NICs) 2670, also known as network interface cards, which include physical network interface 2680. Each hardware device can also include non-transitory, persistent, machine-readable storage media 2690-2 having stored therein software 2695 and/or instructions executable by processing circuitry 2660. Software 2695 can include any type of software including software for instantiating one or more virtualization layers 2650 (also referred to as hypervisors), software to execute virtual machines 2640 as well as software allowing it to execute functions, features and/or benefits described in relation with some embodiments described herein.

Virtual machines 2640, comprise virtual processing, virtual memory, virtual networking or interface and virtual storage, and can be run by a corresponding virtualization layer 2650 or hypervisor. Different embodiments of the instance of virtual appliance 2620 can be implemented on one or more of virtual machines 2640, and the implementations can be made in different ways.

During operation, processing circuitry 2660 executes software 2695 to instantiate the hypervisor or virtualization layer 2650, which can sometimes be referred to as a virtual machine monitor (VMM). Virtualization layer 2650 can present a virtual operating platform that appears like networking hardware to virtual machine 2640.

As shown in FIG. 26, hardware 2630 can be a standalone network node with generic or specific components. Hardware 2630 can comprise antenna 26225 and can implement some functions via virtualization. Alternatively, hardware 2630 can be part of a larger cluster of hardware (e.g., such as in a data center or customer premise equipment (CPE)) where many hardware nodes work together and are managed via management and orchestration (MANO) 26100, which, among others, oversees lifecycle management of applications 2620.

Virtualization of the hardware is in some contexts referred to as network function virtualization (NFV). NFV can be used to consolidate many network equipment types onto industry standard high volume server hardware, physical switches, and physical storage, which can be located in data centers, and customer premise equipment.

In the context of NFV, virtual machine 2640 can be a software implementation of a physical machine that runs programs as if they were executing on a physical, non-virtualized machine. Each of virtual machines 2640, and that part of hardware 2630 that executes that virtual machine, be it hardware dedicated to that virtual machine and/or hardware shared by that virtual machine with others of the virtual machines 2640, forms a separate virtual network elements (VNE).

Still in the context of NFV, Virtual Network Function (VNF) is responsible for handling specific network functions that run in one or more virtual machines 2640 on top of hardware networking infrastructure 2630 and corresponds to application 2620 in FIG. 26.

In some embodiments, one or more radio units 26200 that each include one or more transmitters 26220 and one or more receivers 26210 can be coupled to one or more antennas 26225. Radio units 26200 can communicate directly with hardware nodes 2630 via one or more appropriate network interfaces and can be used in combination with the virtual components to provide a virtual node with radio capabilities, such as a radio access node or a base station. Nodes arranged in this manner can also communicate with one or more UEs, such as described elsewhere herein.

In some embodiments, some signaling can be performed via control system 26230, which can alternatively be used for communication between the hardware nodes 2630 and radio units 26200.

Figure 27:
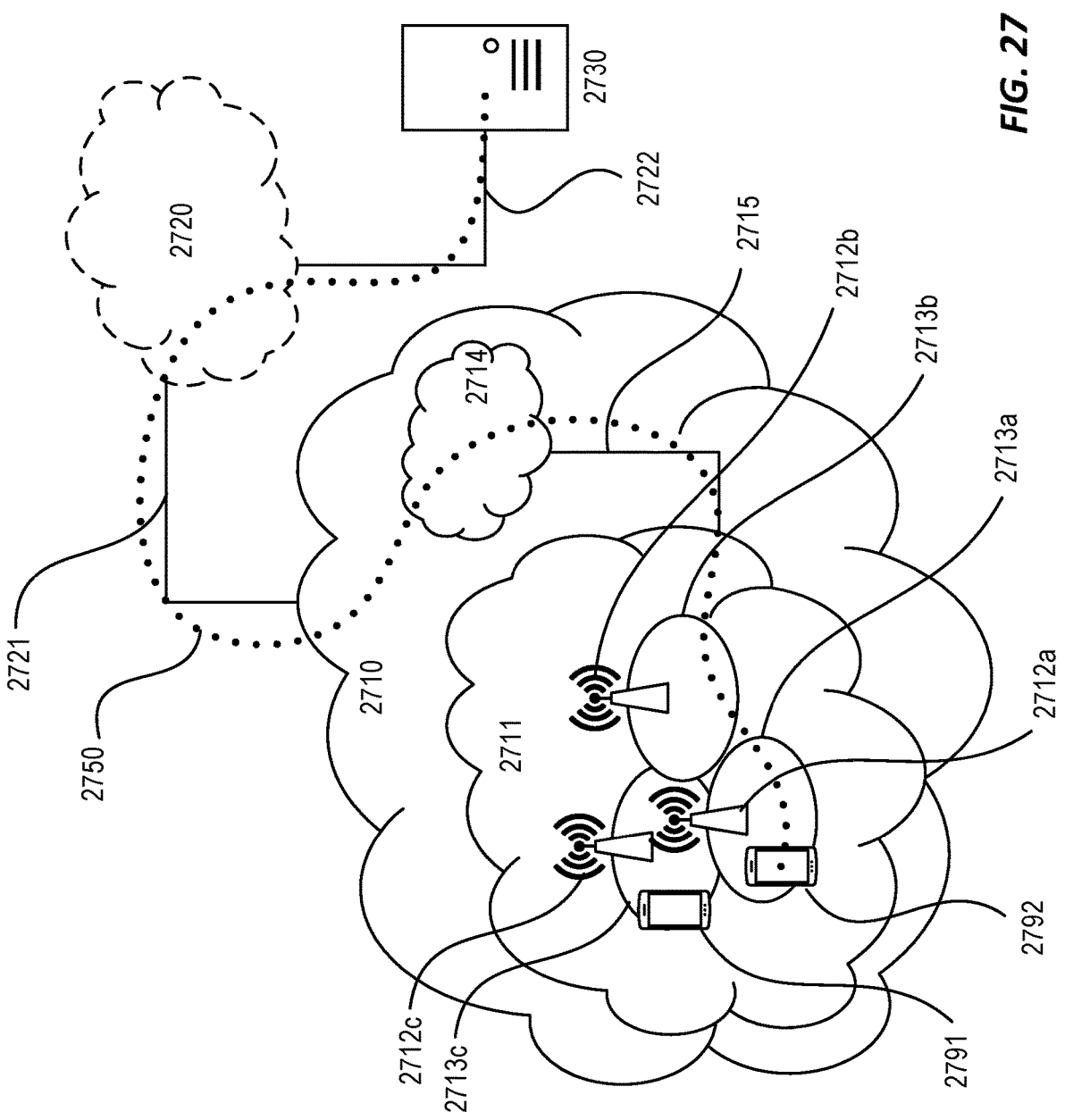
FIGS. 27-28 are block diagrams of various exemplary communication systems and/or networks, according to various exemplary embodiments of the present disclosure.

With reference to FIG. 27, in accordance with an embodiment, a communication system includes telecommunication network 2710, such as a 3GPP-type cellular network, which comprises access network 2711, such as a radio access network, and core network 2714. Access network 2711 comprises a plurality of base stations 2712*a*, 2712*b*, 2712*c*, such as NBs, eNBs, gNBs or other types of wireless access points, each defining a corresponding coverage area 2713*a*, 2713*b*, 2713*c*. Each base station 2712*a*, 2712*b*, 2712*c* is connectable to core network 2714 over a wired or wireless connection 2715. A first UE 2791 located in coverage area 2713*c* can be configured to wirelessly connect to, or be paged by, the corresponding base station 2712*c*. A second UE 2792 in coverage area 2713*a* is wirelessly connectable to the corresponding base station 2712*a*. While a plurality of UEs 2791, 2792 are illustrated in this example, the disclosed embodiments are equally applicable to a situation where a sole UE is in the coverage area or where a sole UE is connecting to the Telecommunication network 2710 is itself connected to host computer 2730, which can be embodied in the hardware and/or software of a standalone server, a cloud-implemented server, a distributed server or as processing resources in a server farm. Host computer 2730 can be under the ownership or control of a service provider or can be operated by the service provider or on behalf of the service provider. Connections 2721 and 2722 between telecommunication network 2710 and host computer 2730 can extend directly from core network 2714 to host computer 2730 or can go via an optional intermediate network 2720. Intermediate network 2720 can be one of, or a combination of more than one of, a public, private or hosted network; intermediate network 2720, if any, can be a backbone network or the Internet; in particular, intermediate network 2720 can comprise two or more sub-networks (not shown).

The communication system of FIG. 27 as a whole enables connectivity between the connected UEs 2791, 2792 and host computer 2730. The connectivity can be described as an over-the-top (OTT) connection 2750. Host computer 2730 and the connected UEs 2791, 2792 are configured to communicate data and/or signaling via OTT connection 2750, using access network 2711, core network 2714, any intermediate network 2720 and possible further infrastructure (not shown) as intermediaries. OTT connection 2750 can be transparent in the sense that the participating communication devices through which OTT connection 2750 passes are unaware of routing of uplink and downlink communications. For example, base station 2712 may not or need not be informed about the past routing of an incoming downlink communication with data originating from host computer 2730 to be forwarded (e.g., handed over) to a connected UE 2791. Similarly, base station 2712 need not be aware of the future routing of an outgoing uplink communication originating from the UE 2791 towards the host computer 2730.

Example implementations, in accordance with an embodiment, of the UE, base station and host computer discussed in the preceding paragraphs will now be described with reference to FIG. 28. In communication system 2800, host computer 2810 comprises hardware 2815 including communication interface 2816 configured to set up and maintain a wired or wireless connection with an interface of a different communication device of communication system 2800. Host computer 2810 further comprises processing circuitry 2818, which can have storage and/or processing capabilities. In particular, processing circuitry 2818 can comprise one or more programmable processors, application-specific integrated circuits, field programmable gate arrays or combinations of these (not shown) adapted to execute instructions. Host computer 2810 further comprises software 2811, which is stored in or accessible by host computer 2810 and executable by processing circuitry 2818. Software 2811 includes host application 2812. Host application 2812 can be operable to provide a service to a remote user, such as UE 2830 connecting via OTT connection 2850 terminating at UE 2830 and host computer 2810. In providing the service to the remote user, host application 2812 can provide user data which is transmitted using OTT connection 2850.

Communication system 2800 can also include base station 2820 provided in a telecommunication system and comprising hardware 2825 enabling it to communicate with host computer 2810 and with UE 2830. Hardware 2825 can include communication interface 2826 for setting up and maintaining a wired or wireless connection with an interface of a different communication device of communication system 2800, as well as radio interface 2827 for setting up and maintaining at least wireless connection 2870 with UE 2830 located in a coverage area (not shown in FIG. 28) served by base station 2820. Communication interface 2826 can be configured to facilitate connection 2860 to host computer 2810. Connection 2860 can be direct, or it can pass through a core network (not shown in FIG. 28) of the telecommunication system and/or through one or more intermediate networks outside the telecommunication system. In the embodiment shown, hardware 2825 of base station 2820 can also include processing circuitry 2828, which can comprise one or more programmable processors, application-specific integrated circuits, field programmable gate arrays or combinations of these (not shown) adapted to execute instructions.

Base station 2820 also includes software 2821 stored internally or accessible via an external connection. For example, software 2821 can include program instructions (also referred to as a computer program product) that, when executed by processing circuitry 2828, can configure base station 2820 to perform operations corresponding to various exemplary methods (e.g., procedures) described herein.

Communication system 2800 can also include UE 2830 already referred to, whose hardware 2835 can include radio interface 2837 configured to set up and maintain wireless connection 2870 with a base station serving a coverage area in which UE 2830 is currently located. Hardware 2835 of UE 2830 can also include processing circuitry 2838, which can comprise one or more programmable processors, application-specific integrated circuits, field programmable gate arrays or combinations of these (not shown) adapted to execute instructions.

UE 2830 also includes software 2831, which is stored in or accessible by UE 2830 and executable by processing circuitry 2838. Software 2831 includes client application 2832. Client application 2832 can be operable to provide a service to a human or non-human user via UE 2830, with the support of host computer 2810. In host computer 2810, an executing host application 2812 can communicate with the executing client application 2832 via OTT connection 2850 terminating at UE 2830 and host computer 2810. In providing the service to the user, client application 2832 can receive request data from host application 2812 and provide user data in response to the request data. OTT connection 2850 can transfer both the request data and the user data.

Client application 2832 can interact with the user to generate the user data that it provides. Software 2831 can also include program instructions (also referred to as a computer program product) that, when executed by processing circuitry 2838, can configure UE 2830 to perform operations corresponding to various exemplary methods (e.g., procedures) described herein.

Figure 28:
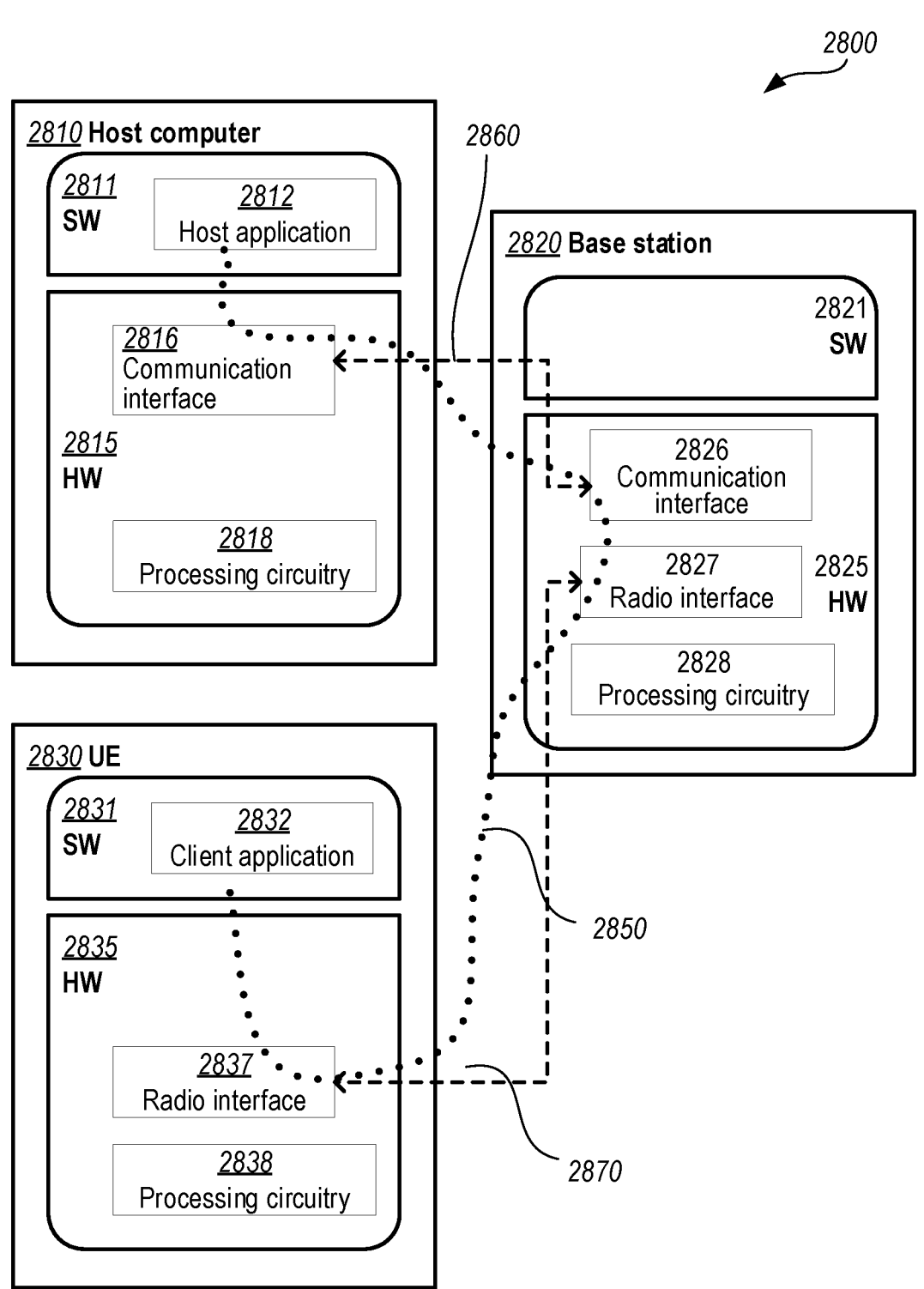

As an example, host computer 2810, base station 2820 and UE 2830 illustrated in FIG. 28 can be similar or identical to host computer 2730, one of base stations 2712*a*, 2712*b*, 2712*c* and one of UEs 2791, 2792 of FIG. 27, respectively. This is to say, the inner workings of these entities can be as shown in FIG. 28 and independently, the surrounding network topology can be that of FIG. 27.

In FIG. 28, OTT connection 2850 has been drawn abstractly to illustrate the communication between host computer 2810 and UE 2830 via base station 2820, without explicit reference to any intermediary devices and the precise routing of messages via these devices. Network infrastructure can determine the routing, which it can be configured to hide from UE 2830 or from the service provider operating host computer 2810, or both. While OTT connection 2850 is active, the network infrastructure can further take decisions by which it dynamically changes the routing (e.g., on the basis of load balancing consideration or reconfiguration of the network).

Wireless connection 2870 between UE 2830 and base station 2820 is in accordance with the teachings of the embodiments described throughout this disclosure. One or more of the various embodiments improve the performance of OTT services provided to UE 2830 using OTT connection 2850, in which wireless connection 2870 forms the last segment. More precisely, the exemplary embodiments disclosed herein can improve flexibility for the network to monitor end-to-end quality-of-service (QoS) of data flows, including their corresponding radio bearers, associated with data sessions between a user equipment (UE) and another entity, such as an OTT data application or service external to the 5G network. These and other advantages can facilitate more timely design, implementation, and deployment of 5G/NR solutions. Furthermore, such embodiments can facilitate flexible and timely control of data session QoS, which can lead to improvements in capacity, throughput, latency, etc. that are envisioned by 5G/NR and important for the growth of OTT services.

A measurement procedure can be provided for the purpose of monitoring data rate, latency and other network operational aspects on which the one or more embodiments improve. There can further be an optional network functionality for reconfiguring OTT connection 2850 between host computer 2810 and UE 2830, in response to variations in the measurement results. The measurement procedure and/or the network functionality for reconfiguring OTT connection 2850 can be implemented in software 2811 and hardware 2815 of host computer 2810 or in software 2831 and hardware 2835 of UE 2830, or both. In embodiments, sensors (not shown) can be deployed in or in association with communication devices through which OTT connection 2850 passes; the sensors can participate in the measurement procedure by supplying values of the monitored quantities exemplified above, or supplying values of other physical quantities from which software 2811, 2831 can compute or estimate the monitored quantities. The reconfiguring of OTT connection 2850 can include message format, retransmission settings, preferred routing etc.; the reconfiguring need not affect base station 2820, and it can be unknown or imperceptible to base station 2820. Such procedures and functionalities can be known and practiced in the art. In certain embodiments, measurements can involve proprietary UE signaling facilitating host computer 2810's measurements of throughput, propagation times, latency and the like. The measurements can be implemented in that software 2811 and 2831 causes messages to be transmitted, in particular empty or 'dummy' messages, using OTT connection 2850 while it monitors propagation times, errors, etc.

FIG. 29 is a flowchart illustrating an exemplary method (e.g., procedure) implemented in a communication system, in accordance with various embodiments. The communication system includes a host computer, a base station and a UE which, in some exemplary embodiments, can be those described with reference to other figures herein. For simplicity of the present disclosure, only drawing references to FIG. 29 will be included in this section. In step 2910, the host computer provides user data. In substep 2911 (which can be optional) of step 2910, the host computer provides the user data by executing a host application. In step 2920, the host computer initiates a transmission carrying the user data to the UE. In step 2930 (which can be optional), the base station transmits to the UE the user data which was carried in the transmission that the host computer initiated, in accordance with the teachings of the embodiments described throughout this disclosure. In step 2940 (which can also be optional), the UE executes a client application associated with the host application executed by the host computer.

FIG. 30 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 30 will be included in this section. In step 3010 of the method, the host computer provides user data. In an optional substep (not shown) the host computer provides the user data by executing a host application. In step 3020, the host computer initiates a transmission carrying the user data to the UE. The transmission can pass via the base station, in accordance with the teachings of the embodiments described throughout this disclosure. In step 3030 (which can be optional), the UE receives the user data carried in the transmission.

FIG. 31 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 31 will be included in this section. In step 3110 (which can be optional), the UE receives input data provided by the host computer. Additionally or alternatively, in step 3120, the UE provides user data. In substep 3121 (which can be optional) of step 3120, the UE provides the user data by executing a client application. In substep 3111 (which can be optional) of step 3110, the UE executes a client application which provides the user data in reaction to the received input data provided by the host computer. In providing the user data, the executed client application can further consider user input received from the user. Regardless of the specific manner in which the user data was provided, the UE initiates, in substep 3130 (which can be optional), transmission of the user data to the host computer. In step 3140 of the method, the host computer receives the user data transmitted from the UE, in accordance with the teachings of the embodiments described throughout this disclosure.

FIG. 32 is a flowchart illustrating an exemplary method (e.g., procedure) implemented in a communication system, in accordance with various embodiments. The communication system includes a host computer, a base station and a UE which can be those described with reference to other figures herein. For simplicity of the present disclosure, only drawing references to FIG. 32 will be included in this section. In step 3210 (which can be optional), in accordance with the teachings of the embodiments described throughout this disclosure, the base station receives user data from the UE. In step 3220 (which can be optional), the base station initiates transmission of the received user data to the host computer. In step 3230 (which can be optional), the host computer receives the user data carried in the transmission initiated by the base station.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures that, although not explicitly shown or described herein, embody the principles of the disclosure and can be thus within the spirit and scope of the disclosure. Various exemplary embodiments can be used together with one another, as well as interchangeably therewith, as should be understood by those having ordinary skill in the art.

The term unit, as used herein, can have conventional meaning in the field of electronics, electrical devices and/or electronic devices and can include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

As described herein, device and/or apparatus can be represented by a semiconductor chip, a chipset, or a (hardware) module comprising such chip or chipset; this, however, does not exclude the possibility that a functionality of a device or apparatus, instead of being hardware implemented, be implemented as a software module such as a computer program or a computer program product comprising executable software code portions for execution or being run on a processor. Furthermore, functionality of a device or apparatus can be implemented by any combination of hardware and software. A device or apparatus can also be regarded as an assembly of multiple devices and/or apparatuses, whether functionally in cooperation with or independently of each other. Moreover, devices and apparatuses can be implemented in a distributed fashion throughout a system, so long as the functionality of the device or apparatus is preserved. Such and similar principles are considered as known to a skilled person.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In addition, certain terms used in the present disclosure, including the specification and drawings, can be used synonymously in certain instances (e.g., "data" and "information"). It should be understood, that although these terms (and/or other terms that can be synonymous to one another) can be used synonymously herein, there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

The techniques and apparatus described herein include, but are not limited to, the following enumerated examples:

A1. A method, for a first radio access network node (RNN) in a wireless network, for configuring quality of experience (QoE) measurements by user equipment (UEs), the method comprising:

sending, to a UE connected to the first RNN, a QoE measurement configuration for one or more applications;

sending, to the UE, a configuration for access-layer dual connectivity (DC) of the UE with a second RNN in the wireless network; and receiving one or more QoE measurement reports, in accordance with the QoE measurement configuration, from at least one of the UE and the second RNN, wherein the QoE measurement reports include measurements made by the UE while in DC with the first and second RNNs.

A2. The method of embodiment A1, further comprising receiving, from the UE, an indication of whether the UE will perform measurements for the one or more applications on data carried by the first RNN, by the second RNN, or by both.

A3. The method of embodiment A2, further comprising sending the QoE measurement configuration to the second RNN when the indication indicates that the UE will perform measurements on data carried by the second RNN.

A4. The method of any of embodiments A1-A3, further comprising sending, to the second RNN, a request to establish access-layer DC with the UE, wherein the request includes the QoE measurement configuration.

A5. The method of any of embodiments A1-A4, wherein the QoE measurement configuration includes a QoE reporting configuration that indicates that QoE measurement reports should be sent by the UE according to one of the following options:

only to the first RNN;

only to the second RNN;

to one or more of the first or second RNN as selected by the UE;

as duplicates to both the first and second RNNs; and to the RNN that carried the data on which the measurements were performed.

A6. The method of any of embodiments A1-A5, wherein:

the DC includes a master cell group (MCG) for the first RNN and a secondary cell group (SCG) for the second RNN; and the QoE measurement reports are received from the UE on one or more of the following bearers: MCG bearer, split MCG/SCG bearer, and duplicate bearer.

A7. The method of embodiment A6, wherein the one or more bearers used to receive the QoE measurement reports are signaling radio bearers (SRBs) or data radio bearers (DRBs).

A8. The method of any of embodiments A1-A7, wherein the QoE measurement configuration is sent to the UE in a radio resource control (RRC) message together with the configuration for access-layer DC.

A9. The method of any of embodiments A1-A8, wherein:

the method further comprises sending, to the second RNN, a request for QoE measurement reports received by the second RNN from the UE in accordance with the QoE measurement configuration; and receiving the one or more QoE measurement reports comprises receiving, from the second RNN, a response including one or more of the following:

at least one of the requested QoE measurement reports; and an indication of availability or non-availability of the requested QoE measurement reports.

A10. The method of embodiment A9, further comprising receiving, from the second RNN, an unsolicited indication of availability of QoE measurement reports received by the second RNN from the UE, wherein the request is sent in response to the unsolicited indication.

A11. The method of any of embodiments A9-A10, further comprising, based on receiving a response including an indication of non-availability, performing one or more of the following operations:

configuring QoE measurements by one or more other UE;

notifying a measurement collection entity (MCE) of the non-availability; and refraining from sending the second RNN one or more further QoE measurement configurations for the UE.

A12. The method of any of embodiments A1-A11, further comprising sending, to the second RNN, address information for a measurement collection entity (MCE) to which the second RNN should send QoE measurement reports received from the UE.

A13. The method of any of embodiments A1-A12, further comprising, based on at least one of the QoE measurement reports received from the second RNN, initiating a procedure with a third RNN to operate in access-layer DC with the UE and the first RNN.

A14. The method of any of embodiments A1-A13, further comprising, based on determining that at least one QoE measurement report received from the UE includes measurements for the one or more applications on data carried by the second RNN, sending the at least one QoE measurement report to the second RNN.

B1. A method, for a second radio access network node (RNN) in a wireless network, for receiving quality of experience (QoE) measurements by user equipment (UEs), the method comprising:

receiving, from a first RNN in the wireless network, a request to establish access-layer dual connectivity (DC) with a UE and the first RNN;

receiving, from the first RNN, a QoE measurement configuration for measurements by the UE in relation to one or more applications; and receiving one or more QoE measurement reports, in accordance with the QoE measurement configuration, from at least one of the UE and the first RNN, wherein the QoE measurement reports include measurements made by the UE while in DC with the first and second RNNs.

B2. The method of any of embodiments A1-A3, wherein the request to establish DC includes the QoE measurement configuration.

B3. The method of any of embodiments B1-B2, wherein the QoE measurement configuration includes a QoE reporting configuration that indicates that QoE measurement reports should be sent by the UE according to one of the following options:

only to the first RNN;

only to the second RNN;

to one or more of the first or second RNN as selected by the UE;

as duplicates to both the first and second RNNs; and to the RNN that carried the data on which the measurements were performed.

B4. The method of any of embodiments B1-B3, wherein:

the DC includes a master cell group (MCG) for the first RNN and a secondary cell group (SCG) for the second RNN; and the QoE measurement reports are received from the UE on one or more of the following bearers: SCG bearer, split MCG/SCG bearer, and duplicate bearer.

B5. The method of embodiment B4, wherein the one or more bearers used to receive the QoE measurement reports are signaling radio bearers (SRBs) or data radio bearers (DRBs).

B6. The method of any of embodiments A1-A8, further comprising:

receiving, from the first RNN, a request for QoE measurement reports received by the second RNN from the UE in accordance with the QoE measurement configuration; and sending, to the first RNN, a response including one or more of the following:

at least one of the QoE measurement reports received from the UE; and an indication of availability or non-availability of the requested QoE measurement reports.

B7. The method of embodiment B6, further comprising sending, to the first RNN, an unsolicited indication of availability of QoE measurement reports received by the second RNN from the UE, wherein the request is received subsequent to the unsolicited indication.

B8. The method of any of embodiments B1-B7, further comprising:

receiving, from the first RNN, address information for a measurement collection entity (MCE); and forwarding any of the QoE measurement reports received from the UE to the MCE based on the address information.

B9. The method of any of embodiments B1-B9, wherein:

at least one of the QoE measurement reports is received from the first RNN; and the at least one QoE measurement report received from the UE includes measurements for the one or more applications on data carried by the second RNN.

B10. The method of any of embodiments B1-B9, wherein:

the method further comprises:

determining a further QoE measurement configuration for the one or more applications and/or one or more further applications based on the QoE measurement configuration, and sending the further QoE measurement configuration to the UE; and the one or more measurement reports are received in accordance with the QoE measurement configuration and the further QoE measurement configuration.

C1. A method, for a user equipment (UE), for performing quality of experience (QoE) measurements configured by a wireless network, the method comprising:

while connected to a first radio access network node (RNN) in the wireless network, receiving, from the first RNN, a QoE measurement configuration for one or more applications;

receiving a configuration for access-layer dual connectivity (DC) of the UE with a second RNN in the wireless network;

while in DC with the first and second RNNs, performing measurements for the one or more applications in accordance with the QoE measurement configuration; and sending one or more QoE measurement reports, in accordance with the QoE measurement configuration, to at least one of the first RNN and the second RNN.

C2. The method of embodiment C1, further comprising sending, to the first RNN, an indication of whether measurements for the one or more applications will be performed on data carried by the first RNN, by the second RNN, or by both.

C3. The method of embodiment C1, wherein the QoE measurement configuration includes a QoE reporting configuration that indicates that QoE measurement reports should be sent according to one of the following options:

only to the first RNN;

only to the second RNN;

to one or more of the first or second RNN as selected by the UE;

as duplicates to both the first and second RNNs; and to the RNN that carried the data on which the measurements were performed.

C4. The method of any of embodiments C1-C3, further comprising selecting at least one of the first and second RNNs to receive the QoE measurement reports based on one or more of the following:

a QoE reporting configuration provided by the first RNN;

quality of the respective radio links to the first and second RNNs; and data rate of the respective radio links to the first and second RNNs.

C5. The method of any of embodiments C1-C4, wherein:

the DC includes a master cell group (MCG) for the first RNN and a secondary cell group (SCG) for the second RNN; and the QoE measurement reports are sent on one or more of the following bearers: MCG bearer, SCG bearer, split MCG/SCG bearer, and duplicate bearer.

C6. The method of embodiment C5, wherein the one or more bearers used to send the QoE measurement reports are signaling radio bearers (SRBs) or data radio bearers (DRBs).

C7. The method of any of embodiments C1-C6, wherein the QoE measurement configuration is received in a radio resource control (RRC) message together with the configuration for access-layer DC.

C8. The method of any of embodiments C1-C7, wherein:

the method further comprises receiving, from the second RNN, a further QoE measurement configuration for the one or more applications and/or one or more further applications; and the measurements are performed in accordance with the QoE measurement configuration and further QoE measurement configuration.

D1. A first radio access network node (RNN) arranged to configure quality of experience (QoE) measurements by user equipment (UEs) in a wireless network, the first RNN comprising:

communication interface circuitry configured to communicate with one or more UEs and with a second RNN in the wireless network; and processing circuitry operatively coupled to the communication interface circuitry, whereby the processing circuitry and the communication interface circuitry are configured to perform operations corresponding to the methods of any of embodiments A1-A14.

D2. A first radio network node (RNN) arranged to configure quality of experience (QoE) measurements by user equipment (UEs) in a wireless network, the first RNN being further arranged to perform operations corresponding to the methods of any of embodiments A1-A14.

D3. A non-transitory, computer-readable medium storing computer-executable instructions that, when executed by processing circuitry of a first radio network node (RNN) arranged to configure quality of experience (QoE) measurements by user equipment (UEs) in a wireless network, configure the first RNN to perform operations corresponding to the methods of any of embodiments A1-A14.

D4. A computer program product comprising computer-executable instructions that, when executed by processing circuitry of a first radio network node (RNN) arranged to configure quality of experience (QoE) measurements by user equipment (UEs) in a wireless network, configure the first RNN to perform operations corresponding to the methods of any of embodiments A1-A14.

E1. A second radio access network node (RNN) arranged to receive quality of experience (QoE) measurements by user equipment (UEs) in a wireless network, the second RNN comprising:

communication interface circuitry configured to communicate with one or more UEs and with a first RNN in the wireless network; and processing circuitry operatively coupled to the communication interface circuitry, whereby the processing circuitry and the communication interface circuitry are configured to perform operations corresponding to the methods of any of embodiments B1-B10.

E2. A second radio network node (RNN) arranged to receive quality of experience (QoE) measurements by user equipment (UEs) in a wireless network, the second RNN being further arranged to perform operations corresponding to the methods of any of embodiments B1-B10.

E3. A non-transitory, computer-readable medium storing computer-executable instructions that, when executed by processing circuitry of a second radio network node (RNN) arranged to receive quality of experience (QoE) measurements by user equipment (UEs) in a wireless network, configure the second RNN to perform operations corresponding to the methods of any of embodiments B1-B10.

E4. A computer program product comprising computer-executable instructions that, when executed by processing circuitry of a second radio network node (RNN) arranged to receive quality of experience (QoE) measurements by user equipment (UEs) in a wireless network, configure the second RNN to perform operations corresponding to the methods of any of embodiments B1-B10.

F1. A user equipment (UE) arranged to perform quality of experience (QoE) measurements configured by a wireless network, the UE comprising:
radio transceiver circuitry configured to communicate with first and second radio access network nodes (RNNs) in the wireless network; and
processing circuitry operatively coupled to the radio transceiver circuitry, whereby the processing circuitry and the radio transceiver circuitry are configured to perform operations corresponding to the methods of any of embodiments C1-C8.

F2. A user equipment (UE) arranged to perform quality of experience (QoE) measurements configured by a wireless network, the UE being further arranged to perform operations corresponding to the methods of any of embodiments C1-C8.

F3. A non-transitory, computer-readable medium storing computer-executable instructions that, when executed by processing circuitry of a user equipment (UE) arranged to perform quality of experience (QoE) measurements configured by a wireless network, configure the UE to perform operations corresponding to the methods of any of embodiments C1-C8.

F4. A computer program product comprising computer-executable instructions that, when executed by processing circuitry of a user equipment (UE) arranged to perform quality of experience (QoE) measurements configured by a wireless network, configure the UE to perform operations corresponding to the methods of any of embodiments C1-C8.

The invention claimed is:

1. A method for a first radio access network node (RNN) in a wireless network to configure quality of experience (QoE) measurements by user equipment (UEs), the method comprising:
sending, to a UE connected to the first RNN, a QoE measurement configuration for one or more services provided by an application layer of the UE;
sending, to the UE, a configuration for access-layer multi-connectivity of the UE with a second RNN in the wireless network; and receiving one or more QoE measurement reports, in accordance with the QoE measurement configuration, from at least one of the UE and the second RNN, wherein the QoE measurement reports include measurements made by the UE while in multi-connectivity with the first and second RNNs.

2. The method of claim 1, wherein:
the multi-connectivity includes a master cell group (MCG) provided by the first RNN and a secondary cell group (SCG) provided by the second RNN; and
QoE measurement reports received from the UE are via a split SCG signaling radio bearer (SRB), or via a split MCG SRB.

3. The method of claim 1, further comprising:
receiving, from the UE, an indication of whether data on which the UE will perform measurements for the one or more services is carried by the first RNN, by the second RNN, or by both the first and second RNNs; and
sending the QoE measurement configuration to the second RNN when the indication indicates that the data on which the UE will perform the measurements is carried at least in part by the second RNN.

4. The method of claim 1, further comprising sending, to the second RNN, a request to establish or to modify access-layer multi-connectivity with the UE, wherein the request includes the QoE measurement configuration.

5. The method of claim 1, wherein the QoE measurement configuration includes a QoE reporting configuration that indicates that QoE measurement reports should be sent by the UE according to one of the following options:
only to the first RNN;
only to the second RNN;
to one or more of the first or second RNN as selected by the UE;
as duplicates to both the first and second RNNs; and
to the RNN that carried the data on which the measurements were performed.

6. The method of claim 1, wherein:
the method further comprises sending, to the second RNN, a request for QoE measurement reports received by the second RNN from the UE in accordance with the QoE measurement configuration; and
receiving the one or more QoE measurement reports comprises receiving, from the second RNN, a response including one or more of the following:
at least one of the requested QoE measurement reports; and
an indication of availability or non-availability of the requested QoE measurement reports.

7. The method of claim 6, further comprising receiving (2160), from the second RNN, an unsolicited indication of availability of QoE measurement reports received by the second RNN from the UE, wherein the request for the QoE measurement reports is sent in response to the unsolicited indication.

8. The method of claim 1, further comprising sending, to the second RNN, one or more of the QoE measurement reports that were received from the UE.

9. The method of claim 8, wherein one or more of the following applies:
sending the one more QoE measurements reports to the second RNN is based on determining that the one more QoE measurements reports received from the UE include measurements made by the UE on data carried by the second RNN; and each of the QoE measurement reports received from second RNN or sent to the second RNN includes an identifier of the UE.

10. A method, for a second radio access network node (RNN) in a wireless network, for receiving quality of experience (QoE) measurements by user equipment (UEs), the method comprising:

receiving, from a first RNN in the wireless network, a request to establish or to modify access-layer multi-connectivity with a UE and the first RNN;

receiving, from the first RNN, a QoE measurement configuration for measurements by the UE in relation to one or more services provided by an application layer of the UE; and receiving one or more QoE measurement reports, in accordance with the QoE measurement configuration, from at least one of the UE and the first RNN, wherein the QoE measurement reports include measurements made by the UE while in multi-connectivity with the first and second RNNs.

11. The method of claim 10, wherein:

the multi-connectivity includes a master cell group (MCG) provided by the first RNN and a secondary cell group (SCG) provided by the second RNN; and QoE measurement reports received from the UE are via an SCG signaling radio bearer (SRB), via a split SCG SRB, or via a split MCG SRB.

12. The method of claim 10, wherein the QoE measurement configuration includes a QoE reporting configuration that indicates that QoE measurement reports should be sent by the UE according to one of the following options:

only to the first RNN;

only to the second RNN;

to one or more of the first or second RNN as selected by the UE;

as duplicates to both the first and second RNNs; and to the RNN that carried the data on which the measurements were performed.

13. The method of claim 10, further comprising:

receiving, from the first RNN, a request for QoE measurement reports received by the second RNN from the UE in accordance with the QoE measurement configuration; and sending, to the first RNN, a response including one or more of the following:

at least one of the QoE measurement reports received from the UE; and an indication of availability or non-availability of the requested QoE measurement reports.

14. A method for a user equipment (UE) to perform quality of experience (QoE) measurements configured by a wireless network, the method comprising:

while connected to a first radio access network node (RNN) in the wireless network, receiving from the first RNN a QoE measurement configuration for one or more services provided by an application layer of the UE;

receiving a configuration for access-layer multi-connectivity of the UE with a second RNN in the wireless network;

while in multi-connectivity with the first and second RNNs, performing measurements for the one or more services in accordance with the QoE measurement configuration; and sending one or more QoE measurement reports, in accordance with the QoE measurement configuration, to at least one of the first RNN and the second RNN.

15. The method of claim 14, wherein:

the multi-connectivity includes a master cell group (MCG) provided by the first RNN and a secondary cell group (SCG) provided by the second RNN; and each QoE measurement report is sent according to one of the following:

to the second RNN via an SCG signaling radio bearer, SRB;

to the second RNN via a split SCG SRB or a split MCG SRB; or to the first RNN via the split SCG SRB or the split MCG SRB.

16. The method of claim 14, wherein at least one QoE measurement report sent to the first RNN include measurements made by the UE on data carried by the second RNN.

17. The method of claim 14, further comprising sending, to the first RNN, an indication of whether data, on which the UE will perform measurements for the one or more services, is carried by the first RNN, by the second RNN, or by both the first and second RNNs.

18. The method of claim 14, wherein the QoE measurement configuration includes a QoE reporting configuration that indicates that QoE measurement reports should be sent according to one of the following options:

only to the first RNN;

only to the second RNN;

to one or more of the first or second RNN as selected by the UE;

as duplicates to both the first and second RNNs; and to the RNN that carried the data on which the measurements were performed.

19. The method of claim 14, further comprising selecting at least one of the first and second RNNs to receive the QoE measurement reports based on one or more of the following:

a QoE reporting configuration provided by the first RNN;

quality of the respective radio links to the first and second RNNs; and data rate of the respective radio links to the first and second RNNs.

20. A first radio access network node (RNN) arranged to configure quality of experience (QoE) measurements by user equipment (UEs) in a wireless network, the first RNN comprising:

communication interface circuitry configured to communicate with UEs and with a second RNN in the wireless network; and processing circuitry operatively coupled to the communication interface circuitry, whereby the processing circuitry and the communication interface circuitry are configured to perform operations corresponding to the method of claim 1.

21. A second radio access network node (RNN) arranged to configure quality of experience (QoE) measurements by user equipment (UEs) in a wireless network, the second RNN comprising:

communication interface circuitry configured to communicate with the UEs and with a first RNN in the wireless network; and processing circuitry operatively coupled to the communication interface circuitry, whereby the processing circuitry and the communication interface circuitry are configured to perform operations corresponding to the method of claim 10.

22. A user equipment (UE) arranged to perform quality of experience (QoE) measurements configured by a wireless network, the UE comprising:

radio interface circuitry configured to communicate with first and second radio access network nodes, (RNNs) in the wireless network; and processing circuitry operatively coupled to the radio interface circuitry, whereby the processing circuitry and the radio interface circuitry are configured to perform operations corresponding to the method of claim 14.

\* \* \* \* \*